US012578273B2

(12) United States Patent
Choi et al.

(10) Patent No.: US 12,578,273 B2

(45) Date of Patent: Mar. 17, 2026

(54) PH-REVERSIBLE LEUCO-BODIPY PROBE FOR IN SITU VISUALIZATION OF EXTRACELLULAR VESICLES AND THEIR SECRETION FROM LIVING CELLS

(71) Applicant: The Chinese University of Hong Kong, Hong Kong (CN)

(72) Inventors: Chung Hang Jonathan Choi, Hong Kong (CN); Hanzhuang Liu, Dalian City (CN)

(73) Assignee: The Chinese University of Hong Kong, Hong Kong (CN)

( * ) Notice: Subject to any disclaimer, the term of this patent is extended or adjusted under 35 U.S.C. 154(b) by 834 days.

(21) Appl. No.: 17/811,173

(22) Filed: Jul. 7, 2022

(65) Prior Publication Data

US 2023/0060172 A1 Mar. 2, 2023

Related U.S. Application Data

(60) Provisional application No. 63/219,108, filed on Jul. 7, 2021.

(51) Int. Cl.

| | |
|---|---|
| ***G01N 21/64*** | (2006.01) |
| ***C07F 5/02*** | (2006.01) |
| ***C09B 57/00*** | (2006.01) |
| ***C09K 11/06*** | (2006.01) |

(52) U.S. Cl.

CPC ......... *G01N 21/6486* (2013.01); *C07F 5/022* (2013.01); *C09B 57/00* (2013.01); *C09K 11/06* (2013.01); *C09K 2211/1055* (2013.01)

(58) Field of Classification Search

CPC ..... G01N 21/6486; C07F 5/022; C09B 57/00; C09B 23/12; C09K 11/06; C09K 2211/1055

See application file for complete search history.

(56) References Cited

U.S. PATENT DOCUMENTS

2002/0164744 A1* 11/2002 Deibel, Jr. ........... C12N 9/0022 435/325

FOREIGN PATENT DOCUMENTS

WO WO-2009109029 A1 * 9/2009 ......... A61K 31/4709

OTHER PUBLICATIONS

Liu, Hanzhuang, et al. "Real-time monitoring of newly acidified organelles during autophagy enabled by reaction-based BODIPY dyes." Communications biology 2.1 (2019): 442. (Year: 2019).*

Liu, Hui, et al. "Reversible Reaction-Based Fluorescent Probes for Dynamic Sensing and Bioimaging." European Journal of Organic Chemistry 2020.35 (2020): 5647-5663. (Year: 2020).*

(Continued)

*Primary Examiner* — Jennifer Wecker

*Assistant Examiner* — Oyeleye Alexander Alabi

(74) *Attorney, Agent, or Firm* — SALIWANCHIK, LLOYD & EISENSCHENK

(57) ABSTRACT

The subject invention pertains to compositions of a probe comprising two pH-reversible forms, including the boron dipyrromethene (BODIPY) fluorescent form and the non-fluorescent leuco-BODIPY form, for use in confocal imaging methods of intracellular vesicles as well as extracellular vesicles that are present in conditioned culture medium and/or secreted by living cells, without inducing severe cytotoxicity.

14 Claims, 53 Drawing Sheets

(56) References Cited

OTHER PUBLICATIONS

Ho, L.W.C., et al., "Effect of Alkylation on the Cellular Uptake of Polyethylene Glycol-Coated Gold Nanoparticles," ACS Nano, 2017, 11:6085-6101.
Cheng, P., et al., "Molecular imaging and disease theranostics with renal-clearable optical agents," Nature Reviews Materials, 2021, 6:1095-1113.
Huang, J., et al., "Molecular optical imaging probes for early diagnosis of drug-induced acute kidney injury," Nature Materials, 2019, 18:1133-1143.
Kalluri, R., et al., "The biology, function, and biomedical applications of exosomes," Science, 2020, 367: 1-17.
Shao, H. et al., "New Technologies for Analysis of Extracellular Vesicles," Chemical Review, 2018, 118:1917-1950.
Al-Nedawi, K., et al., "Intercellular transfer of the oncogenic receptor EGFRvIII by microvesicles derived from tumour cells," Nature Cell Biology, 2008, 10(5):1-26.
Fais, S., et al., "Evidence-Based Clinical Use of Nanoscale Extracellular Vesicles in Nanomedicine," ACS Nano, pp. 1-14.
Yong, T., et al., "Tumor exosome-based nanoparticles are efficient drug carriers for chemotherapy," Nature Communications, 2019, 10(3838):1-16.
Meldolesi, J., "Exosomes and Ectosomes in Intercellular Communication," Current Biology, 2018, 28:R4335-R444.
Cocucci, E., et al., "Ectosomes and exosomes: shedding the confusion between extracellular vesicles," Trends in Cell Biology, 2015, 25(6):364-372.
Shen, L.-M., et al., "Tracking Exosomes in Vitro and in Vivo to Elucidate Their Physiological Functions: Implications for Diagnostic and Therapeutic Nanocarriers," ACS Applied Nano Materials, 2018, 1:2438-2448.
Miesenbock, G., et al., "Visualizing secretion and synaptic transmission with pH-sensitive green fluorescent proteins," Nature, 1998, 394:192-195.
Sung, B.H., et al., "A live cell reporter of exosome secretion and uptake reveals pathfinding behavior of migrating cells," Nature Communications, 2020, 11(2092):1-15.
Ma, B., et al., "Lipoplex morphologies and their influences on transfection efficiency in gene delivery," Journal of Controlled Release, 2007, 123:184-194.
Dass, C.R., "Lipoplex-mediated delivery of nucleic acids: factors affecting in vivo transfection," Journal of Molecular Medicine, 2004, 82:579-591.
Feng, L., et al., "A fluorescent molecular rotor probe for tracking plasma membranes and exosomes in living cells," Chemical Communications, 2020, 56:8480-8483.
Zhou, X., et al., "ExoTracker: a low-pH-activatable fluorescent probe for labeling exosomes and monitoring endocytosis and trafficking," Chemical Communications, 2020, 56:14869-14872.
Lyu, Y., et al., "Near-Infrared Afterglow Semiconducting Nano-Polycomplexes for the Multiplex Differentiation of Cancer Exosomes," Angewandte Chemie International Edition, 2019, 58:4983-4987.
Wang, L., et al., "Environmentally Sensitive Color-Shifting Fluorophores for Bioimaging," Angewandte Chemie International Edition, 2020, 59:21880-21884.
Chan, J., et al., "Reaction-based small-molecule fluorescent probes for chemoselective bioimaging," Nature Chemistry, 2012, 4:973-984.
Kashima, H., et al., "Photoactivatable fluorophores for durable labelling of individual cells," Chemical Communications, 2021, 57:5802-5805.
Iwaki, H., et al., "Fluorescence Probes for Imaging Basic Carboxypeptidase Activity in Living Cells with High Intracellular Retention," Analytical Chemistry, 2021, 93:3470-3476.
Obara, R., et al., "γ-Glutamyltranspeptidase (GGT)-Activatable Fluorescence Probe for Durable Tumor Imaging," Angewandte Chemie International Edition, 2021, 60:2125-2129.
Hu, D., et al., "Ultrasensitive reversible chromophore reaction of BODIPY functions as high ratio double turn on probe," Nature Communications, 2018, 9(362):1-10.
Ma, L., et al., "Live-cell Microscopy and Fluorescence-based Measurement of Luminal pH in Intracellular Organelles," Frontiers in Cell and Developmental Biology, 2017, 5(71):1-18.
Liu, H., et al., "Real-time monitoring of newly acidified organelles during autophagy enabled by reaction-based BODIPY dyes," Communications Biology, 2019, 2(442):1-11.
Teknikel, E., et al., "Colorimetric and fluorometric pH sensor based on bis(methoxycarbonyl)ethenyl functionalized BODIPY," Dyes and Pigments, 2015, 120:239-244.
Wallace, P.K., et al., "Tracking Antigen-Driven Responses by Flow Cytometry: Monitoring Proliferation by Dye Dilution," Cytometry Part A, 2008, 73A:1-17.
Chuo, S. T.-Y., et al., "Imaging extracellular vesicles: current and emerging methods," Journal of Biomedical Science, 2018, 25(91):1-10.
Loudet, A., et al., "BODIPY Dyes and Their Derivatives: Syntheses and Spectroscopic Properties," Chemical Reviews, 2007, 107(11):4891-4932.
Liu, H., et al., "A ratiometric fluorescent probe for real-time monitoring off intracellular glutathione fluctuations in response to cisplatin," Chemical Science, 2020, 11:8495-8501.
Wang, Y.-W., et al., "Dihydronaphthalene-Fused Boron-Dipyrromethene (BODIPY) Dyes: Insight into the Electronic and Conformational Tuning Modes of BODIPY Fluorophores," Chemistry A European Journal, 2010, 16:2887-2903.
Kollmannsberger, M., et al., "Ultrafast Charge Transfer in Amino-Substituted Boron Dipyrromethene Dyes and Its Inhibition by Cation Complexation: A New Design Concept for Highly Sensitive Fluorescent Probes," J. Phys. Chem. A, 1998, 102(50):10211-10220.
Lu, H., et al., "Structrual modification strategies for the rational design of red/NIR region BODIPYs," Chem. Soc. Rev., 2014, 43:4778-4823.
Maus, M., et al., "Monitoring pH and solvent proticity with donor-acceptor-substituted biphenyls: a new approach towards highly sensitive and powerful fluorescent probes by tuning the molecular structure," New J. Chem., 2000, 24:677-686.
Krygowski T., et al., "How H-bonding Modifies Molecular Structure and π-Electron Delocalization in the Ring of Pyridine/Pyridinium Derivatives Involved in H-Bond Complexation," J. Org. Chem., 2005, 70:8859-8865.
Liu, Y., et al., "Dopamine Receptor-Mediated Binding and Cellular Uptake of Polydopamine-Coated Nanoparticles," ACS Nano, 2021, 15:13871-13890.
Xu, W., et al., "Discerning the Chemistry in Individual Organelles with Small-Molecule Fluorescent Probes," Angewandte Chemie International Edition, 2016, 55:13658-13699.
Kalishwaralal, K., et al., "Exosomes for Non-Invasive Cancer Monitoring," Biotechnology Journal, 2019, 14:1-11.
Homolya, L., et al., "Fluorescent Cellular Indicators Are Extruded by the Multidrug Resistance Protein," The Journal of Biological Chemistry, 1993, 268(29):21493-21496.
Mikhailov, A., et al., "Relationship Between Microtubule Dynamics and Lamellipodium Formation Revealed by Direct Imaging of Microtubes in Cells Treated With Nocodazole or Taxol," Cell Motility and the Cytoskeleton, 1998, 41:325-340.
Tang, D.D., et al., "The roles and regulation of the actin cytoskeleton, intermediate filaments and microtubules in smooth muscle cell migration," Respiratory Research, 2017, 18(54):1-12.
Quast, T., et al., "CD81 is essential for the formation of membrane protrusions and regulates Rac1-activation in adhesion-dependent immune cell migration," Blood, 2011, 118(7):1818-1827.
Chambrion, C., et al., "The Tetraspanins CD9 and CD81 Regulate CD9P1-Induced Effects on Cell Migration," Plos One, 2010, 5(6):1-12.
Sesaki, H., et al., "Protrusion of cell surface coupled with single exocytotic events of secretion of the slime in Physarum plasmodia," Journal of Cell Science, 1997, 110:809-818.
Hoshino, D., et al., "Exosome Secretion is Enhanced by Invadopodia and Drives Invasive Behavior," Cell Reports, 2013, 5:1159-1168.

(56) References Cited

OTHER PUBLICATIONS

Kastelowitz, N., et al., "Exosomes and Microvesicles: Identification and Targeting By Particle Size and Lipid Chemical Probes," Chembiochem, pp. 1-7.
McKelvey K.J., et al., "Exosomes: Mechanisms of Uptake," Journal of Circulating Biomarkers, 2015, 4(7):1-9.
Lee, E., et al., "Changes in Actin Filament Organization during Pseudopod Formation," Experimental Cell Research, 1997, 235:295-299.
Ueda, M., et al., "Microtubules are required in amoeba chemotaxis for preferential stabilization of appropriate pseudopods," Journal of Cell Science, 1994, 107:2071-2079.
Ballestrem, C., et al., "Actin-dependent Lamellipodia Formation and Microtubule-dependent Tail Retraction Control-directed Cell Migration," Molecular Biology of the Cell, 2000, 11:2999-3012.
Ma, L., et al., "Discovery of the migrasome, an organelle mediating release of cytoplasmic contents during cell migration," Cell Research, 2015, 25(1):24-38.
Cramer, L.P., et al., "Investigation of the Mechanism of Retraction of the Cell Margin and Rearward Flow of Nodules during Mitotic Cell Rounding," Molecular Biology of the Cell, 1997, 8:109-119.

* cited by examiner isonicotinaldehyde diethyl 2-((1*H*-pyrrol-2-yl)-methylene)malonate

BODIPY

PH-REVERSIBLE LEUCO-BODIPY PROBE FOR IN SITU VISUALIZATION OF EXTRACELLULAR VESICLES AND THEIR SECRETION FROM LIVING CELLS

CROSS-REFERENCE TO RELATED APPLICATION

This application claims the benefit of U.S. Ser. No. 63/219,108, filed Jul. 7, 2021, which is hereby incorporated by reference in its entirety including any tables, figures, or drawings.

BACKGROUND OF THE INVENTION

Extracellular vesicles (EVs), secreted by different cell types to the surrounding, mediate intercellular communication.[1,2] For example, cancer cells secrete "oncosomes" for transferring oncogenic materials to other cells.[3] EVs are also drug carriers for biomedical applications such as immunotherapy and regenerative medicine[4] due to their colloidal stability, low immunogenicity, and effective cellular entry.[5] EVs fall under two main categories, namely ectosomes (about 100-500 nm in size) formed on the cell membrane and released via outward budding and exosomes (about 50-150 nm in size)[6] originating from intraluminal vesicles in the endocytic cisternae that become multivesicular bodies (MVBs) and fuse with the cell membrane for secretion.[7]

Real-time live imaging of EVs in situ (i.e., in cell-seeded medium without the need for harvesting the EVs in advance) will offer insights into the mechanism for secretion of EVs,[8] yet many existing imaging tools are not efficient or feasible. Transmission electron microscopy enables nanoscale visualization of EVs in general[2] and immunofluorescence enables real-time imaging of specific types of EVs by staining markers of intracellular precursor EVs, but both methods do not support live imaging of exocytosis because they require cell fixation. Transfecting cells with plasmids encoding EV markers fused with fluorescent reporters [e.g., green fluorescent protein (GFP)-tagged CD81, a marker for exosomes[1]] empowers confocal imaging of EV secretion from living cells in situ,[9,10] but this method suffers from nonuniform transfection, prolonged protein expression, and cytotoxicity that may affect exocytosis.[11,12] Fluorescent probes modified with functional groups (e.g., aliphatic and carboxylate) for binding to EV membrane or rotor probes that fluoresce only near the EV membrane[13, 14] allow for imaging of harvested EVs, but whether they support in situ visualization of EV secretion is unclear. Near-infrared semiconducting polyelectrolytes, when complexed with aptamers that target different exosome proteins, support the detection of different exosome types in culture medium, but it remains to be shown if they empower real-time imaging of the secretion of EVs.[15]

Therefore, there remains a need for novel probes and methods of using said probes that can support in situ visualization of EVs.

BRIEF SUMMARY OF THE INVENTION

The present invention provides novel probes that can be pH-reversible from a fluorescent version to non-fluorescent version. The present invention further provides methods for visualization of extracellular vesicles (EVs), preferably in cell-seeded culture medium as well as the secretion of EVs from living cells. In certain embodiments, the probes of the subject invention can have a BODIPY (boron dipyrromethene) core-reactive molecular structure. The BODIPY core can be used for tuning of its pKa of about 4 to about 7 and hence its pH-dependent photophysical properties for visualizing cellular processes.

In specific embodiments, the probes of the subject invention can switch from its parent BODIPY form that emits fluorescence to its non-fluorescent leuco-BODIPY form, optionally occurring upon attack by nucleophiles (e.g., water and hydroxide). Nucleophilic attack of the central meso-carbon of the BODIPY form (e.g., by water, hydroxide ions, thiols, or amino acids in culture medium) can cause the loss of it-conjugation and >200 nm blueshift of its absorption peak to its leuco-BODIPY form; reacidification switches the leuco-BODIPY form back to the BODIPY form (FIGS. 1B-1C). The probe can be color-shifting[16] and pH-reversible; it can transform, for example, between its non-fluorescent leuco-BODIPY form under alkaline conditions and its BODIPY form with magenta fluorescence under acidic conditions (FIG. 1A). In certain embodiments, the pH reversibility affords a "pro-fluorophore" approach[17-21] to selectively detect acidic EVs in weakly basic culture medium and intracellular acidic precursor EVs [e.g., late endosomes (pH~5.5-6.0) and recycling endosomes (pH~6.4-6.5)][22] in weakly basic cytoplasm with minimal background interference from free dyes,[23] obviating the need for isolating the EVs for staining and rinsing the cells to remove excess dyes before confocal imaging (FIGS. 1D-1E).

|After engaging secreted EVs in the medium or intracellular precursor EVs that contain acidic lumen, the leuco-BODIPY form of the probe can revert to the BODIPY form with an onset point of fluorescence at a pH of about 7. The probe can assume a non-fluorescent leuco-BODIPY form in weakly basic culture medium, but it can rapidly switch to its fluorescent parent BODIPY form upon acidification in EVs; such pH transition can empower the imaging of EVs with minimal background interference from free dyes in the medium. Upon cellular entry, the probe can also stain acidic vesicles that are eventually secreted as EVs, such as, for example, CD81-enriched exosomes and extracellular multivesicular bodies (MVBs).

In certain embodiments the onset point of fluorescence is a pH about 6 to about 9, about 7 to about 8, or about 7.4 for detection of the EVs; this strategy enables the imaging of EVs with attenuated false positive signals that are often associated with "always-on" fluorescent dyes in medium.[25, 26]

In certain embodiments, the probes of the subject invention can be used to image EVs, such as, for example, CD81-enriched exosomes and extracellular MVBs, selectively and to image EV secretion real-time with limited background noise. The probes of the subject invention can obviate the need for EV isolation prior to imaging, and also offer more sensitive imaging of EVs than a commercial, pH-insensitive molecular fluorescent probes for staining intracellular acidic organelles. In certain embodiments, the probes can offer fundamental insights into the mechanism for EV secretion. In certain embodiments, the probes can be applied jointly with plasmid transfection.

BRIEF DESCRIPTION OF THE DRAWINGS

(FIG. 1A) Reversible transformation between non-fluorescent leuco-BODIPY in near-neutral culture medium (pH of about 7.4) and fluorescent BODIPY upon acidification to pH 7. Nu: nucleophile. (FIG. 1B) Fluorescence emission spectrum as a function of pH in $C_2H_5OH$/PBS (1:1, v/v). (FIG. 1C) Fluorescence emission intensity at 618 nm as a function of pH. (FIG. 1D) Schematic illustration of in situ detection of EVs in conditioned medium (i.e., medium previously cultured with cells). This acid-responsive probe either directly stains EVs that are secreted by cells or enters cells to stain precursor EVs that are later secreted as EVs. Some precursor EVs exit the cell via microtubule trackways. (FIG. 1E) Representative confocal image of a HeLa cell that expresses green fluorescent protein (GFP)-tagged CD81 (marker of exosomes; green) 30 min after addition of the probe (red). Yellow color in the extracellular space indicates EVs in the medium, as evidenced by the colocalization between CD81 and BODIPY. R values indicate the Pearson colocalization coefficients between BODIPY and CD81-GFP.

(FIG. 2A) Confocal images of HeLa cells, A549 cells, and HEK293 cells that express GFP-tagged CD81 were stained with this probe for 30 min. Note that the cells were not rinsed with PBS to retain the secreted EVs in the conditioned medium for in situ imaging. Scale bar=10 μm. R values indicate the Pearson colocalization coefficients between the fluorescence of BODIPY (red) and CD81-GFP (green) in the extracellular region. (FIG. 2B-2D) Hydrodynamic diameter distribution of the EVs secreted by the three cell types that were cultured for 24 h by nanoparticle tracking analysis (NTA).

(FIG. 4C) Real-time formation of EMVBs as detected by this probe. HeLa cells were treated with leuco-BODIPY and imaged by confocal microscopy to generate time-series images. A series of focal plane images of 0.3 μm apart were recorded. Reconstructed 3D images were generated by the Leica LAS-X software. The bottom row shows the enlarged image of the boxed area in the top row. Arrows indicate real-time accumulation of EMVBs. Arrows in different colors (black and green) denote EMVBs at distinct extracellular locations. Scale bar=10 μm.

(FIGS. 5A-5B) HeLa cells and (FIGS. 5C-5D) A549 cells were previously transfected with plasmid encoding EGFP-tagged tubulin before they were treated with leuco-BODIPY for 30 min and imaged by confocal microscopy. Red and green indicate BODIPY and EGFP fluorescence, respectively. Panels A and C show the thinner tubule fibers extended from the cell, and Panels B and D show the thicker pseudopodia. The zoom column panels show the enlargement of the boxed area in the merge column panels. Scale bar=10 μm.

(FIG. 21A) Absorption spectrum as a function of pH in $C_2H_5OH$/PBS (1:1, v/v). (FIG. 21B) Absorbance at 602 nm as a function of pH. (FIG. 21C) Fluorescence emission spectrum as a function of pH in $C_2H_5OH$/PBS (1:1, v/v). (FIG. 21D) Fluorescence emission at 618 nm as a function of pH. (FIG. 21E) Peak absorbance of the probe at 602 nm in $C_2H_5OH$/PBS (1:1, v/v) when the pH alternates between 4.0 and 7.4 for three cycles. (FIG. 21F) Time-course absorbance of the probe at 602 nm upon adjusting the pH from 7.4 to 4.0.

(FIGS. 33A-33B) Adding 2 μM leuco-BODIPY to medium did not lead to detectable signals 3 h postincubation and limited signals 15 h postincubation. (FIG. 33C) Adding 50 nM LysoTracker™ Red (a concentration recommended by the manufacturer) to DMEM led to dot- and speck-like false positive signals 3 h postincubation. (FIG. 33D) Adding 2 μM LysoTracker™ Red (a concentration on par with that of our probe) to DMEM led to severe fluorescence background 3 h postincubation. Regions with detectable false positive fluorescence are boxed by dotted white lines.

DETAILED DISCLOSURE OF THE INVENTION

Figure 1A:
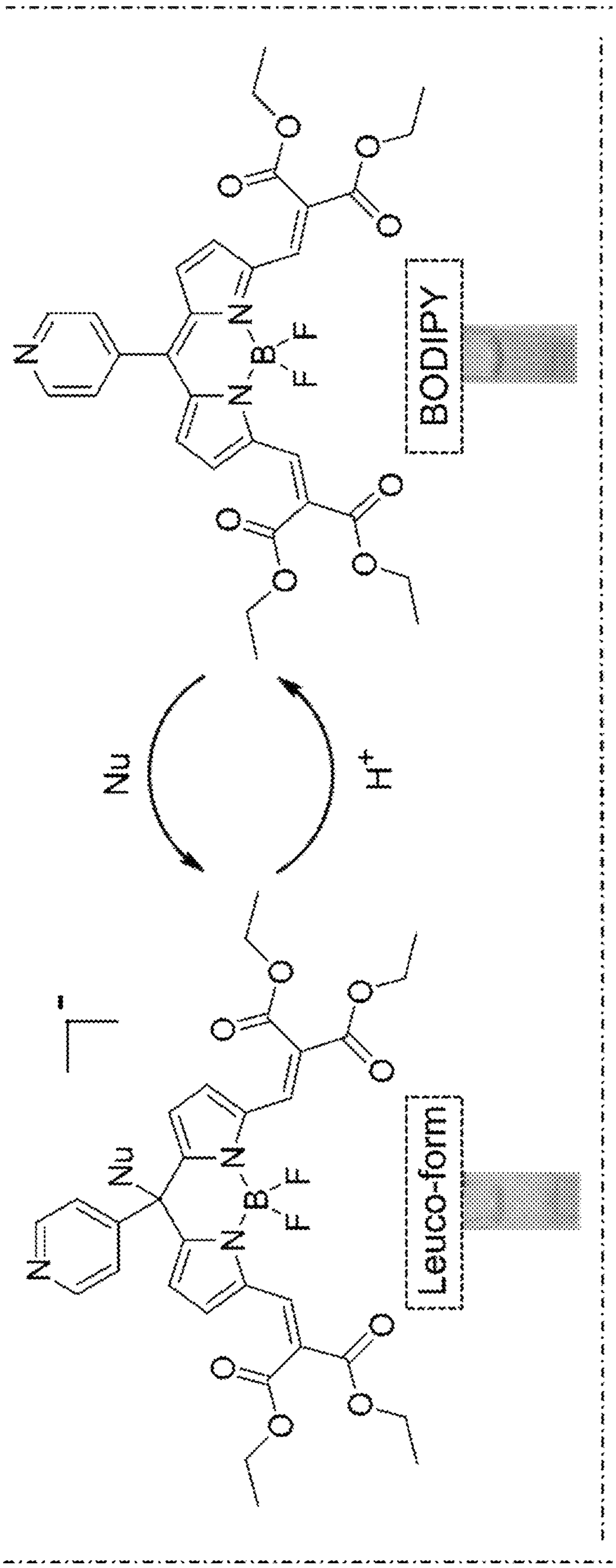
FIGS. 1A-1E. In situ detection of extracellular vesicles (EVs) in cell culture medium by the pH-reversible fluorescent probe.

In certain embodiments, the present invention can be a probe. The probe can be used for visualization, preferably in situ visualization, of EVs, particularly EVs in conditioned medium (i.e., medium harvested from cultured cells) and real-time secretion of EVs, particularly extracellular multivesicular bodies (MVBs).

Selected Definitions

As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising". The transitional terms/phrases (and any grammatical variations thereof) "comprising", "comprises", "comprise", "consisting essentially of", "consists essentially of", "consisting" and "consists" can be used interchangeably.

The phrases "consisting essentially of" or "consists essentially of" indicate that the claim encompasses embodiments containing the specified materials or steps and those that do not materially affect the basic and novel characteristic(s) of the claim.

The term "about" means within an acceptable error range for the particular value as determined by one of ordinary skill in the art, which depends in part on how the value is measured, i.e., the limitations of the measurement system. In the context of compositions containing amounts of ingredients where the terms "about" is used, these compositions contain the stated amount of the ingredient with a variation (error range) of 0-10% around the value (X±10%). In other contexts the term "about" is provides a variation (error range) of 0-10% around a given value (X±10%). As is apparent, this variation represents a range that is up to 10% above or below a given value, for example, X±1%, X±2%, X±3%, X±4%, X±5%, X±6%, X±7%, X±8%, X±9%, or X±10%.

In the present disclosure, ranges are stated in shorthand to avoid having to set out at length and describe each and every value within the range. Any appropriate value within the range can be selected, where appropriate, as the upper value, lower value, or the terminus of the range. For example, a range of 0.1-1.0 represents the terminal values of 0.1 and 1.0, as well as the intermediate values of 0.2, 0.3, 0.4, 0.5, 0.6, 0.7, 0.8, 0.9, and all intermediate ranges encompassed within 0.1-1.0, such as 0.2-0.5, 0.2-0.8, 0.7-1.0, etc. Values having at least two significant digits within a range are envisioned, for example, a range of 5-10 indicates all the values between 5.0 and 10.0 as well as between 5.00 and 10.00 including the terminal values. When ranges are used herein, combinations and subcombinations of ranges (e.g., subranges within the disclosed range) and specific embodiments therein are explicitly included.

As used herein, the terms "associated," "associated with" or "interact," interchangeably with "bound," "or "containing," e.g., "lipid-containing particle," can refer to a variety of different types of contact between, for example, a particle and its components, such as, for example, lipids, proteins, nucleic acids, carbohydrates, glycoproteins, glycolipids, phospholipids, or phosphosphingolipids or between a particle and an optically detectable label that can include, but is not limited to, covalent bonds or non-covalent interactions, non-limiting examples of which include van der Waals interactions, hydrogen bonding, ionic interactions, electrostatic interactions and/or hydrophilic or hydrophobic interactions.

As used herein, the term "sample" refers to a sample comprising at least one extracellular vesicle or intracellular vesicle. In one embodiment, a "biological sample," as that term is used herein, refers to a sample obtained from a subject, wherein the sample comprises at least one extracellular or intracellular vesicle. While not necessary or required, the term "biological sample" is intended to encompass samples that are processed prior to imaging using the systems and methods described herein. For example, a biological sample can be a whole blood sample obtained from a subject, or can be further processed to a serum sample, a platelet sample, an exosome sample As used herein, the term "subject" refers to a plant or animal, particularly a human, from which a biological sample is obtained or derived from. The term "subject" as used herein encompasses both human and non-human animals. The term "non-human animals" includes all vertebrates, e.g., mammals, such as non-human primates, (particularly higher primates), sheep, dog, rodent (e.g., mouse or rat), guinea pig, goat, pig, cat, rabbits, cows, and non-mammals such as chickens, amphibians, reptiles etc. In one embodiment, the subject is human. In another embodiment, the subject is an experimental animal or animal substitute as a disease model. In some embodiments, the term "subject" refers to a mammal, including, but not limited to, murines, simians, humans, felines, canines, equines, bovines, mammalian farm animals, mammalian sport animals, and mammalian pets.

As used herein, the term "extracellular vesicle" or "intracellular vesicle" refers to substantially spherical bodies or membranous bodies from about 1 nm to about 999 μm in size. In some embodiments, the particle is less than 900 μm, less than 800 μm, less than 700 μm, less than 600 μm, less than 500 μm, less than 400 μm, less than 300 μm, less than 200 μm, less than 100 μm, less than 90 μm, less than 80 μm, less than 75 μm, less than 70 μm, less than 60 μm, less than 50 μm, less than 40 μm, less than 30 μm, less than 25 μm, less than 20 μm, less than 15 μm, less than 10 μm, less than 5 μm, less than 2 μm, less than 1 μm, less than 750 nm, less than 500 nm, less than 400 nm, less than 300 nm, less than 200 nm, less than 100 nm, less than 50 nm, less than 40 nm, less than 30 nm, less than 20 nm, less than 10 nm, less than 5 nm, or smaller. Examples of intracellular vesicles include multivesicular bodies, lysosomes, late endosomes, early endosomes, and autolysosomes. Examples of extracellular vesicles include liposomes, exosomes, ectosomes, microvesicles, oncosomes, and migrasomes.

As used herein, the terms "determining," "measuring," and "assessing," and "assaying" are used interchangeably and include both quantitative and qualitative determinations.

As used herein, the term "BODIPY unit" refers to a structural subunit of the multichromophore which includes a chromophore having the following boron-dipyrromethene (BODIPY) core structure:

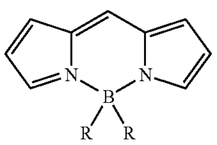

As used herein, the term "π conjugated" refers delocalization of pi electrons across adjacent units.

As used herein, an "electron withdrawing group" or "EWG" is a chemical group that reduces electron density in a molecule through the carbon atom to which it is bonded. By reducing the electron density on adjacent carbon atoms, EWGs change the reactivity of a molecule. Some examples of EWGs include, for example, nitro groups (—$NO_2$), aldehydes (—CHO), ketones (—C═OR), cyano groups (—CN), carboxylic acid (—COOH), esters (—COOR), or halogens (—Cl, —Br, —I).

As used herein, "a pro-fluorophore" is a non-fluorescent compound that transforms to its parent fluorophore when reacted with the analyte or responses to stimuli. For example, the leuco-BODIPY form is a non-fluorescent pro-fluorophore; upon acidification in intracellular or extracellular vesicles, the pro-fluorophore converts to its fluorescent BODIPY form.

Probes

In certain embodiments, a novel BODIPY-based probe or the leuco-BODIPY form are provided by the subject invention. Additionally, derivatives are of the BODIPY or leuco-BODIPY forms of the probes are also provided. Derivatives of the BODIPY form of the probe can contain different electron withdrawing groups, such as, for example, iodine, cyano, pyridine, trifluoroethyl, or carbonyl, at the meso-, alfa-, and/or beta-position of the indacene core.

Figure 7:
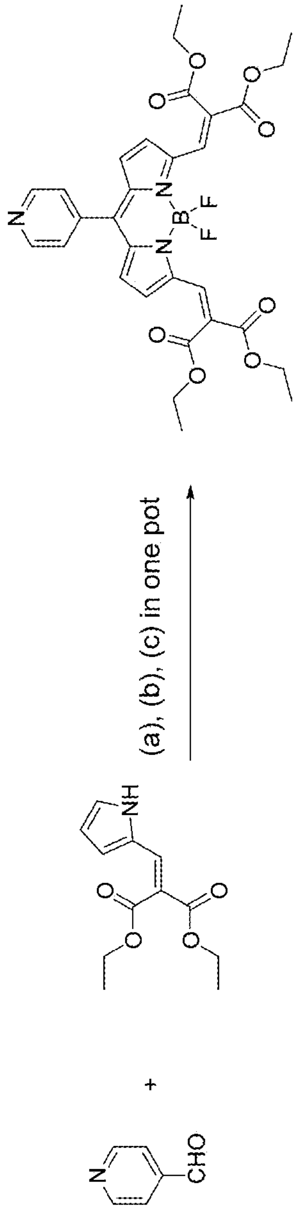
FIG. 7. Synthesis of BODIPY. The reagents and reactants include (a) trifluoroacetic acid, (b) 2,3-dichloro-5,6-dicyano-1,4-benzoquinone, and (c) triethylamine, $BF3 \cdot Et_2O$.

The probes of the subject invention can be prepared via conventional condensation of isonicotinaldehyde with diethyl 2-((1H-pyrrol-2-yl)methylene)malonate, followed by oxidation and cyclization (FIG. 7).[19-20] Briefly, isonicotinaldehyde and diethyl 2-((1H-pyrrol-2-yl)methylene)malonate can be dissolved in dry dichloromethane under nitrogen. After adding trifluoroacetic acid, the reaction mixture can be mixed under reflux for about 1 day to about 5 days, or about 2 days or until the complete consumption of pyrrole, as indicated by, for example thin-layer chromatography. Next, after adding dichlorodicyanobenzoquinone, the mixture can be stirred for about 10 minutes to about 3 h or about 1 h at room temperature. In certain embodiments, triethylamine and 15 mL of boron trifluoride etherate can be added, followed by heating under reflux for about 4 to about 12 hour, or about 8 h. The solution can be washed with water, saturated sodium bicarbonate solution, dried over anhydrous sodium sulfate, and concentrated under reduced pressure.

The subject invention further provides methods for the derivatization and purification, at both small- and large-scale levels of preparation. In certain embodiments, the product can be purified by silica gel column chromatography using DCM and recrystallized from acetonitrile/hexane.

In certain embodiments, the probes of the subject invention can be stored in DMSO, preferably about 1 mM DMSO. The molecule can also be stored in other organic solvents, such as tetrahydrofuran, acetonitrile, dichloromethane, and dimethylformamide. Typical storage concentrations can range from 10 μM to 100 mM.

In certain embodiments, the BODIPY core can be used for tuning of its pKa and hence its pH-dependent photophysical properties for visualizing cellular processes. In certain embodiments, the pKa of the BODIPY core can be about 4 to about 7. The tuning of the electron withdrawing groups can permit the creation of dye structures of different pKa values.

In certain embodiments, the probes of the subject invention can switch from the BODIPY form that emits fluorescence to its non-fluorescent leuco-BODIPY form. In certain embodiments, the switch can occur upon attack by nucleophiles (e.g., water and hydroxide). The switch can happen rapidly. Conversely, after engaging secreted EVs or intracellular precursor EVs that contain acidic lumen, the leuco-BODIPY form of the probe reverts to the BODIPY form with an onset point of fluorescence at a pH of about 7. The probe can assume a non-fluorescent leuco-BODIPY form in weakly basic culture medium, but it can rapidly switch to its fluorescent parent BODIPY form upon acidification in EVs; such pH transition can empower the imaging of EVs with minimal background interference from free dyes in the medium. The switch between leuco-BODIPY to parent BODIPY or from parent BODIPY to leuco-BODIPY can occur within about 5 min, about 4 min, about 3 min, about 2 min, about 1 min, about 45 s, about 30 s, about 15 s, about 10 s, about 5 s, or about 1 s. In culture medium, the pH is weakly basic (7.4). In basic environments, the probe molecule assumes its non-fluorescent leuco-BODIPY form. In acidic EVs, the probe molecule assumes is bright fluorescent BODIPY form. As a result, detection of the EVs in culture medium can have limited background interference from the free probe molecules. In certain embodiments, the probes of the subject invention are according to formula (I), formula (II), formula (III), formula (IV), formula (V), formula (VI), formula (VII), formula (VIII), formula (IX), formula (X), formula (XI), formula (XII), formula (XIII), formula (XIV), A BODIPY Compound is the Formula (I)

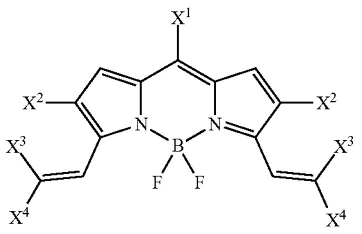

BODIPY form

-continued
Formula (II)
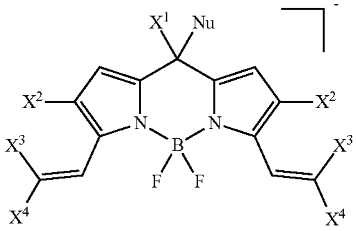
Leuco-BODIPY form
in which $X^1$ represents:
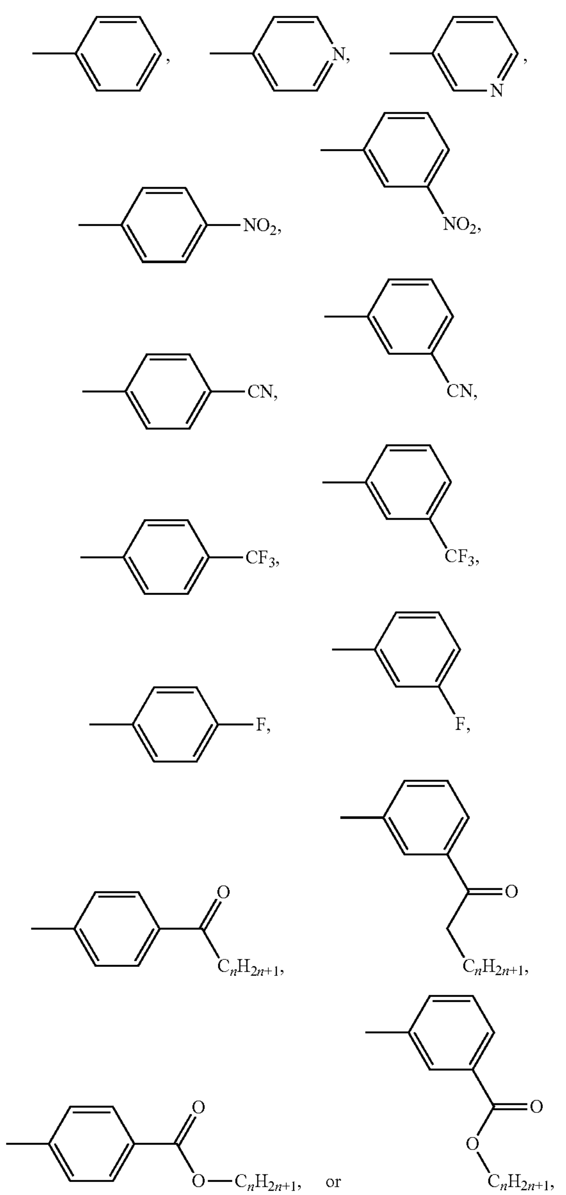
or
(n=1-10) $X^2$—$X^4$ independently represents: —H, —$NO_2$, —$COC_nH_{2n+1}$, —CN, —COO $C_nH_{2n+1}$, —F, or —I, (n=1-10)
Additional examples of probes according to the subject invention include the following:
Formula (III)
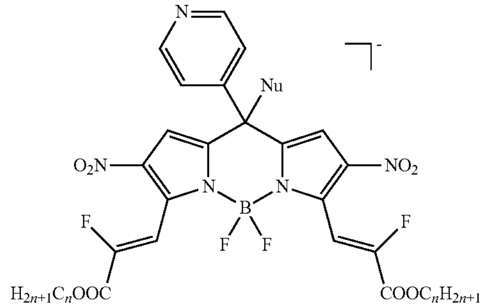
Formula (IV)
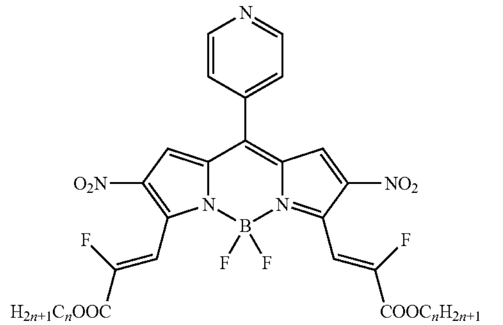
Formula (V)
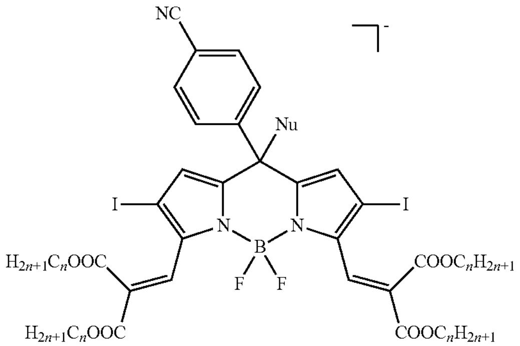
Formula (VI)
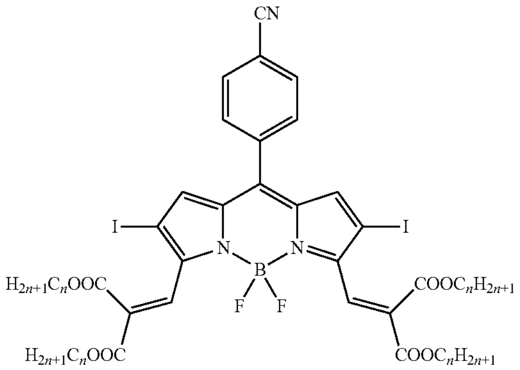

-continued

Formula (VII)

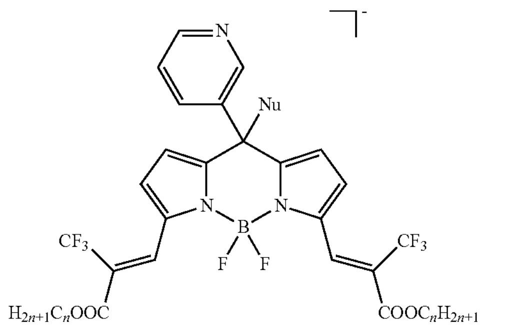

Formula (VIII)

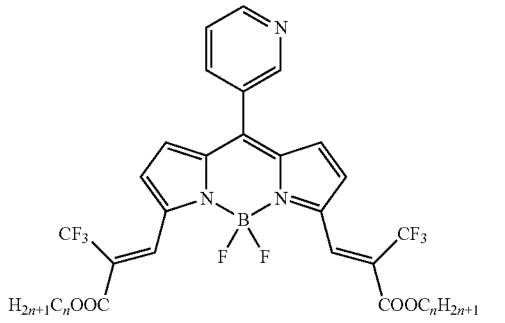

Formula (IX)

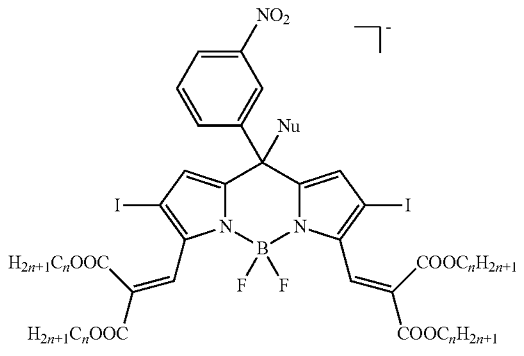

Formula (X)

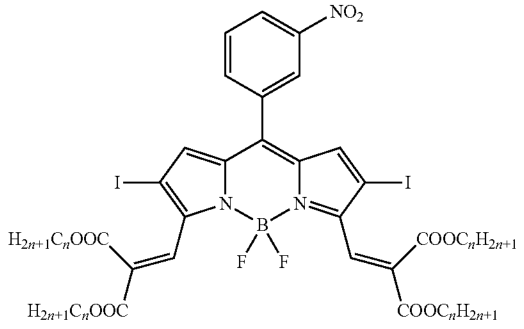

-continued

Formula (XI)

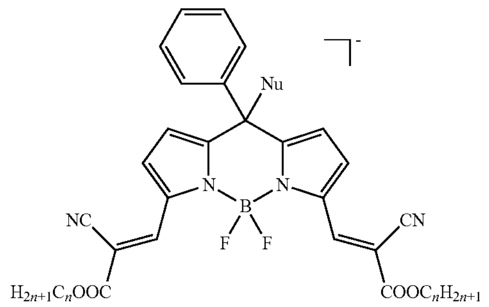

Formula (XII)

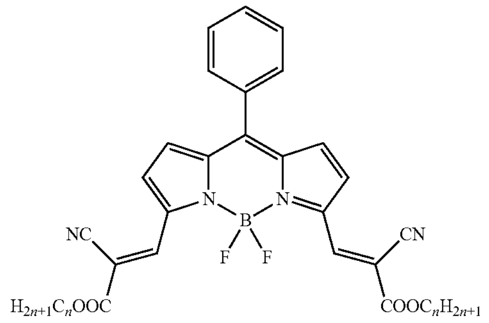

A BODIPY Compound is the Formula (XIII)

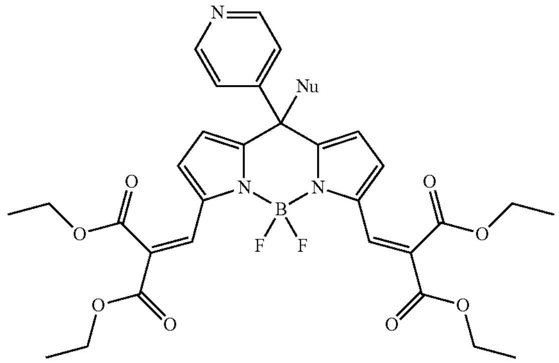

A BODIPY Compound is the Formula (XIV)

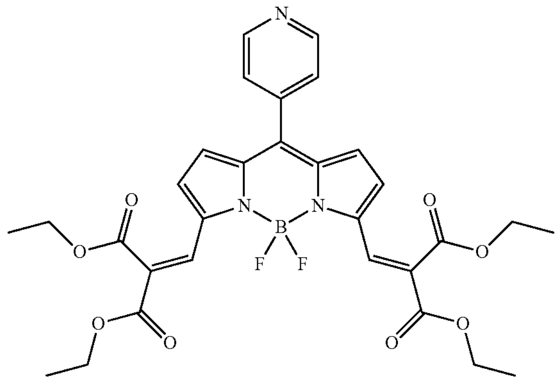

Methods of Using the Probes

In certain embodiments, the subject invention provides methods for the detection of an acidic environment inside the cell (e.g., lysosomes) or outside the cell (e.g., extracellular vesicles) by the novel probes of the subject environment.

Applications of these new probes for the detection or tracking the movement of extracellular and intracellular vesicles using fluorescence detection are also presented.

In certain embodiments, any sample can be tested using the methods and probes described herein, provided that the sample comprises at least one extracellular vesicle or intracellular vesicle (e.g., an exosome). The term "biological sample" can refer to any sample containing an extracellular or intracellular vesicle, such as, for example, blood, plasma, serum, urine, gastrointestinal secretions, homogenates of tissues or tumors, circulating cells and cell particles (e.g., circulating tumor cells), synovial fluid, feces, saliva, sputum, cyst fluid, amniotic fluid, cerebrospinal fluid, peritoneal fluid, lung lavage fluid, semen, lymphatic fluid, tears, prostate fluid, cell culture media, or cellular lysates. A sample can also be obtained from an environmental source, such as water sample obtained from a lake or other body of water, a liquid sample obtained from a food source, or a plant sample.

In certain embodiments, the probes of the subject invention can be used to image EVs, such as, for example, CD81-enriched exosomes and extracellular MVBs, in cell-seeded medium selectively and to image EV secretion real-time with limited background noise. The probes of the subject invention can obviate the need for EV isolation prior to imaging, and also offer more sensitive imaging of EVs than a commercial, pH-insensitive molecular fluorescent probes for staining intracellular acidic organelles.

The probes of the subject invention can be a reaction-based; specifically, the probes can be pH-reversible and can transform between its non-fluorescent leuco-BODIPY form under alkaline conditions and its BODIPY form with magenta fluorescence under acidic conditions (FIG. 1A). In certain embodiments, the probes of the subject invention are in its non-fluorescent leuco-BODIPY form at a pH of about 7.1, about 7.2, about 7.3, about 7.4, about 7.5, about 7.6, about 7.7, about 7.8, about 7.9, about 8, about 8.5, about 9, about 9.5, or about 10. In certain embodiments, the probes of the subject invention are in its BODIPY form at a pH of about 2.0 to about 7.0, about 2.0 to about 6.5, about 2.0 to about 5.5, about 2.0 to about 5.25, about 3.0 to about 5.0, or about 4.0. In certain embodiments, the probe can transform between its non-fluorescent leuco-BODIPY and its BODIPY at a pH of about 6 to about 9, about 7 to about 8, about 7.1, about 7.2, about 7.3, about 7.4, about 7.5, about 7.6 about 7.7, about 7.8, or about 7.9.

Figure 1B:
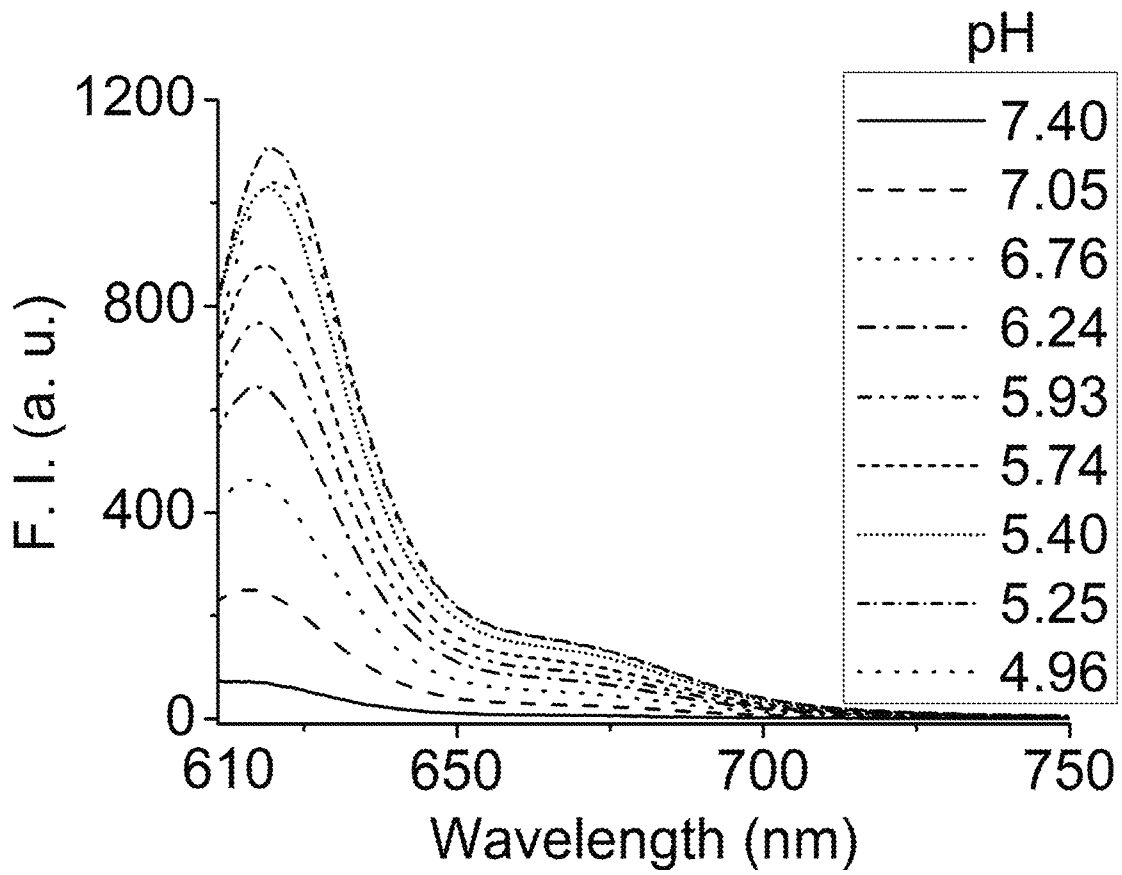
Figure 1C:
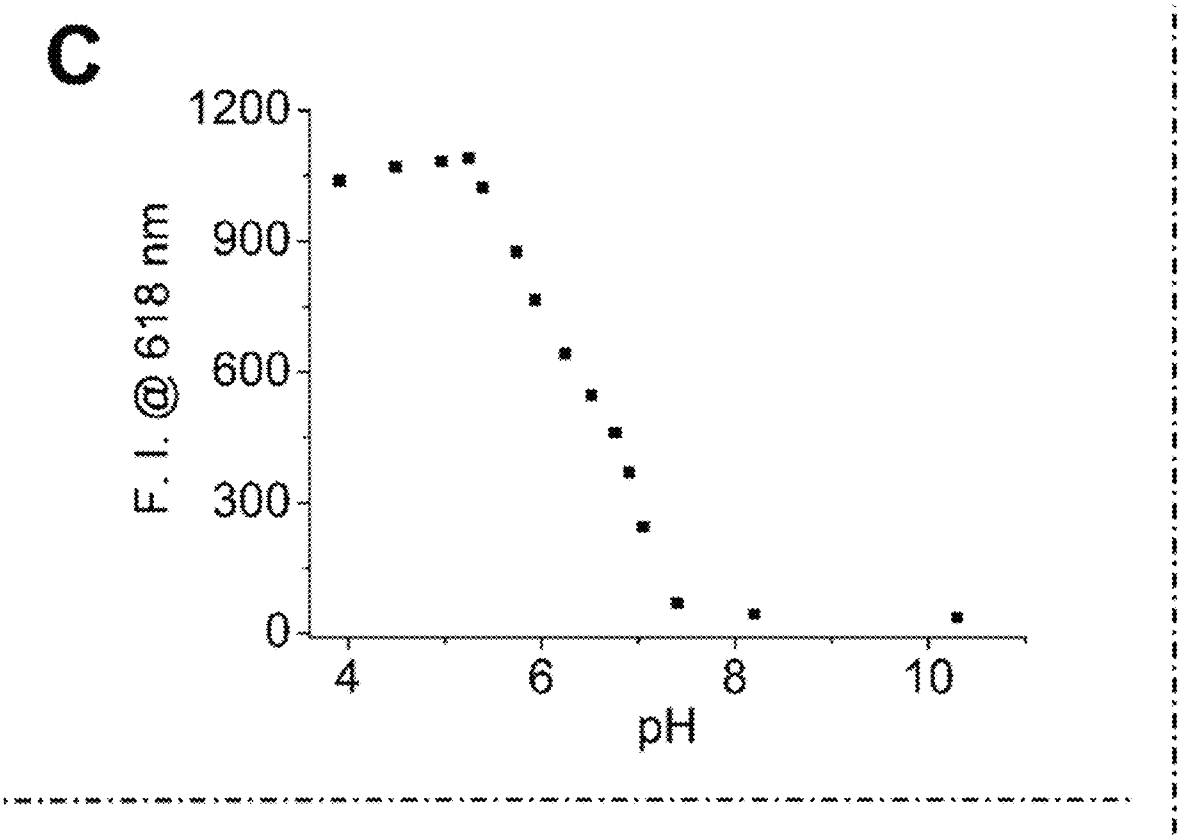
Figure 1D:
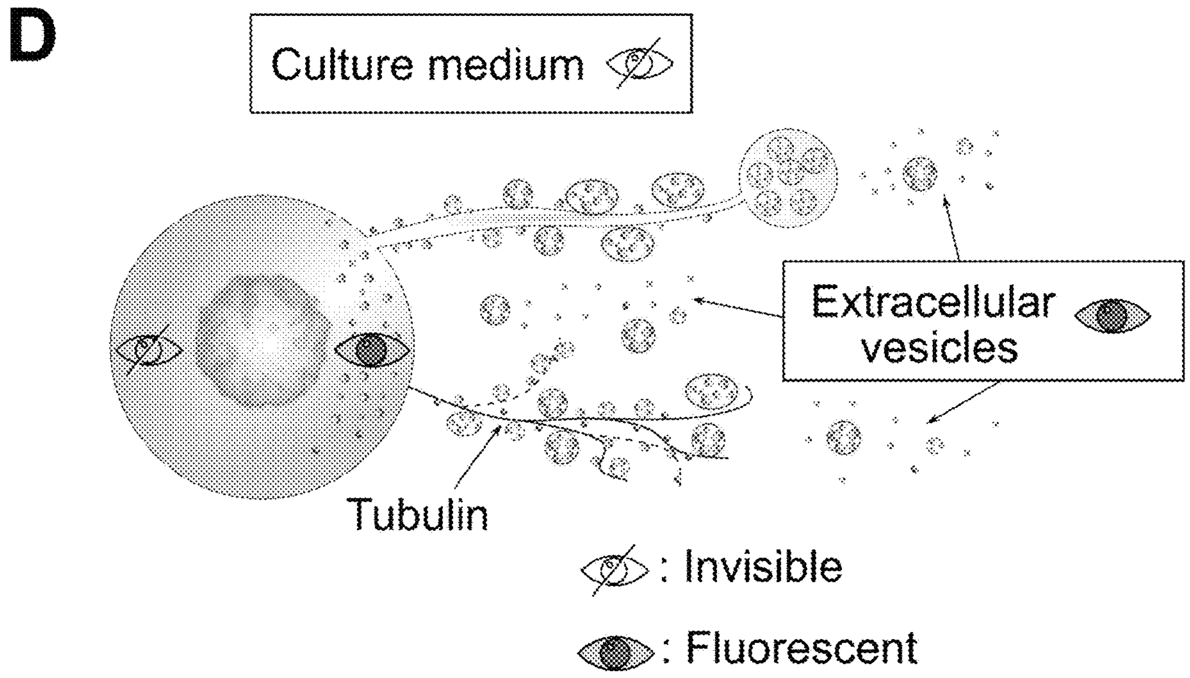
Figure 1E:
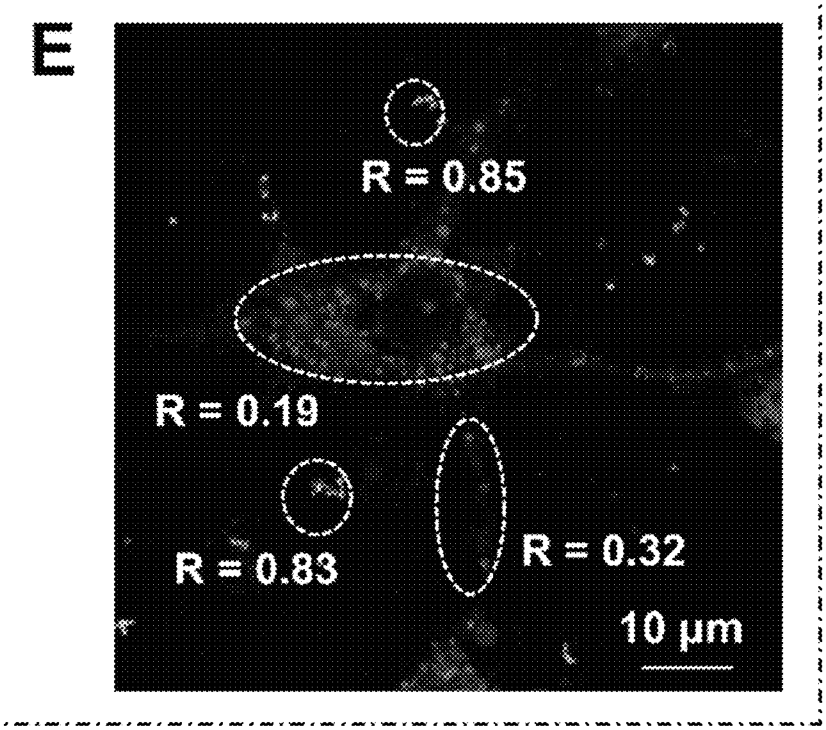

In certain embodiments, nucleophilic attack of an electron withdrawing group of the probe, such as, for example, the central meso-carbon of the BODIPY form by, for example, water or hydroxide can cause the loss of it-conjugation and about a 200 nm or greater blueshift of its absorption peak to its leuco-BODIPY form. In certain embodiments, reacidification of the compound switches the leuco-BODIPY form back to the BODIPY form (FIGS. 1B-1C). In certain embodiments, the pH reversibility can afford a "pro-fluorophore" approach to selectively detect acidic EVs in weakly basic culture medium and intracellular MVBs with minimal background interference from free dyes, obviating the need for rinsing the cells to remove excess dyes before confocal imaging (FIGS. 1D-1E).

In certain embodiments, the probe of the subject invention can be added to a sample. The probe can be at a concentration about 0.1 μM to about 100 μM, about 1 μM to about 10 μM, or about 5 μM. The probe can be dissolved in dimethyl sulfoxide (DMSO), at a concentration of about 0.001% to about 10%, about 0.01% to about 5%, about 0.1% to about 1%, or about 0.5%.

In certain embodiments, the sample can contain cells and can specifically comprise living cells. The cells can be any type of cultured cell such as, for example, HeLa, A549, or HEK3923. In certain embodiments, the cells can express fluorescent tags, such as for example GFP-tagged CD81. In certain embodiments, within about 1 min, about 2 min, about 3 min, about 5 min, about 10 min, about 15 min, about 30 min, about 45 min, about 60 min, or about 2 hours of adding the probes of the subject invention to a sample, the EVs can be visualized. In certain embodiments, the probes and methods of using said probes can be employed at a temperature of about 4° C. to about 50° C. or about 4° C. to about 37° C. or about 18° C. to about 27° C. In certain embodiments, the EVs can be visualized, by, for example, confocal microscopy without harvesting the EVs or rinsing the cells. In certain embodiments, the probes of the subject invention can be used to visualize of intracellular precursor EVs before their secretion to the extracellular milieu. In certain embodiments, the EVs can be visualized after incubation with the probes when exposed to a light wavelength of about 585 nm to about 710 nm. In certain embodiments, other fluorescence intensity-based microscopic and detection methods can be used, such as, for example, fluorescence microscopy, confocal imaging, two-photon imaging, and super-resolution microscopy (SIM or STROM).

In certain embodiments, using the probes of the subject invention, the movement of vesicles can be tracked over a period of times, such as, for example, about 1 millisecond, about 10 milliseconds, about 100 milliseconds, about 1 second, about 2 seconds, about 5 seconds, about 15 seconds, about 30 seconds, about 1 min, about 5 min, about 10 min, about 30 min, about 1 hour, about 2 hours, about 3 hours, about 5 hours, about 6 hours, about 12 hours, about 24 hours, about 3 days, or about 1 week. A series of images over a period of time or movies can be captured to establish the movement of vesicles.

In certain embodiments, the probes of the subject invention can enter a cell. Upon cellular entry, the probes can also stain acidic vesicles. The intracellular vesicles can eventually be secreted as EVs. Examples of intracellular vesicles include, for example, CD81-enriched exosomes and extracellular multivesicular bodies (MVBs).

In certain embodiments, the probes can be applied jointly with plasmid transfection. In certain embodiments, the probes of the subject invention can be used with transfection of plasmids encoding CD81 (an exosome marker) and tubulin (a cytoskeleton marker) that are tagged with green fluorescent protein (GFP). In certain embodiments, compositions and methods can be used for other plasmids well-known in the art that encode a target gene fused with a fluorescent reporter protein.

Materials and Methods

All reagents were obtained from commercial suppliers and used without further purification unless otherwise indicated. Oxygen-sensitive, water-sensitive, or light-sensitive reactions were carried out under nitrogen atmosphere using oven dried glassware and covered by aluminum foil. Dichloromethane (DCM) was distilled over calcium hydride. $^1$H NMR spectra were obtained in the indicated solvents with a Bruker DRX500 instrument. Chemical shifts are given in ppm with the residual solvent peaks used as the reference signals. Coupling constants are given in Hz. High-resolution mass spectrometry (HRMS) spectra were recorded on a Thermo Scientific Q Exactive MS (Waltham, MA).

Synthesis of BODIPY

BODIPY was prepared via condensation of isonicotinaldehyde with diethyl 2-((1H-pyrrol-2-yl)methylene)malonate, followed by oxidation and cyclization (FIG. 7).[1,2] Briefly, isonicotinaldehyde (2 mmol; Macklin, 99%) and diethyl 2-((1H-pyrrol-2-yl)methylene)malonate (2 mmol; B&P Biotech, Taipei, Taiwan, 97%) were dissolved in 50 mL of dry dichloromethane [DCM; analytical research (AR) grade distilled over calcium hydride] under nitrogen, covered by aluminum foil. After adding 0.3 mL of trifluoroacetic acid (TFA; Macklin, AR, 99%), the reaction mixture was mixed under reflux for 2 d or until the complete consumption of pyrrole, as indicated by thin-layer chromatography. Next, after adding 454 mg of dichlorodicyanobenzoquinone (DDQ, 2 mmol), the mixture was stirred for 1 h at room temperature. After that, 3 mL of triethylamine (TEA; Macklin, AR, 99%) and 15 mL of boron trifluoride etherate (Macklin, 98%) was added, followed by heating under reflux for 8 h. The solution was washed with water, saturated sodium bicarbonate solution (AR grade), dried over anhydrous sodium sulfate (AR grade), and concentrated under reduced pressure. The product was purified by silica gel column chromatography using DCM and recrystallized from acetonitrile/hexane.

Characterization of BODIPY

BODIPY was obtained as green metallic crystals (95.6 mg, 15.1% yield). The structure was confirmed by $^1$H-NMR, $^{13}$C-NMR and HRMS spectra. $^1$H NMR (500 MHz, $CDCl_3$) δ 8.85 (d, J=4.5 Hz, 2H), 8.18 (s, 2H), 7.50 (d, J=4.8 Hz, 2H), 6.82 (s, 4H), 4.37 (qd, J=7.1, 1.3 Hz, 8H), 1.36 (dt, J=15.9, 7.1 Hz, 12H). $^{13}$C NMR (126 MHz, $CDCl_3$) δ 165.85, 163.12, 151.68, 149.40, 141.01, 136.77, 131.71, 131.09, 129.02, 124.71, 121.44, 62.32, 62.31, 14.14, 13.97. HRMS (ESI) m/z calculated for $[C_{30}H_{30}BF2N_3O_8Na]^+$ 632.1986; found: m/z $[M+Na]^+$ 632.1987.

pH-Dependent Spectroscopic Properties

In each step of pH titration, small volumes (2-10 μL) of HCl at appropriate concentrations (0.1, $10^{-2}$, or $10^{-3}$ M) were pipetted directly into the measurement cell, followed by filling up with 2 mL of 1 μM dye-containing solution [either in a mixture of PBS/ethanol 1:1 (v/v) or 0.5% (v/v) DMSO]. The pH was monitored at 298 K using a digital pH meter (827 pH lab) equipped with a Biotrode (Metrohm, Herisau, Switzerland). Calibration of the instrument was performed with standard aqueous solutions of pH 4, 7, and 9 from Metrohm. Absorption and fluorescence measurements were carried out on an Agilent Cary 5000 spectrophotometer and a Horiba Jobin Yvon spectrometer (Nanolog FL3-2iHR), respectively.

General Cell Culture

Pre-seeded in 35-mm confocal dishes (SPL Life Sciences) at 30%-50% confluence, HEK293 cells, HeLa cells, and A549 cells (ATCC) were grown in complete Dulbecco's Modified Eagle Medium [DMEM (Gibco); supplemented with 10% fetal bovine serum (FBS, Gibco) and 1% penicillin-streptomycin (Gibco)] at 37° C. and 5% $CO_2$.

Pathway for the Cellular Entry of the Probe.

Cells were firstly cultured in a 96-well plate and allowed to reach about 90% confluence. In our first experiment, the cells were either pretreated in 0.1 mL of complete DMEM containing 5 mM $NaN_3$ (Sigma) at 37° C. for 3 h. After that, the medium was replaced by 0.1 mL of complete medium containing 5 mM $NaN_3$ and 5 μM leuco-BODIPY (in 0.5% DMSO) at 37° C. for another 30 min. In our second experiment, the cells were preincubated with 0.1 mL of complete DMEM inside a 4° C. refrigerator for 30 min. After that, the medium was replaced by 0.1 mL of complete medium containing 5 μM leuco-BODIPY (in 0.5% DMSO) for another 30 min and incubated at 4° C. As the blank negative control, cells were incubated with 0.1 mL of complete medium containing 5 μM leuco-BODIPY (in 0.5% DMSO) at 37° C. for 30 min. At the end of both experiments, the fluorescence of the treated cells was measured by a microplate reader (ThermoFisher Fluoroskan Ascent, Waltham, MA) at an excitation wavelength of 584 nm and emission wavelength of 612 nm.

Preparation of Plasmids

The plasmid encoding human mPA-GFP-CD81-10 (Addgene; #57124, Watertown, MA) or human EGFP-tubulin-6 (Addgene; #56450) were transformed using the heat-shock method. Briefly, 1-10 ng of plasmid was mixed with 50 μL of DH5α competent cells (Invitrogen, Waltham, MA). The mixtures were incubated on ice for 30 min, heat-shocked at 42° C. for 90 s, and then incubated on ice for another 2 min. Subsequently, 950 μL of pre-warmed 2% lysogeny broth (LB; Sigma, St. Louis, MO) was added, and the cells were incubated for 1 h at 37° C. with orbital shaking of 225 rpm. Then, 20-200 μL of the transformed cells was spread on a LB-agar plate containing 100 μg/mL ampicillin (J&K Chemical, San Joe, CA) and incubated at 37° C. overnight. A negative control was performed with pUC19-transformed DH5α competent cells. One colony from each plate was picked and grown in 500 mL of LB/ampicillin (100 μg/mL) for 16 h at 37° C. under shaking at 225 rpm. Cells were collected by centrifugation at 3600×g for 15 min and the plasmids were purified using the Qiagen Plasmid Midiprep Kit (Hilden, Germany) per the supplier's protocol.

Transfection of Plasmids

Pre-seeded in 35-mm confocal dishes (SPL Life Sciences, Pocheon, South Korea), cells were grown to the desired confluence before transfection. The transfection medium, formulated in 1 mL of OptiMEM (Gibco, Waltham, MA), contains 7.5 μL of Lipofectamine 3000 (Invitrogen) and either 2.5 μg/mL GFP-CD81 or EGFP-tubulin-6 plasmids. After incubating the cells with the transfection medium for 4 h, the cells were switched to 2 mL of plasmid-free complete DMEM for 2 d. After that, the transfected cells were incubated with leuco-BODIPY for further confocal imaging.

Confocal imaging of EVs or precursor EVs To prepare the stock of the probe for our cell-based experiments, BODIPY was pre-dissolved in 100% DMSO (2 mM). After dissolution, the probe predominantly assumes the leuco-BODIPY form, as evidenced by its light-yellow color. Cells that express marker proteins of interest (i.e., GFP-tagged CD81 or EGFP-tagged tubulin-6) were pre-seeded in 35-mm confocal dishes. After removing the culture medium, the transfected cells were incubated with 1 mL of 2 μM leuco-BODIPY [dissolved in phenol red-free DMEM (Gibco) with 0.5% DMSO (Invitrogen) for solubilization] for 30 min. The EVs in the medium or precursor EVs inside cells were imaged under a Leica SP8 confocal microscope with a 63× objective. The excitation wavelengths of the GFP-tagged proteins and BODIPY were 488 nm and 575 nm, respectively. The emission wavelengths of the GFP-tagged proteins and BODIPY were 495-525 nm and 585-710 nm, respectively. All images were taken at the same laser settings.

Nanoparticle Tracking Analysis (NTA)

EV samples were diluted with filtered PBS (0.2 μm) to obtain an EV concentration of $10^8$-$10^9$ particles/mL. For each sample, four 1-min videos were recorded when introduced about 1 mL of the conditioned medium to the NTA system (Malvern NanoSight NS500, Malvern, UK). The temperature was kept at about 18° C. Images in each video were analyzed with NTA 3.1 Build 3.1.45 software (Malvern). Auto settings were used for blur size and maximum jump distance. 2000 frames were examined per sample. To investigate the effect of dye staining on EV secretion by cells, 1 mL of EV samples isolated from dye-treated cells and untreated cells were collected and injected separately into the Nanosight instrument for comparison of their EV size distribution profiles.

Estimation of the Fluorescence Signal Per EV

Cells were pre-seeded in a 96-well plate in complete DMEM without phenol red. During the experiment, 200 μL of either fresh complete DMEM without phenol red or 5 μM leuco-BODIPY formulated in fresh complete DMEM without phenol red was added to the cells. After 30 min, the medium was collected and centrifuged for 10 min at 200×g to remove any dye-stained cell debris. The fluorescence signal in the medium was measured by a fluorescent plate reader (ThermoFisher Fluoroskan Ascent) at an excitation wavelength of 584 nm and emission wavelength of 612 nm. The net fluorescence in the dye-treated EV sample was determined by subtracting the background fluorescence of the untreated EV sample from the fluorescence of the dye-treated EV sample. Complete DMEM without phenol red was also used as a control to determine the background fluorescence of the blank culture medium. After the microplate reader experiment, each EV sample was made up to a total of 1 mL by adding DMEM without phenol red, followed by injection into a Malvern Nanosight NS500 instrument for measuring the total number of EVs in the sample. Depending on the cell type, the number of EVs secreted by the cells during the 30-minute period may range from $3\times10^8$ to $7\times10^8$. NTA confirmed that similar amounts of EVs were secreted by both untreated and dye-treated cells. The fluorescence signal per EV was estimated by dividing (1) the net fluorescence (with background subtraction) of the EV sample as measured by the microplate reader by (2) the number of EVs in the sample as measured by NTA.

Statistics and Reproducibility.

All imaging studies were repeated at least twice, with at least two biological replicates analyzed in each study. Cells were divided randomly into experimental groups. Software used for image analysis include Image J and Leica LAS-X.

All patents, patent applications, provisional applications, and publications referred to or cited herein are incorporated by reference in their entirety, including all figures and tables, to the extent they are not inconsistent with the explicit teachings of this specification.

Following are examples that illustrate procedures for practicing the invention. These examples should not be construed as limiting. All percentages are by weight and all solvent mixture proportions are by volume unless otherwise noted.

Example 1—Evidence of the Formation of Leuco-BODIPY

Figure 8:
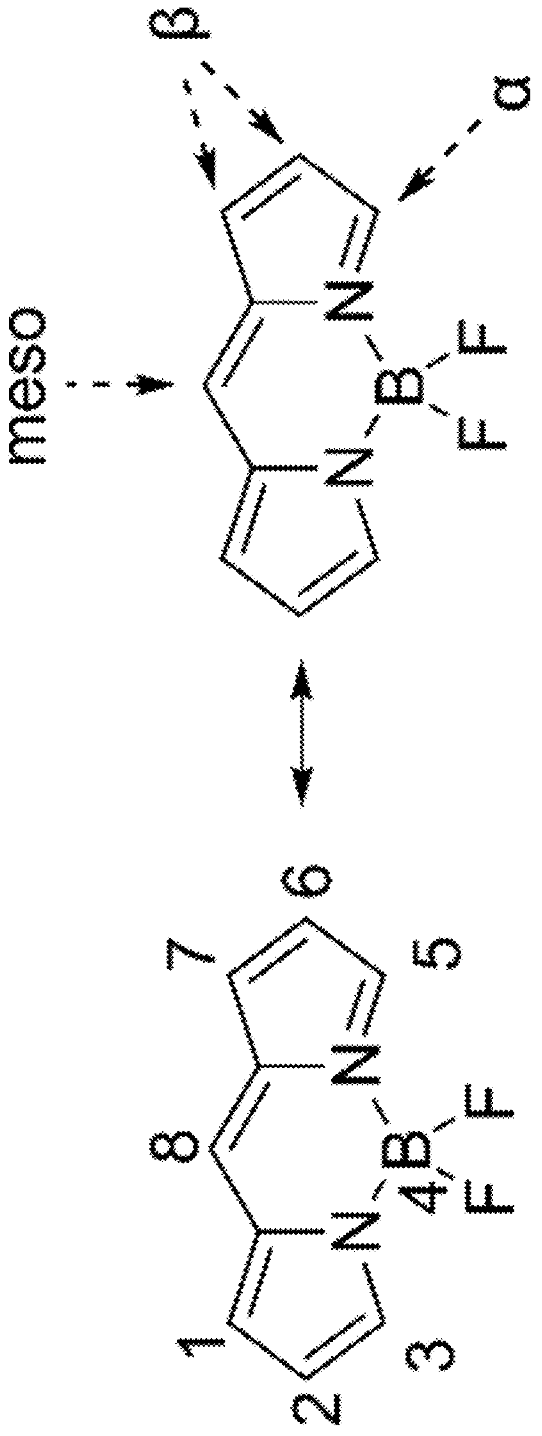
FIG. 8. The IUPAC numbering system of BODIPY dyes. The 8-position is often referred to as the meso-carbon, the 1-, 2-, 6-, and 7-positions are referred to as β-carbons, and the 3-, 5-positions are referred to as α-carbons.
Figure 9:
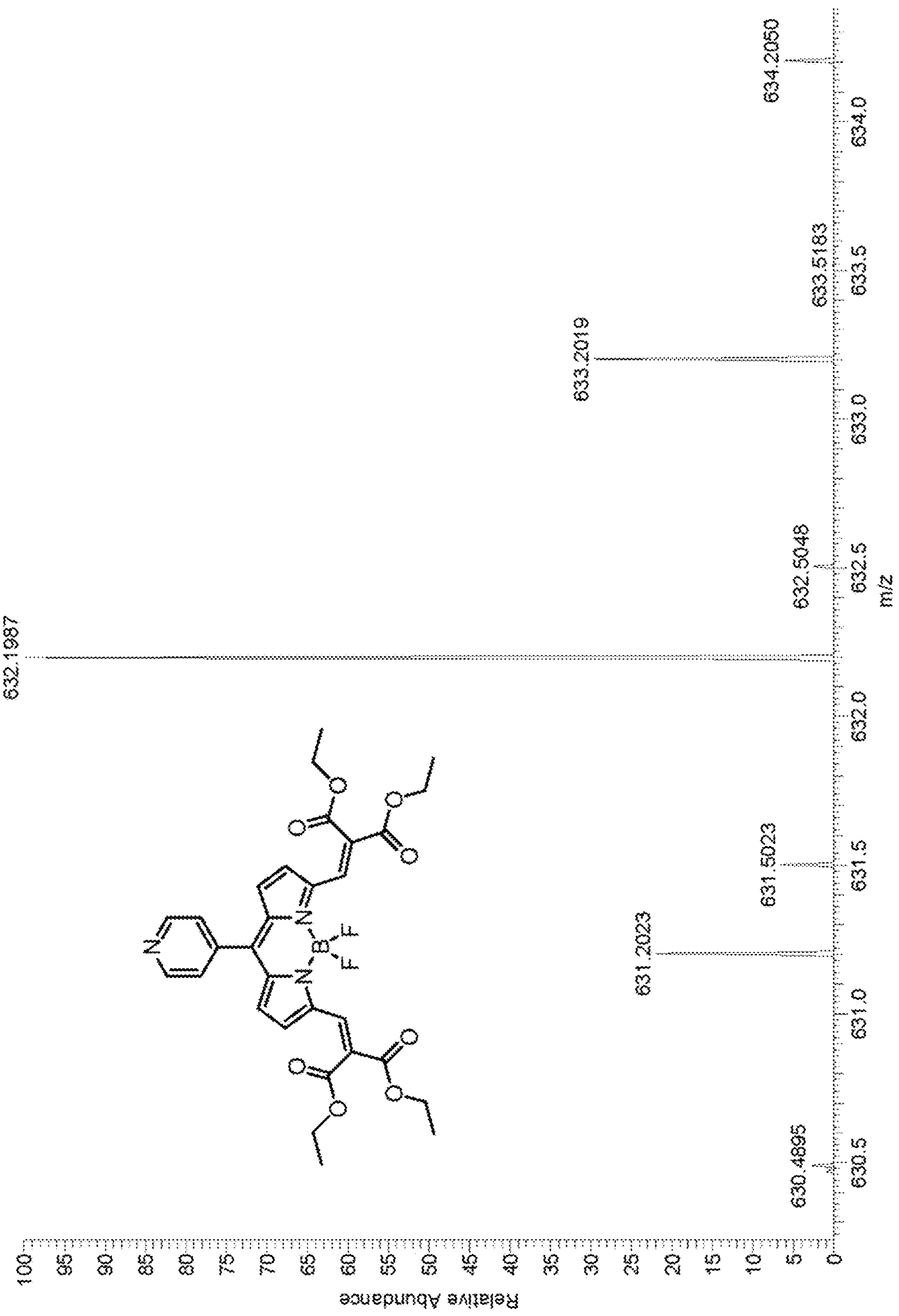
FIG. 9. High-resolution mass spectrometry (HRMS) spectrum of BODIPY. The mass-to-charge ratio (m/z) of 632.1987 was ascribed to the cation signal of BODIPY with a $Na^+$ ion $[BODIPY-Na]^+$.
Figure 10:
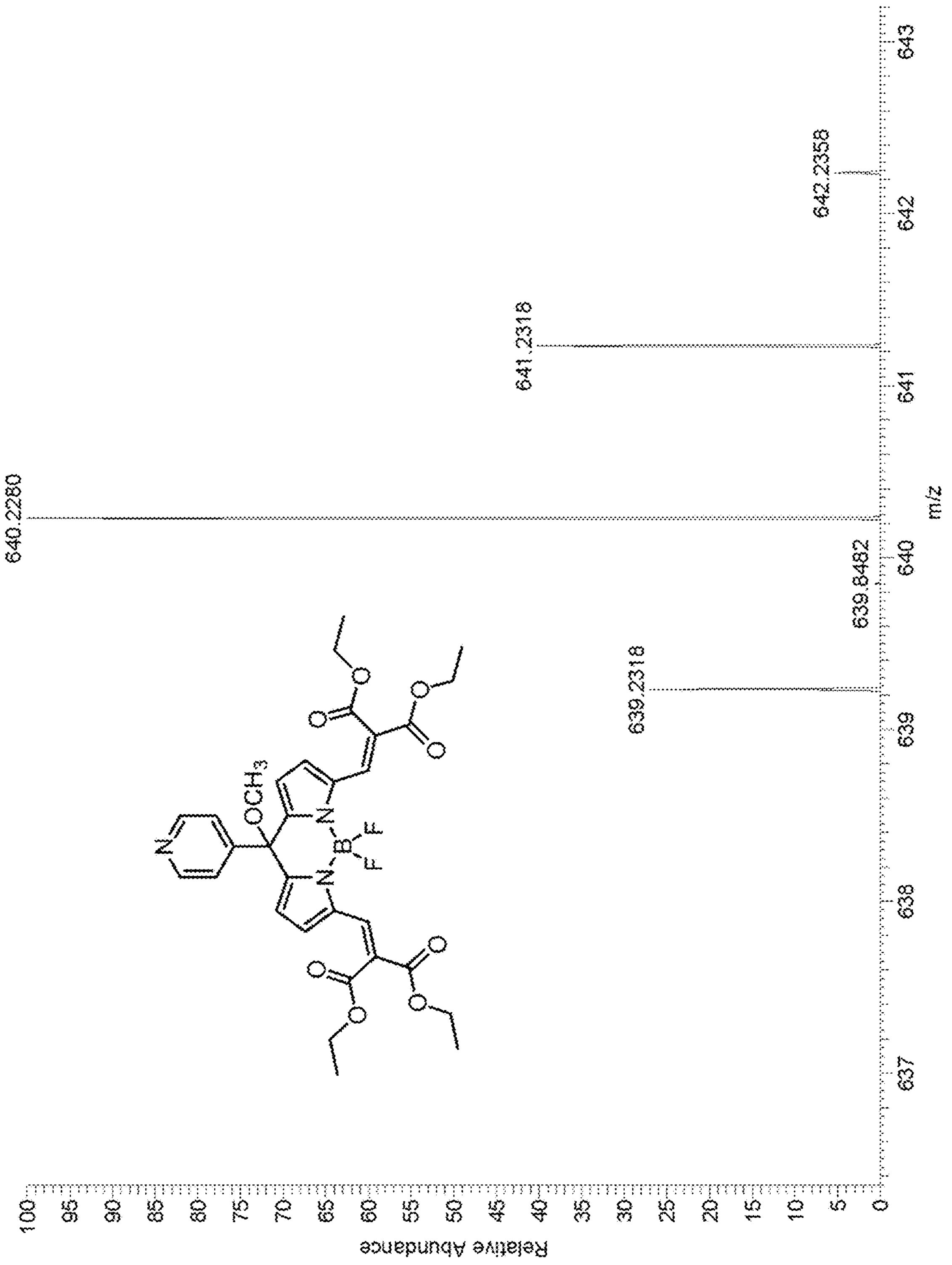
FIG. 10. High-resolution mass spectrometry (HRMS) spectrum of leuco-BODIPY. The mass-to-charge ratio (m/z) of 640.2280 was ascribed to the anion signal of leuco-BODIPY $[BODIPY-OCH_3]^-$.
Figure 11:
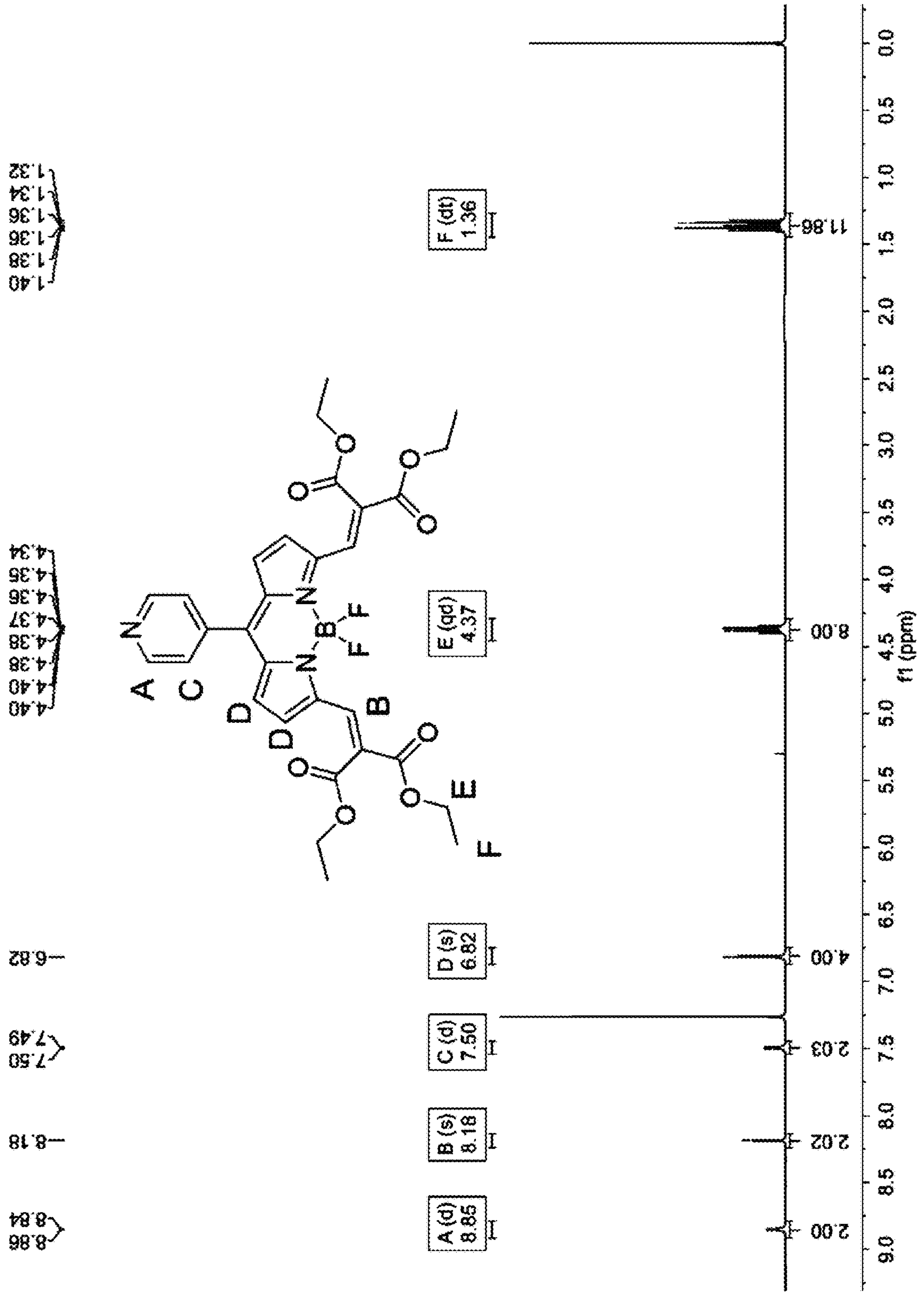
FIG. 11. $^1H$ NMR spectrum of BODIPY at RT. Lists of chemical shifts (ppm): A 8.85, B 8.18, C 7.50, D 6.82, E 4.37, F 1.36.
Figure 12:
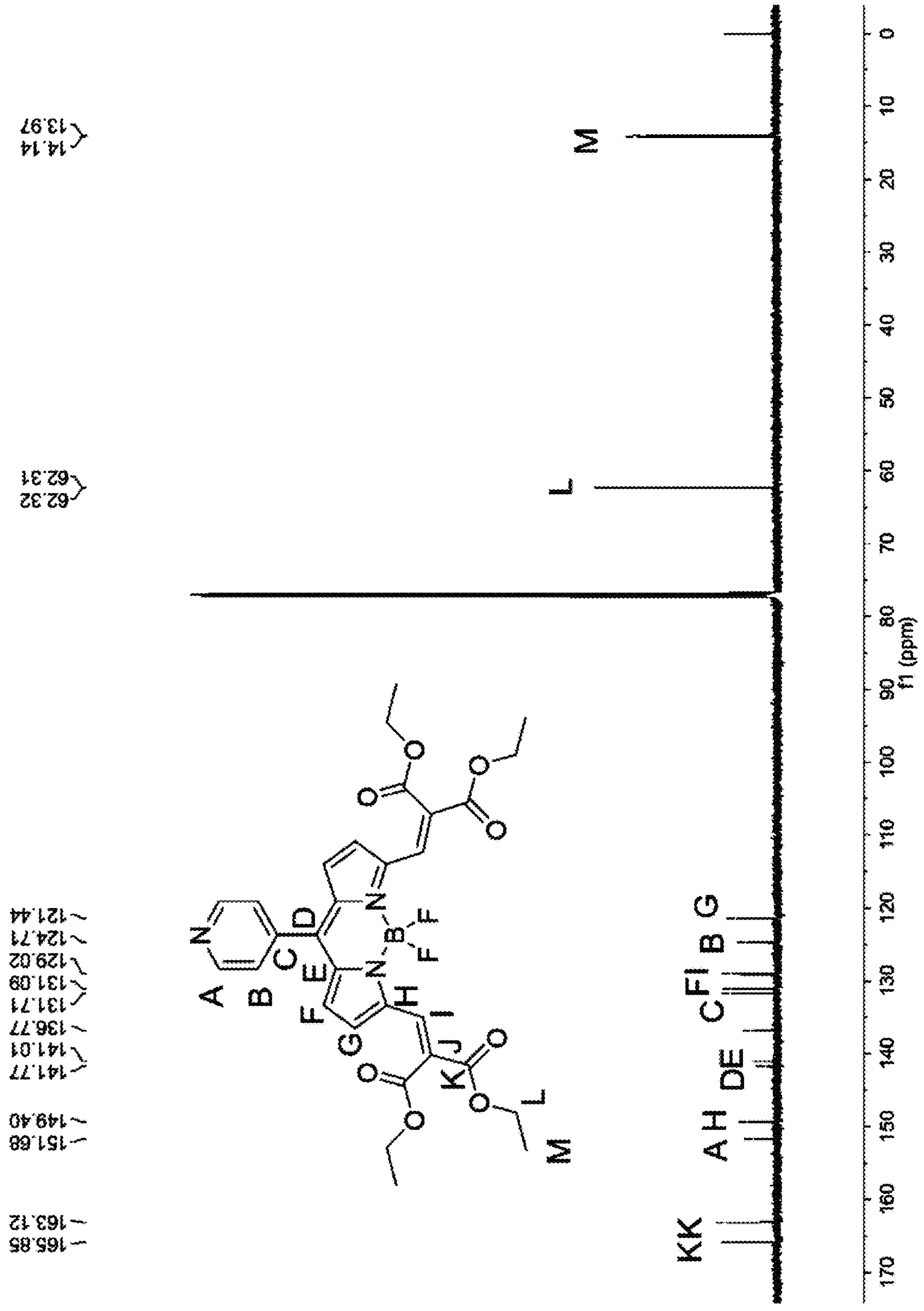
FIG. 12. $^{13}C$ NMR spectrum of BODIPY at RT. Lists of chemical shifts (ppm): A 151.68, B 124.71, C 131.71, D 141.77, E 141.01, F 131.09, G 121.44, H 149.40, I 129.02, J 136.77, K 165.85 and 163.12, L 62.32 and 62.31, M 14.14 and 13.97.
Figure 13:
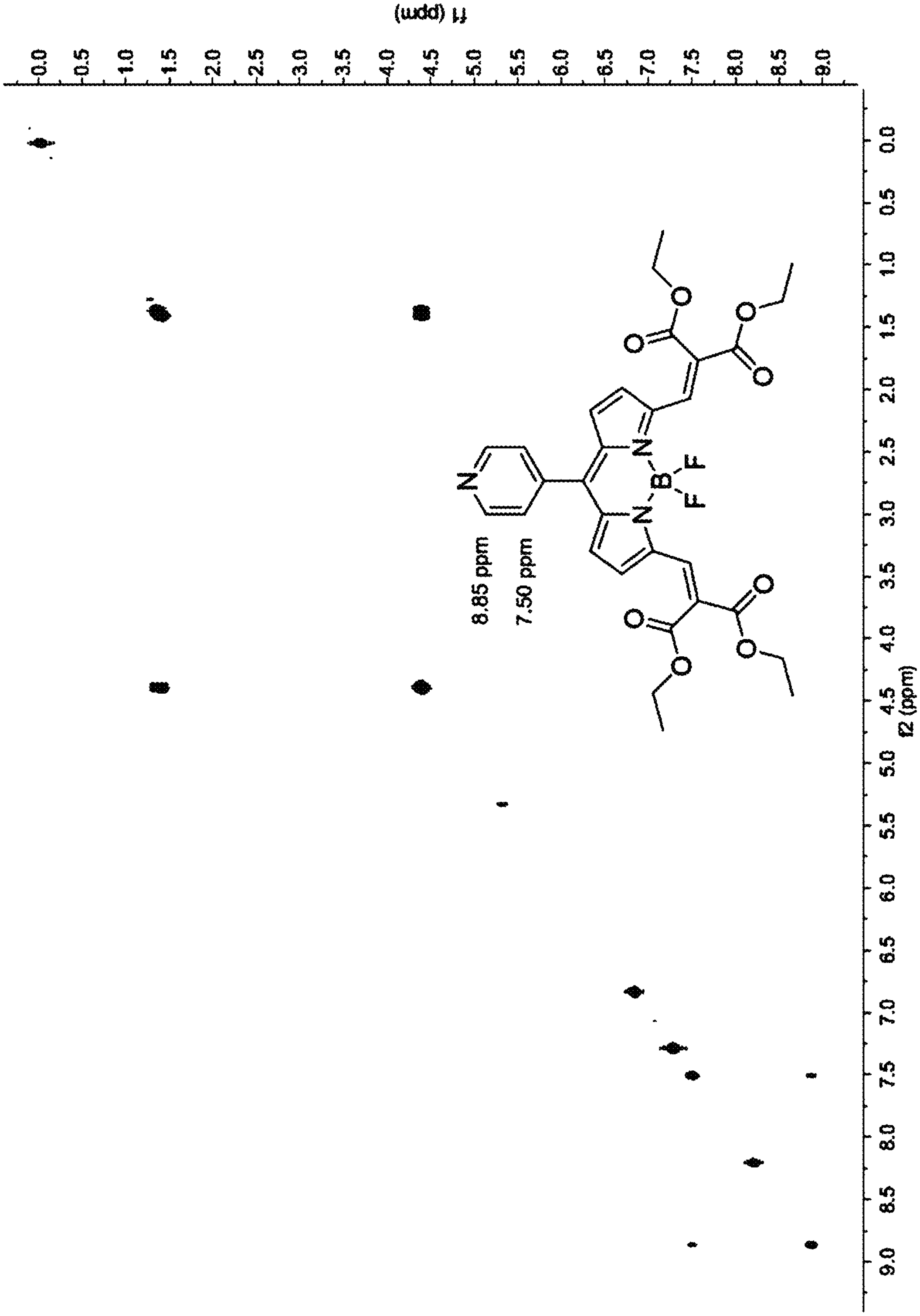
FIG. 13. H—H Homonuclear correlation spectroscopy (COSY) spectrum of BODIPY at RT. The proton signals at isonicotinic group are assigned clearly.
Figure 14:
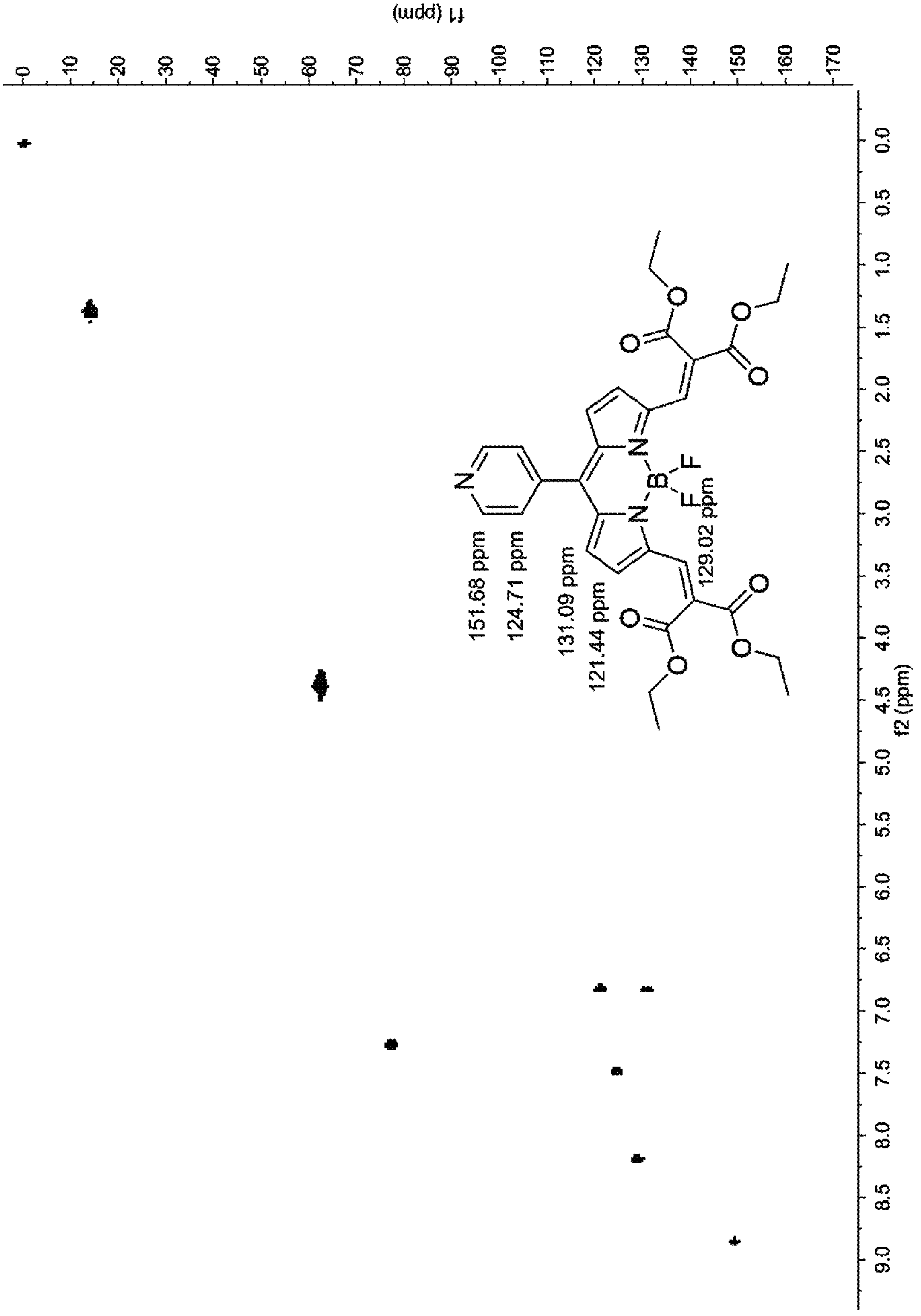
FIG. 14. C—H Heteronuclear single quantum coherence (HSQC) spectrum of BODIPY at RT. The carbon signals at pyrroles and isonicotinic group are assigned clearly.
Figure 15:
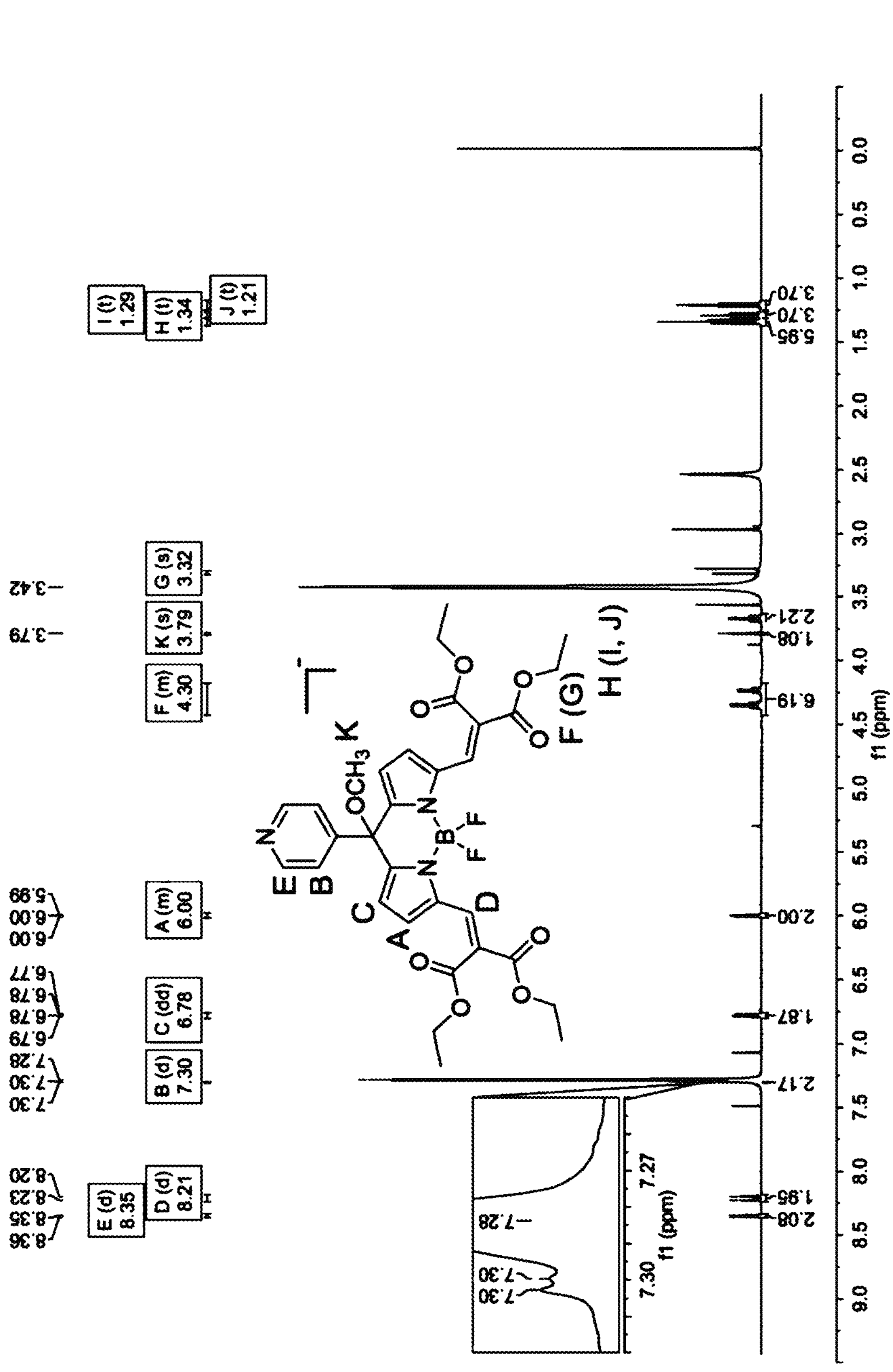
FIG. 15. $^1H$ NMR spectrum of leuco-BODIPY at RT. The new $—OCH_3$ peak (K) appearing at 3.79 ppm and the up-field shifting of β-pyrrole proton (C) from 6.82 to 6.00 ppm proved the formation leuco-BODIPY. Lists of chemical shifts (ppm): A 6.00, B 7.30, C 6.78, D 8.21, E 8.35, F 4.30, G 3.32, H 1.34, I 1.29, J 1.21. Due to transesterification (i.e., exchange of the methoxy group of methanol with the ethoxy group of BODIPY/Leuco-BODIPY), the chemical shifts of ethoxy and carbonyl split. However, the transesterification reaction does not affect the hybrid state ($sp^2$ or $sp^3$) of the meso-carbon that determines the BODIPY or leuco-BODIPY form.
Figure 16:
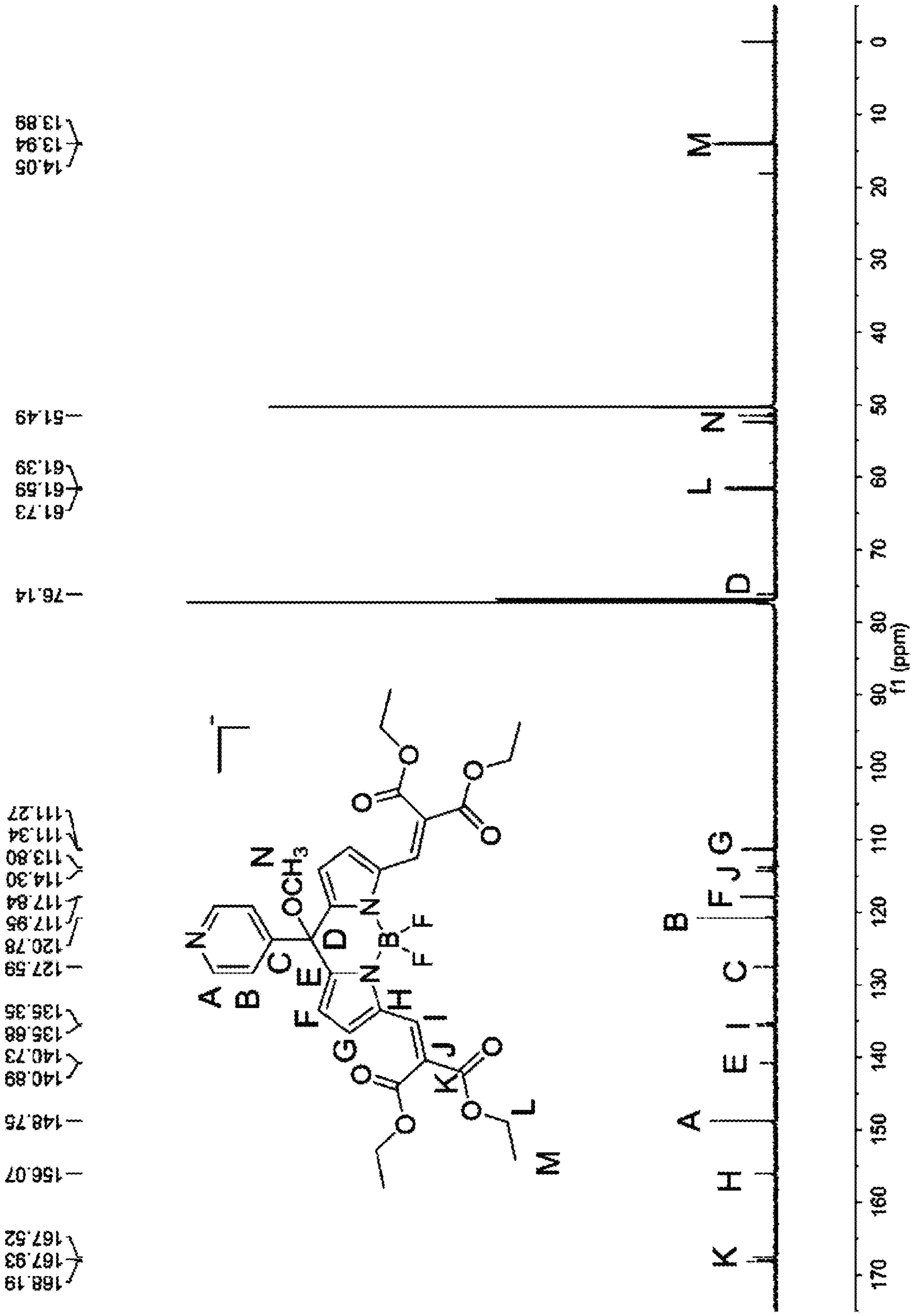
FIG. 16. $^{13}C$ NMR spectrum of leuco-BODIPY at RT. The new peaks appeared at 76.14 ppm and 51.49 ppm confirmed the transformation of "D-carbon" from $sp^2$ to $sp^3$ and the formation of leuco-BODIPY. Lists of chemical shifts: A 148.75, 120.78, 127.59, 76.14, E 140.89 and 140.73, F 117.95, G 111.34 and 111.27, H 156.07, I 135.68 and 135.35, J 114.30 and 113.80, K 168.19 and 167.93 and 167.52, L 61.73 and 61.59 and 61.39, M 14.05 and 13.94 and 13.89, N 51.49. Due to transesterification (i.e., exchange of the methoxy group of methanol with the ethoxy group of BODIPY/leuco-BODIPY), the chemical shifts of ethoxy and carbonyl split. However, the transesterification reaction does not affect the hybrid state ($sp^2$ or $sp^3$) of the meso-carbon that determines the BODIPY or leuco-BODIPY form.
Figure 17:
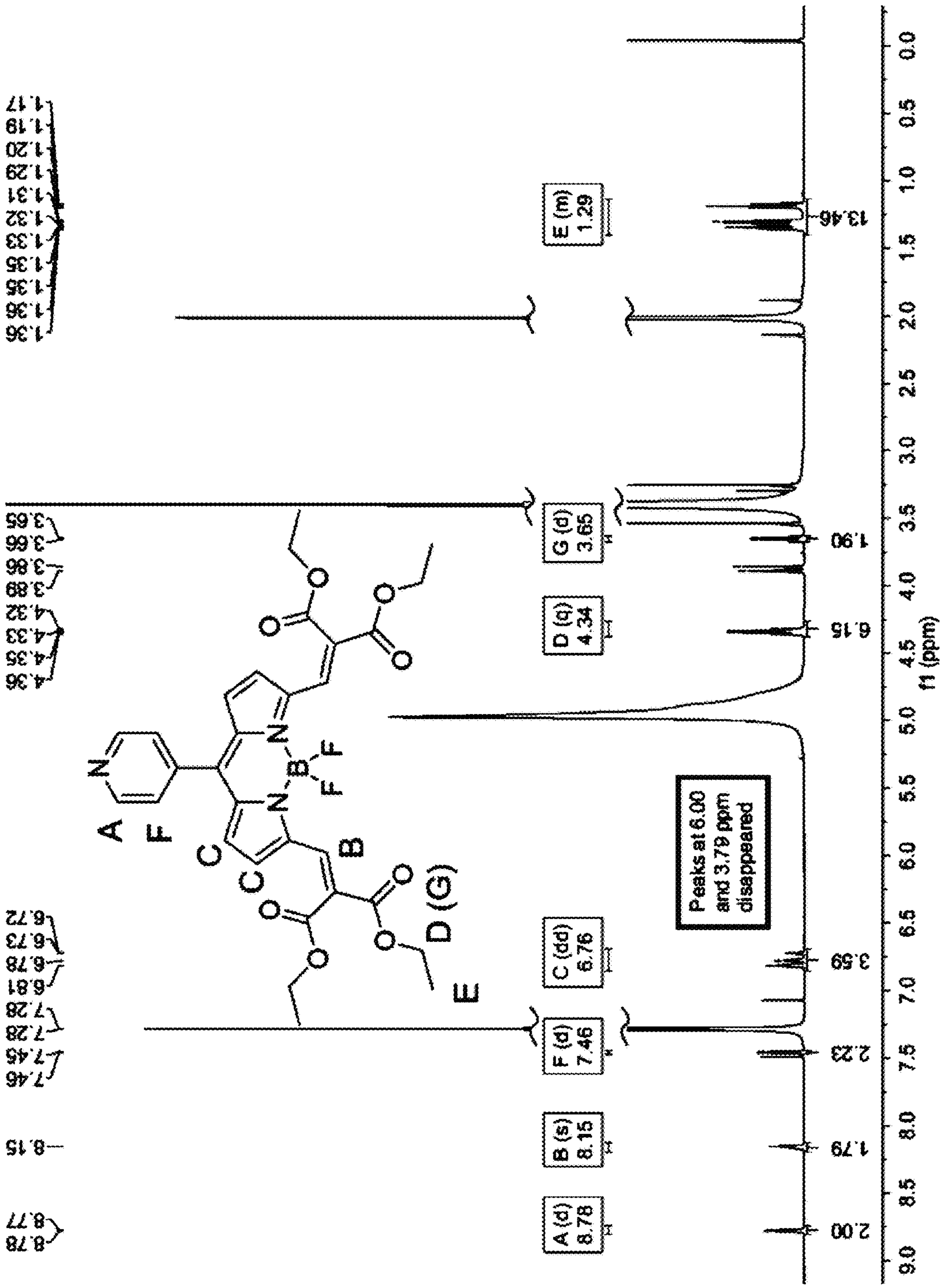
FIG. 17. $^1H$ NMR spectrum of leuco-BODIPY upon addition of acetic acid at RT. Upon acidification, BODIPY was recovered from leuco-BODIPY, as evidenced by the low-field shifting of the β-pyrrole proton (C) signal from 6.00 to 6.76 and the disappearance of $—OCH_3$ peak at 3.79 ppm. Lists of chemical shifts (ppm): A 8.78, B 8.15, C 6.76, D 4.34, E 1.29, F 7.46, G 3.65. Due to transesterification (i.e., exchange of the methoxy group of methanol with the ethoxy group of BODIPY/Leuco-BODIPY), the chemical shifts of ethoxy and carbonyl split. However, the transesterification reaction does not affect the hybrid state ($sp^2$ or $sp^3$) of the meso-carbon that determines the BODIPY or leuco-BODIPY form.
Figure 18:
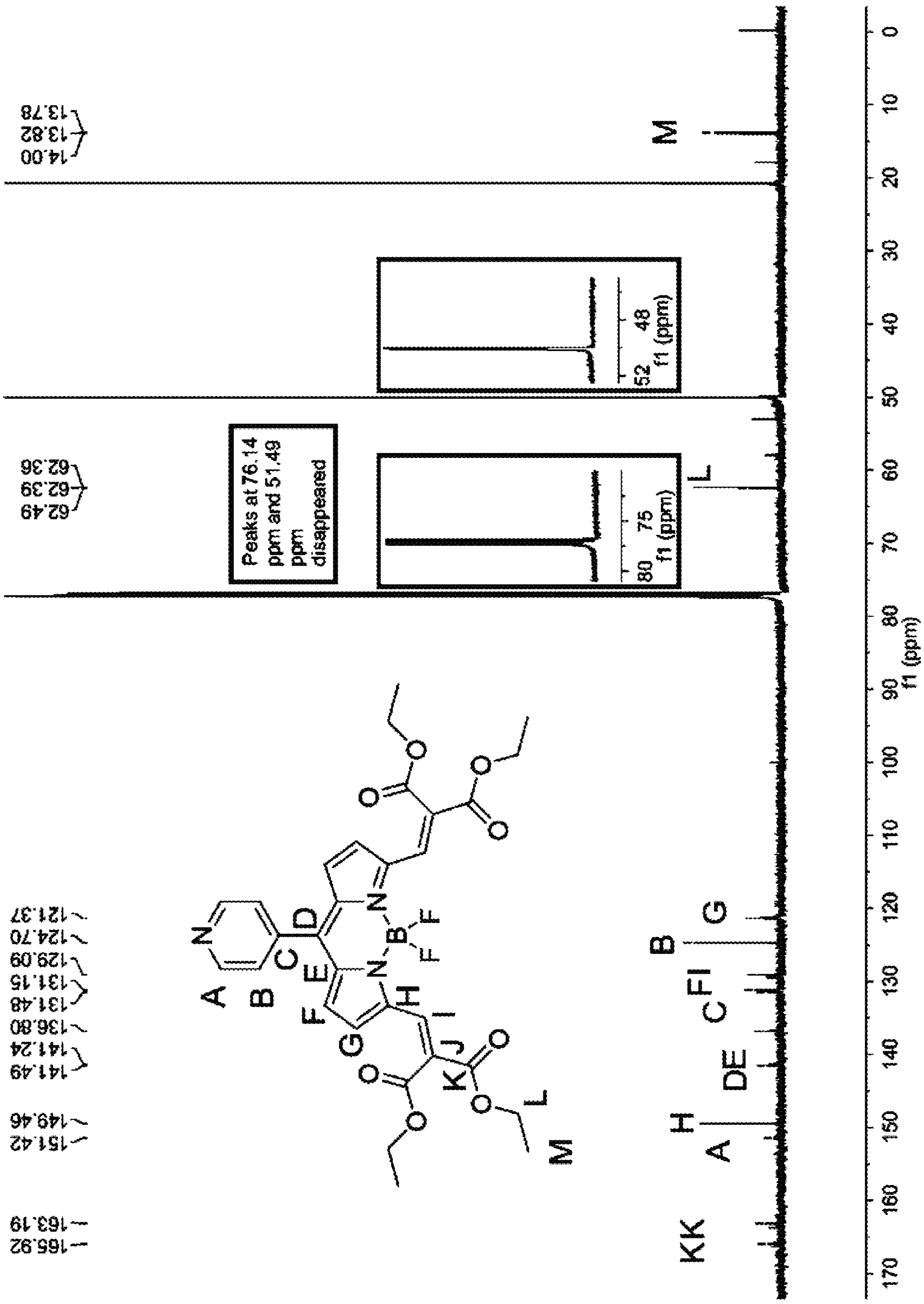
FIG. 18. $^{13}C$ NMR spectrum of leuco-BODIPY upon addition of acetic acid at RT. Upon acidification, BODIPY was recovered from leuco-BODIPY, as evidenced by the low-field shifting of the meso-carbon (D) signal from 76.14 ppm to 141.49 ppm and the disappearance of —OCH3 peak at 51.49 ppm. Lists of chemical shifts (ppm): A 151.42, B 124.70, C 131.48, D 141.49, E 141.24, F 131.15, G 121.37, H 149.46, I 129.09, J 136.80, K 165.92 and 163.19, L 62.49 and 62.39 and 62.36, M 14.00 and 13.82 and 13.78. Due to transesterification (i.e., exchange of the methoxy group of methanol with the ethoxy group of BODIPY/leuco-BODIPY), the chemical shifts of ethoxy and carbonyl split. However, the transesterification reaction does not affect the hybrid state ($sp^2$ or $sp^3$) of the meso-carbon that determines the BODIPY or leuco-BODIPY form.
Figure 19:
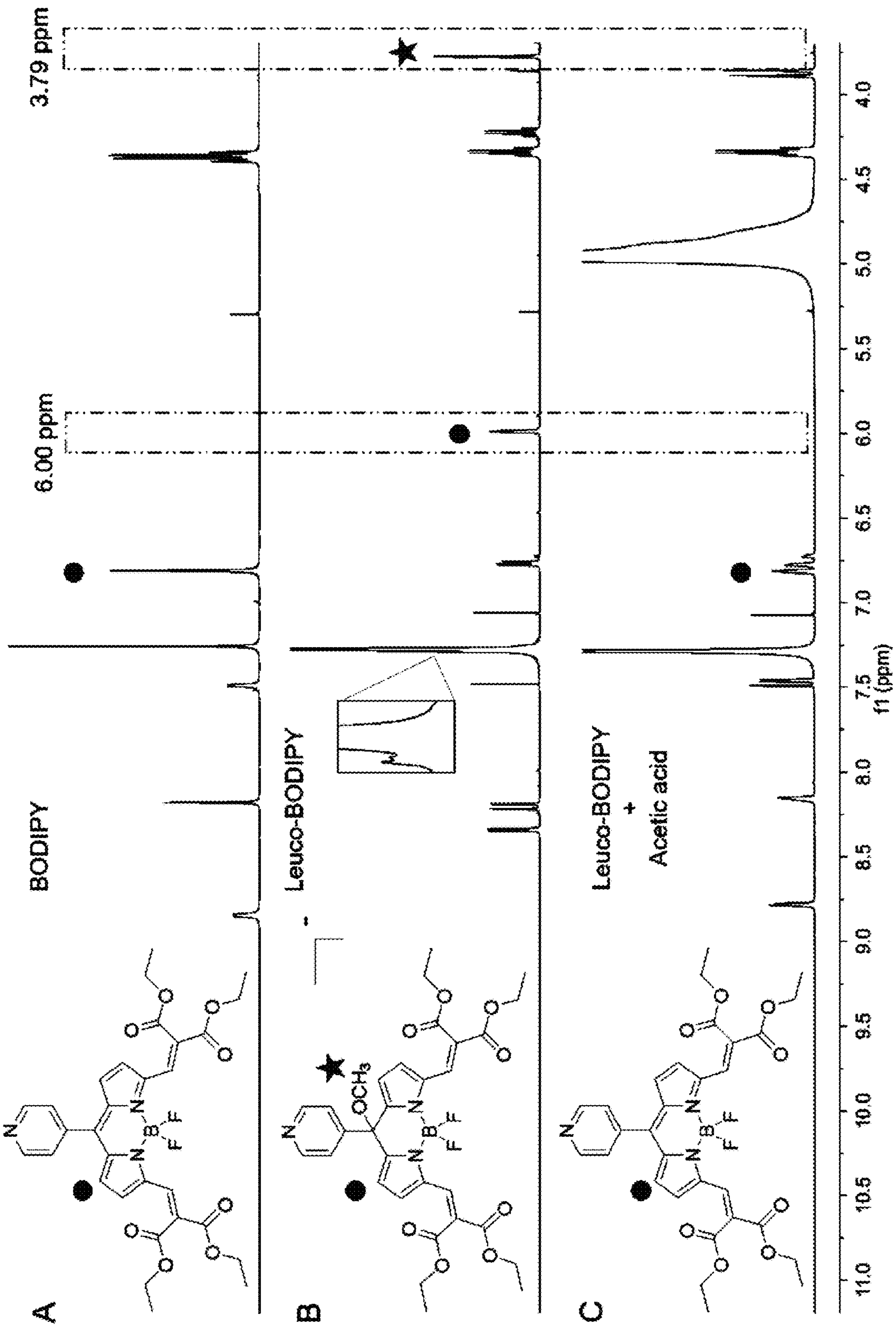
FIG. 19. Reversibility between BODIPY and leuco-BODIPY by $^1H$ NMR at RT. A) BODIPY in CDCl3; B) BODIPY in CDCl3 upon addition of 80 μL of CH3OH in the presence of K2CO3; C) leuco-BODIPY in CDCl3 upon addition of 10 μL of acetic acid. Note that the peaks at 6.00 ppm and 3.79 ppm appeared upon the formation of leuco-BODIPY and disappeared upon the recovery of BODIPY. Due to transesterification (i.e., exchange of the methoxy group of methanol with the ethoxy group of BODIPY/leuco-BODIPY), the chemical shifts of ethoxy and carbonyl split. However, the transesterification reaction does not affect the hybrid state ($sp^2$ or $sp^3$) of the meso-carbon that determines the BODIPY or leuco-BODIPY form.
Figure 20:
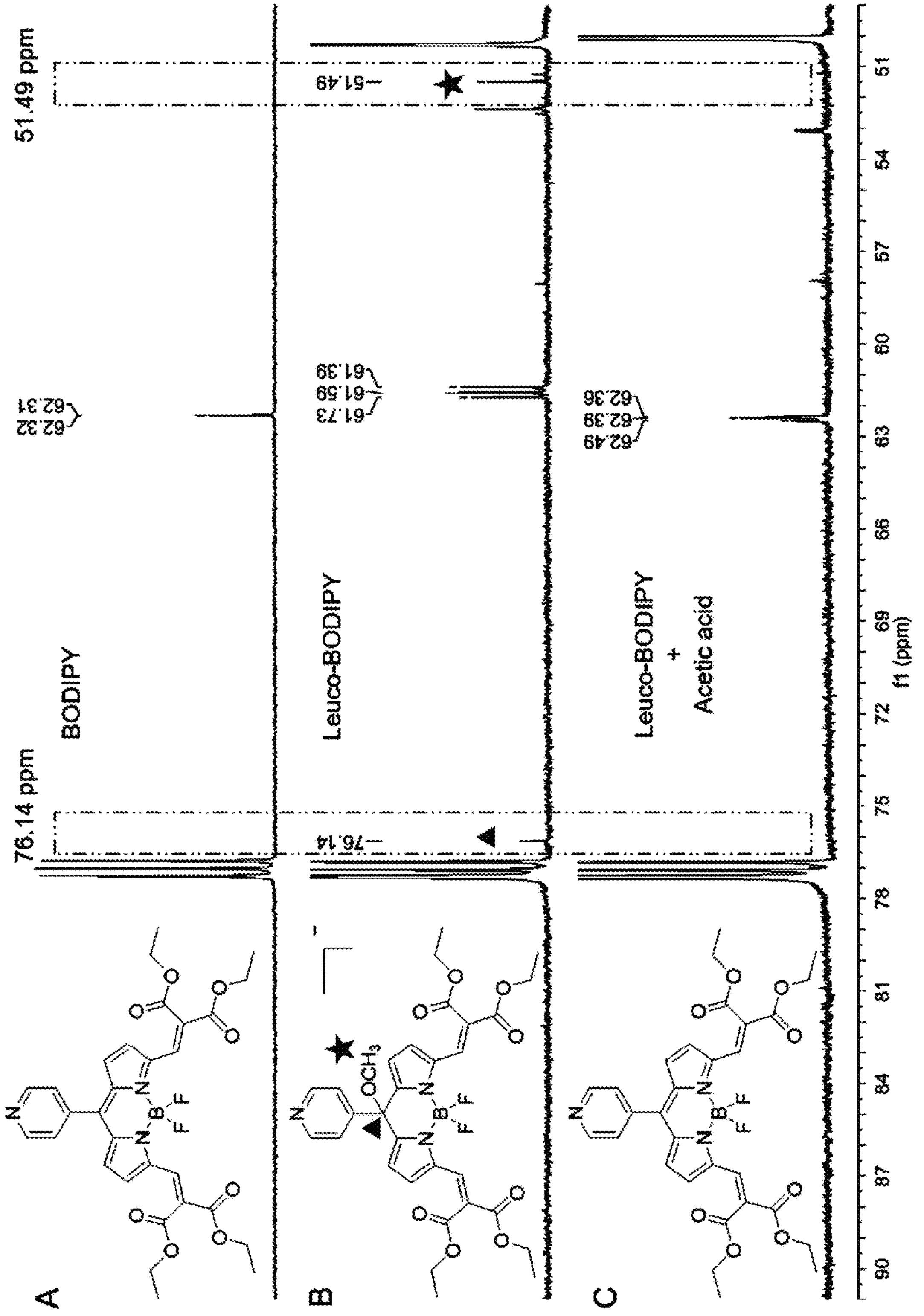
FIG. 20. Reversibility between BODIPY and leuco-BODIPY by $^{13}C$ NMR at RT. A) BODIPY in CDCl3; B) BODIPY in CDCl3 upon addition of 80 μL CH3OH in the presence of K2CO3; C) leuco-BODIPY in CDCl3 upon addition of 10 μL of acetic acid. Note that the peaks at 76.14 ppm and 51.49 ppm appeared upon the formation of leuco-BODIPY and disappeared upon the recovery of BODIPY. Due to transesterification (i.e., exchange of the methoxy group of methanol with the ethoxy group of BODIPY/leuco-BODIPY), the chemical shifts of ethoxy and carbonyl split. However, the transesterification reaction does not affect the hybrid state ($sp^2$ or $sp^3$) of the meso-carbon that determines the BODIPY or leuco-BODIPY form.

We prepared BODIPY by a classical method (FIGS. 7-8)[27,28] and verified its structure by high resolution mass spectrometry (HRMS; (FIG. 9), $^1$H nuclear magnetic resonance ($^1$H NMR; FIG. 11), and $^{13}$C NMR (FIG. 12). Next, we added methanol as a representative nucleophile to convert BODIPY to leuco-BODIPY; addition of one carbon atom enables straightforward analysis of molecular structural changes by NMR. The HRMS spectrum revealed an anion signal of leuco-BODIPY with a mass-to-charge ratio (m/z) of 640.2280; this signal was ascribed to [BODIPY-$OCH_3]^-$ (FIG. 10), indicating the formation of leuco-BODIPY. We assigned the proton signals of both forms of the dye by correlation spectroscopy (COSY) based on the $^1$H-$^{13}$C NMR spectra. Based on the $^1$H-NMR spectra, addition of methanol to BODIPY in $CDCl_3$ caused the β-pyrrole proton closest to the meso-carbon to shift significantly up-field from 6.82 ppm to 6.00 ppm (FIGS. 11, 15, 19). This result suggests that the π-system of the indacene core became less extended upon formation of a tetrahedral geometry at the $sp^3$ meso-carbon of leuco-BODIPY. The $^1$H-NMR spectrum of leuco-BODIPY also reveals a similar up-field shift of the protons from the meso-pyridine group and the emergence of a new —$OCH_3$ peak at 3.79 ppm that proves the formation of leuco-BODIPY.[23] The $^{13}$C NMR spectrum of leuco-BODIPY shows a new peak at 76.14 ppm (assigned to the $sp^3$ meso-carbon) and disappearance of the peak at 141.77 ppm (assigned to the $sp^2$ meso-carbon), amounting to an up-field shift of about 65.63 ppm. A new peak at 51.49 ppm can be assigned to the —$OCH_3$ group of leuco-BODIPY (FIGS. 12, 16, 20). Lastly, we verified the recovery of BODIPY by adding acetic acid to leuco-BODIPY. We observed the reversion of the proton and carbon peaks of leuco-BODIPY to BODIPY and disappearance of the —$OCH_3$ peak at 3.79 ppm in the $^1$H NMR spectrum and at 51.49 ppm and 76.14 ppm in the $^{13}$C NMR spectrum (FIGS. 17-20), matching our previous results.[23]

Example 2—Photophysical Properties of BODIPY

Figure 21A:
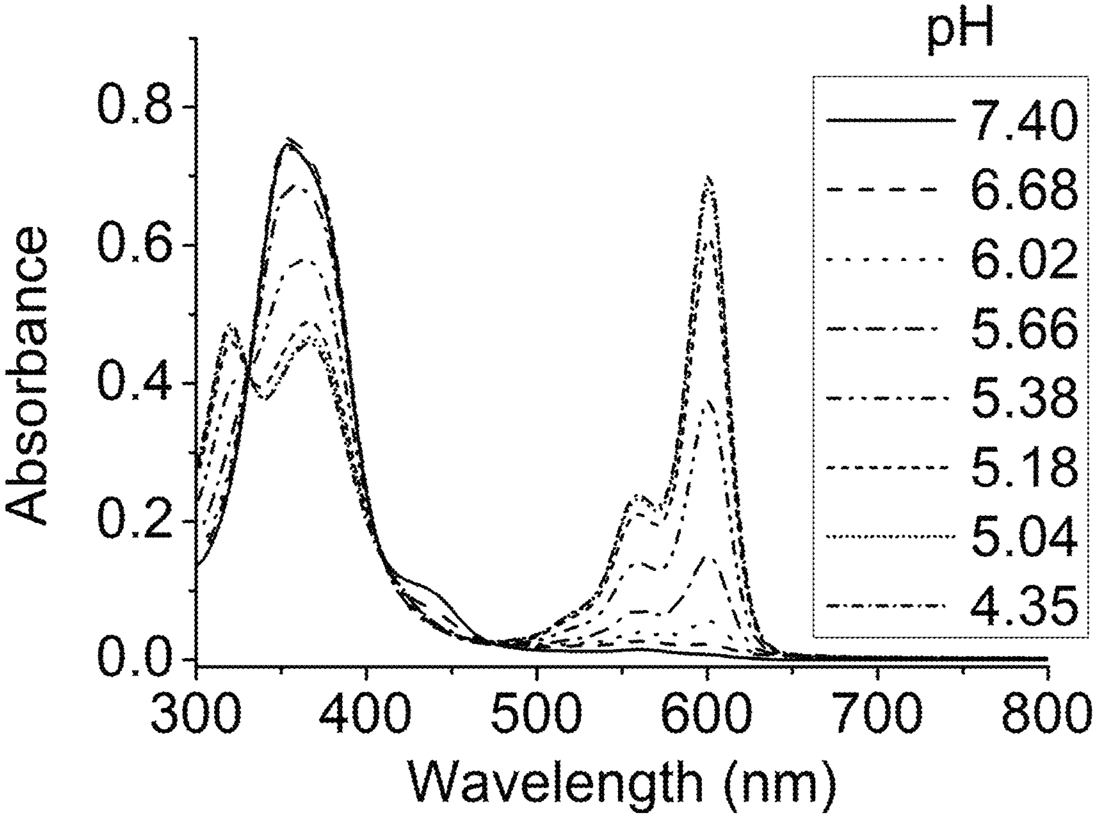
FIGS. 21A-21F Photophysical properties of the probe.
Figure 21B:
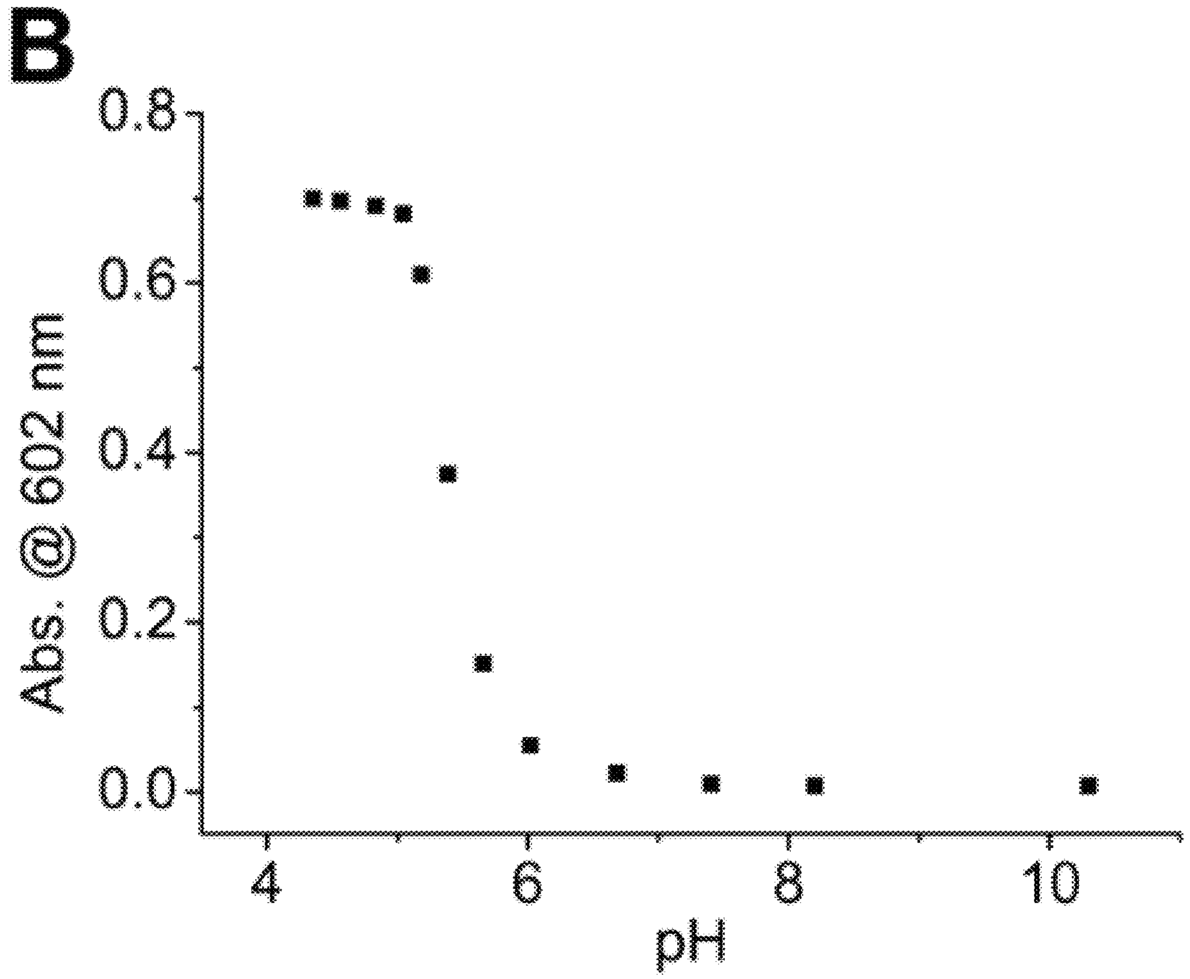
Figure 21C:
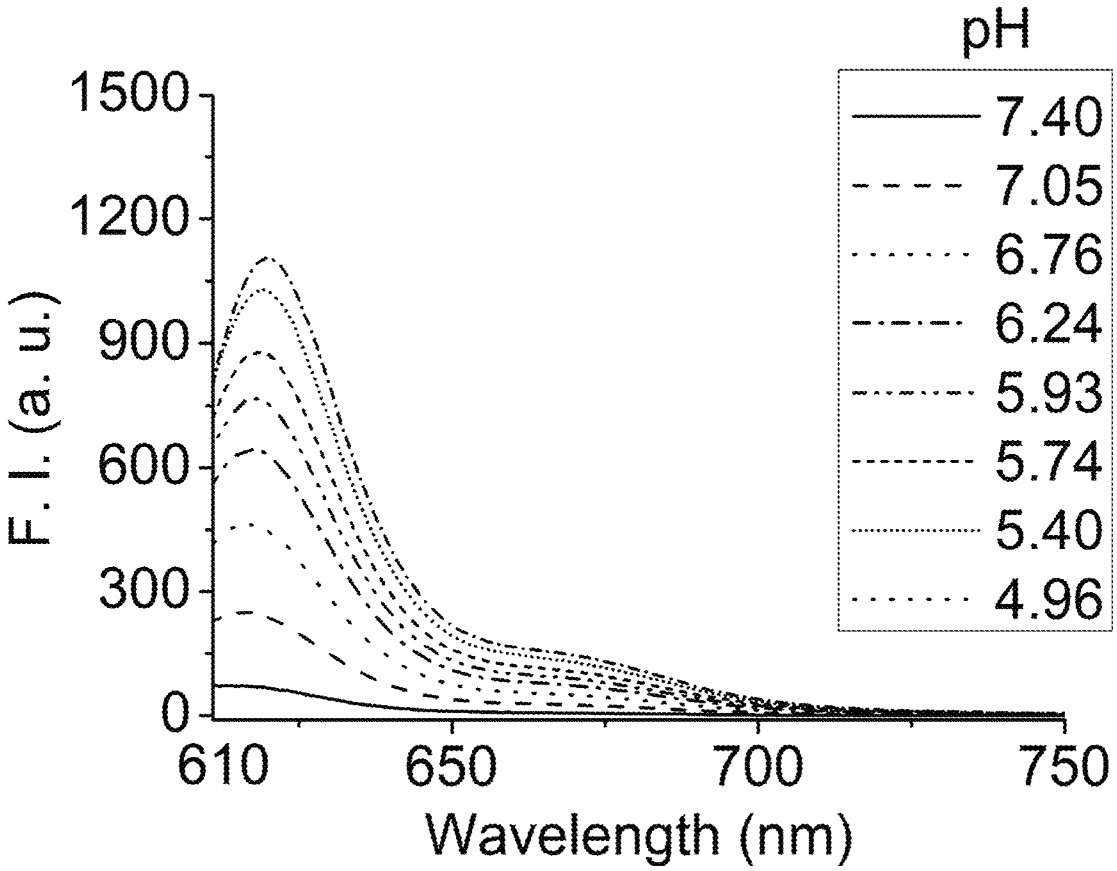
Figure 21D:
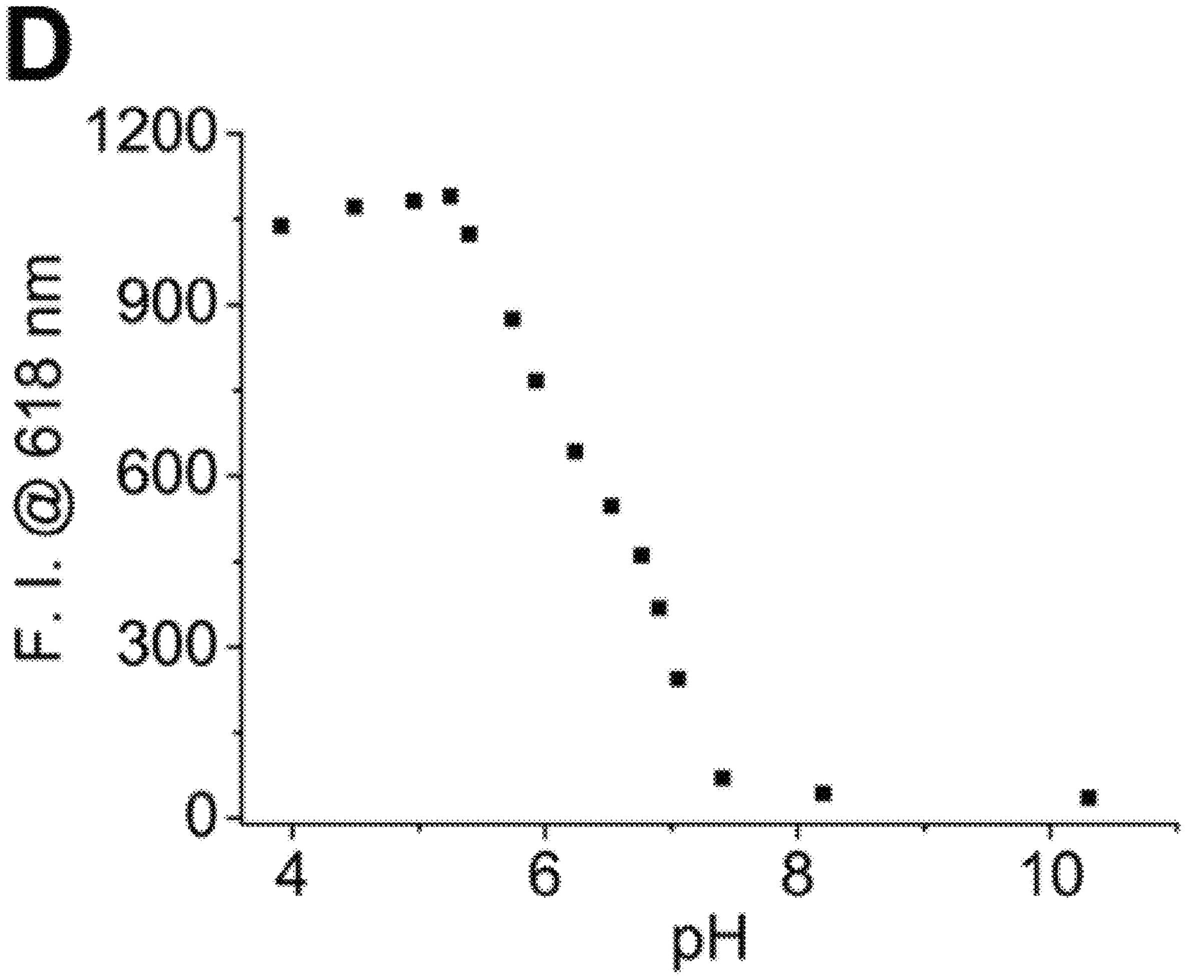
Figure 21E:
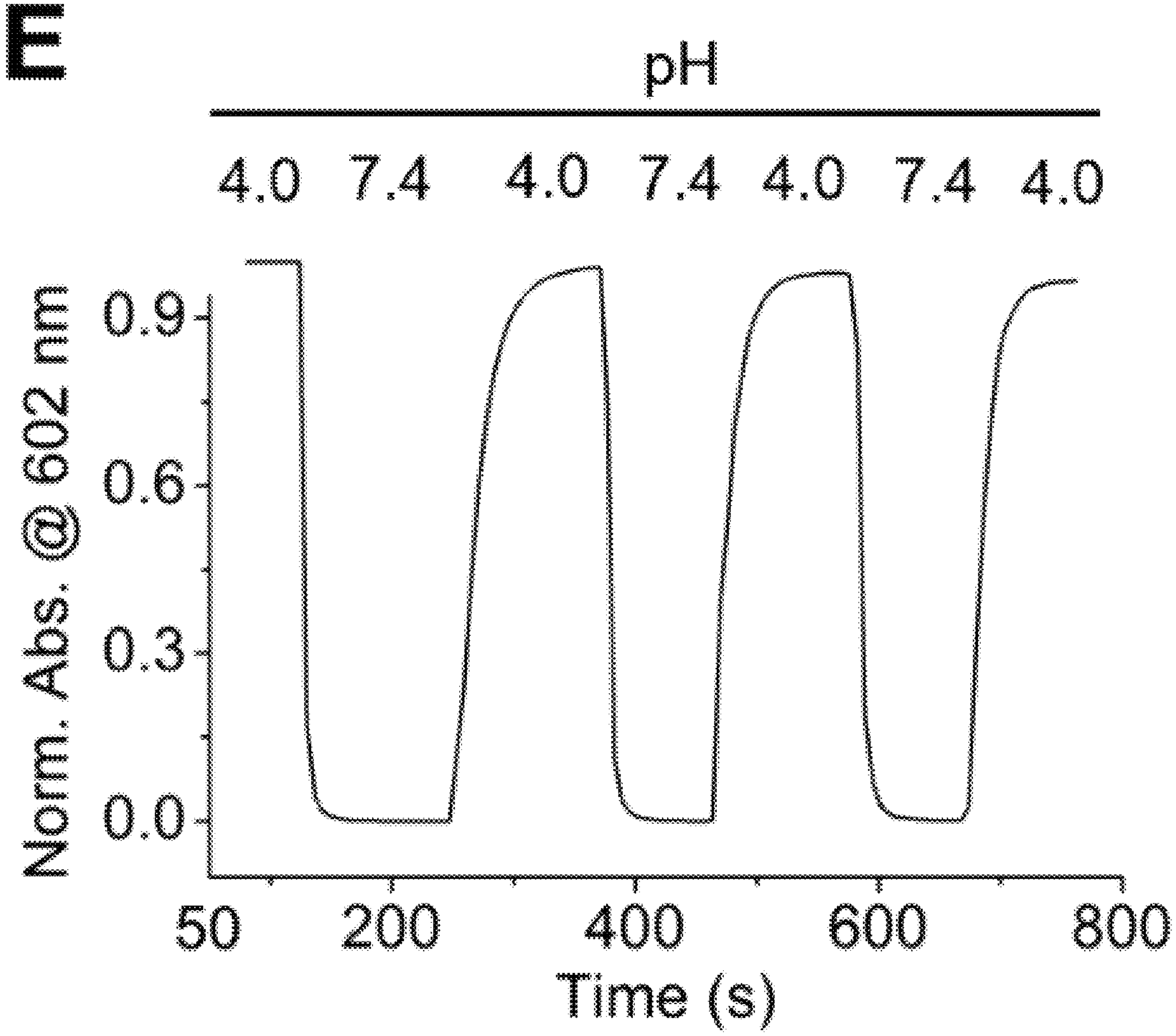
Figure 21F:
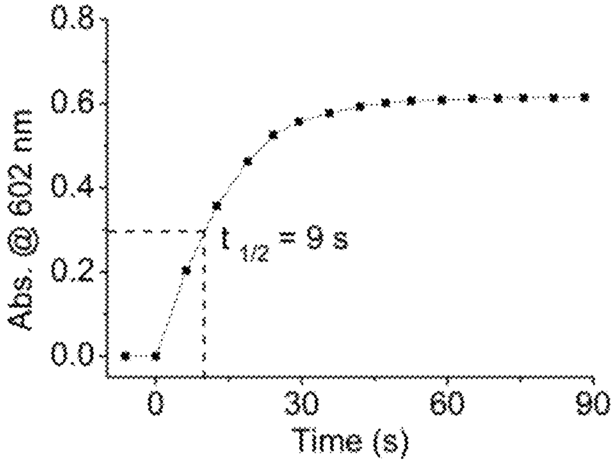
Figure 22:
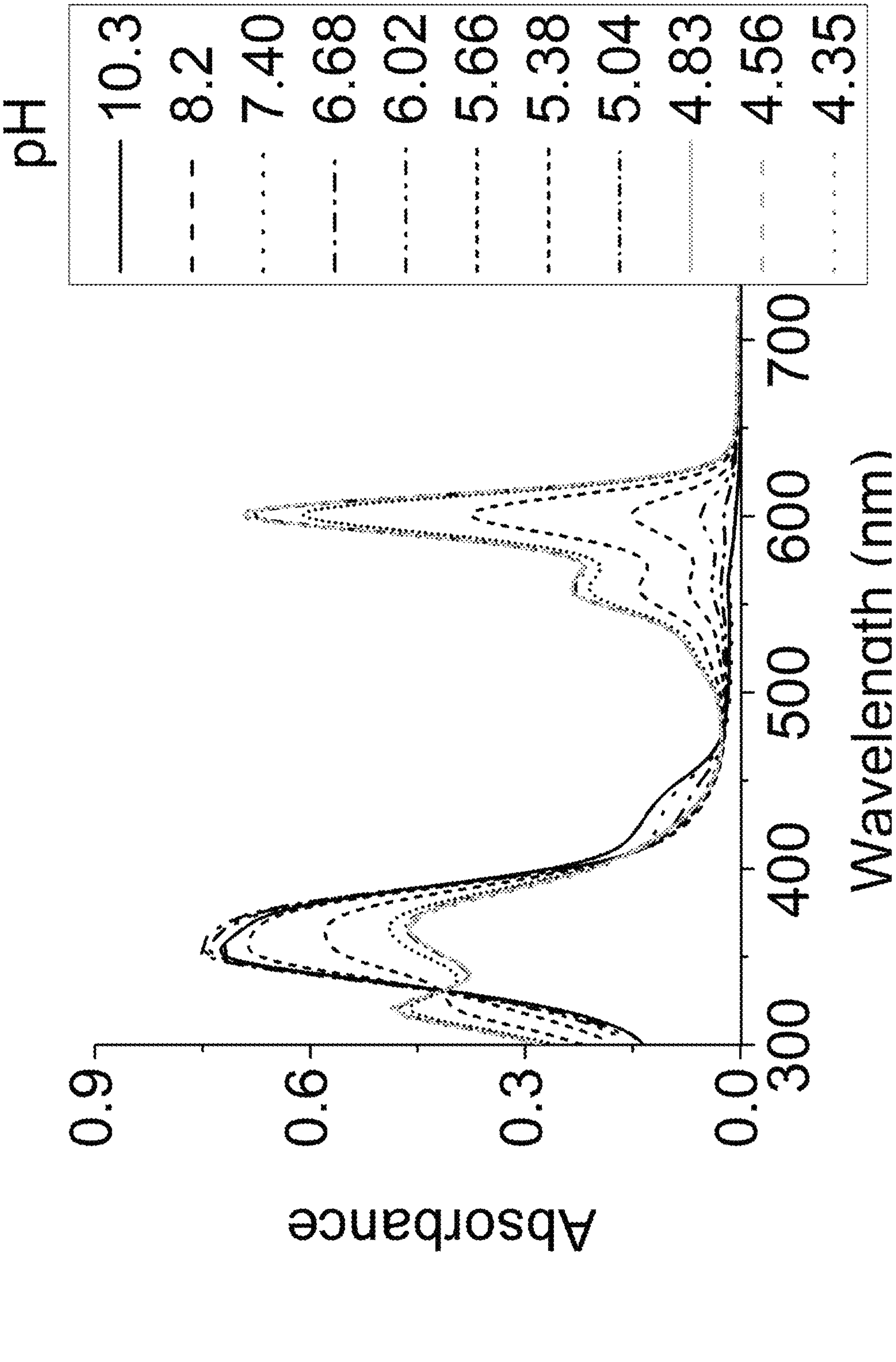
FIG. 22. Absorbance spectrum of the probe as a function of pH in $C_2H_5OH$/PBS (1:1, v/v).
Figure 23:
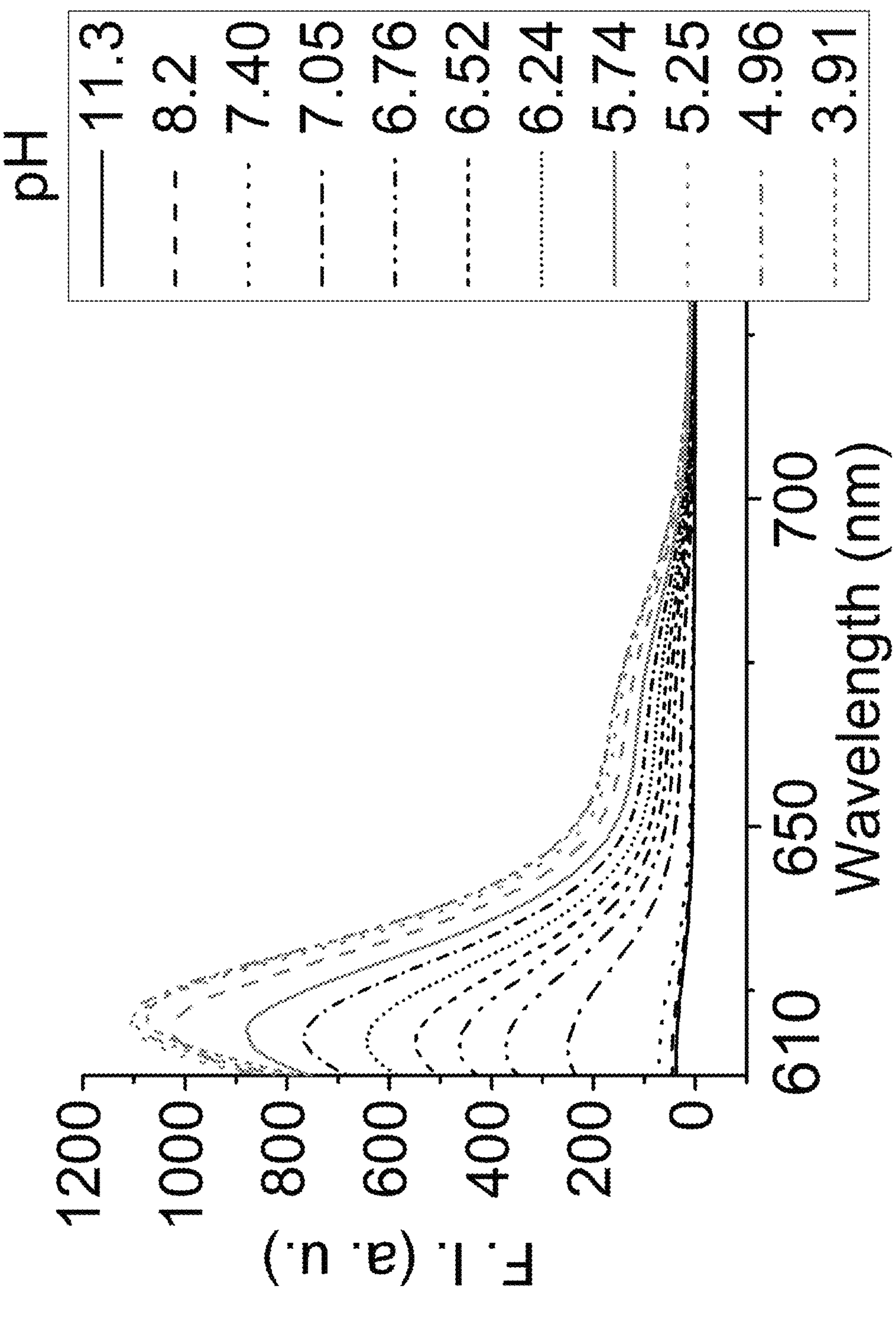
FIG. 23. Fluorescence emission spectrum of the probe as a function of pH in $C_2H_5OH$/PBS (1:1, v/v).
Figure 24:
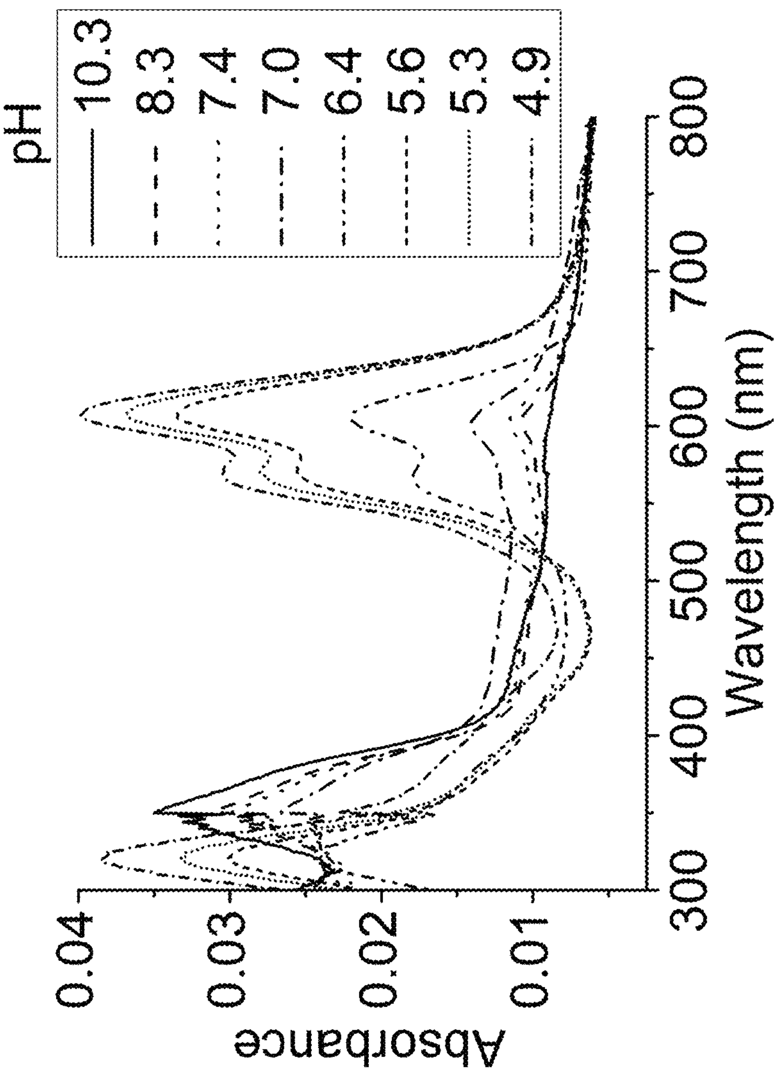
FIG. 24. Absorbance spectrum of the probe as a function of pH in 0.5% DMSO in water.
Figure 25:
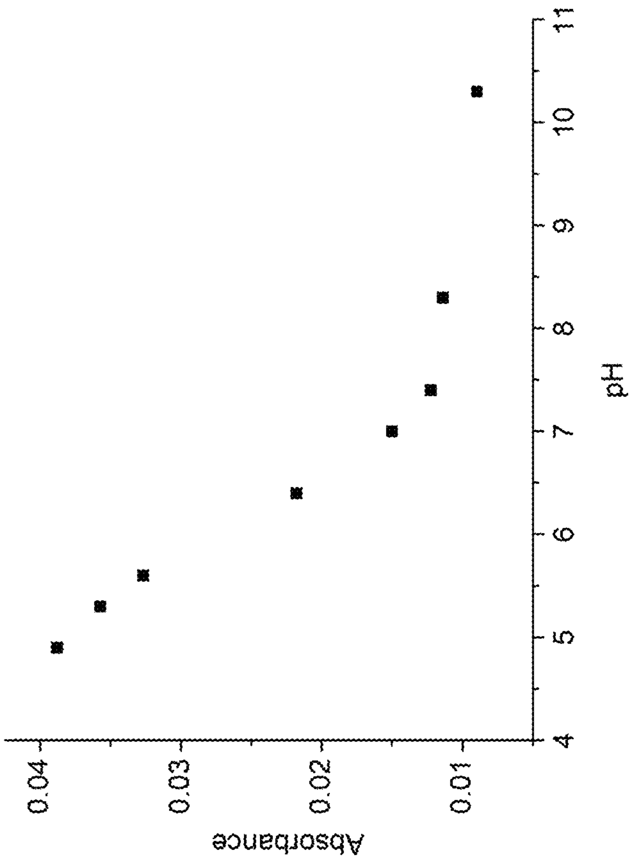
FIG. 25. Absorbance at 602 nm of the probe as a function of pH in 0.5% DMSO in water.
Figure 26:
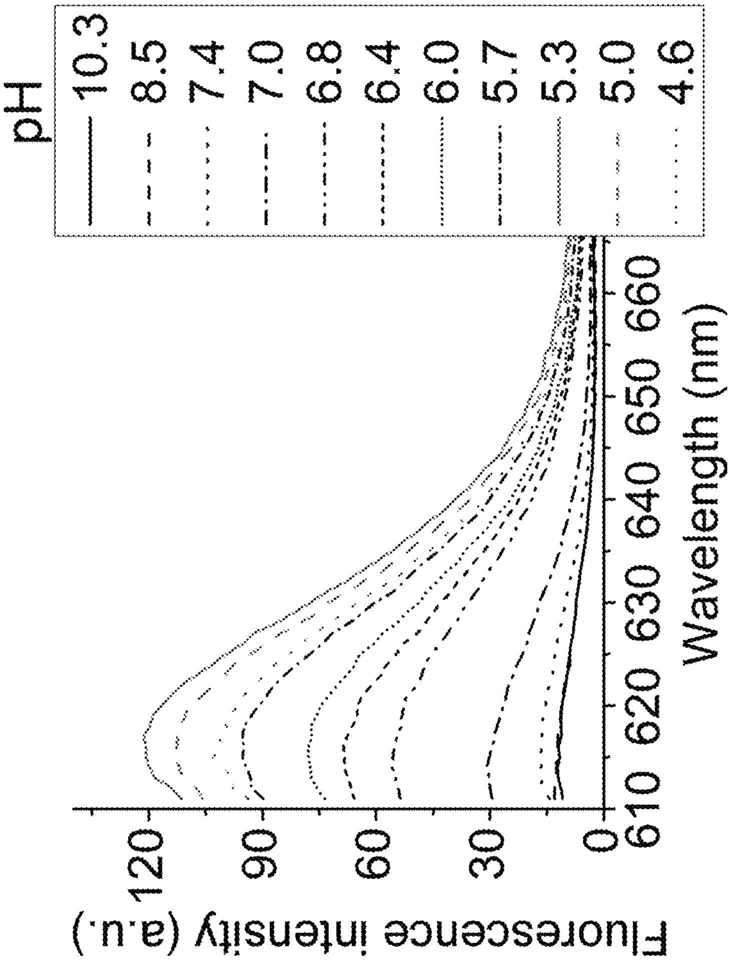
FIG. 26 Fluorescence spectrum of the probe as a function of pH in 0.5% DMSO in water.
Figure 27:
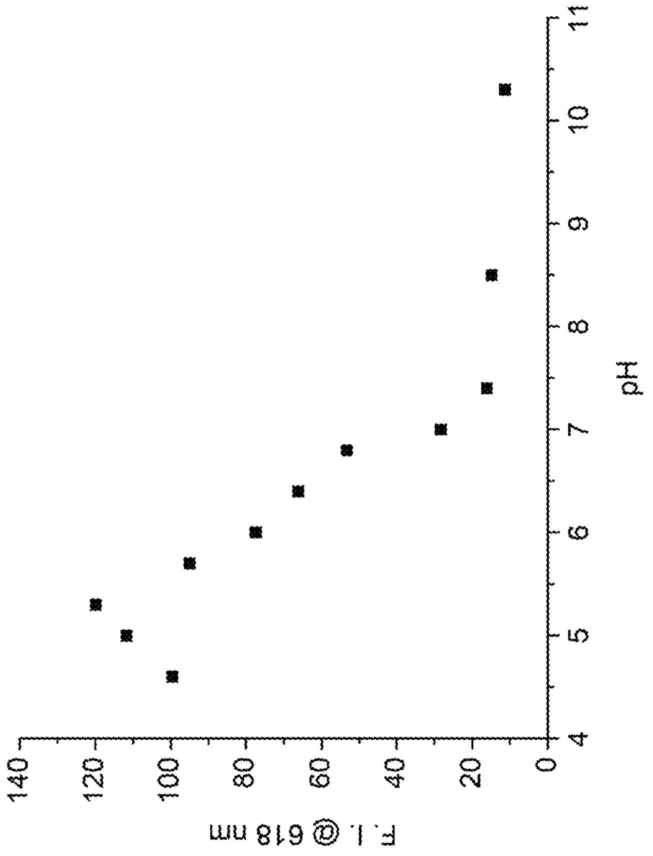
FIG. 27 Fluorescence at 618 nm of the probe as a function of pH in 0.5% DMSO in water.

We investigated the spectroscopic properties of the fluorescent probe as a function of pH in phosphate-buffered saline (PBS) containing 50% ethanol by UV-vis spectrophotometry and fluorimetry (FIGS. 21A-21F, 22-23). Adding 50% ethanol to PBS reflects the compromise between the need for solubilizing BODIPY in an aqueous environment and the need for proper reference to the conventional pH scale.[28, 29] Under acidic conditions (pH of about 4), the longest wavelength absorption band of BODIPY at 602 nm can be ascribed to the S0-S1 transition and the shoulder at 559 nm indicates the 0-1 vibrational band.[23, 30] When compared to classical tetramethyl BODIPY dyes,[31] the absorption band of BODIPY is red-shifted from 500 nm to 602 nm, consistent with the extended π-system originating from the electron-withdrawing diethyl malonate groups coupling through their exocyclic double bonds at the 3,5-positions of the indacene core. The red emission peak of BODIPY appears at 618 nm. Conversely, after adding NaOH to adjust the medium to weakly basic conditions (pH of about 7.4; indicative of the typical pH of culture medium), we observed that the main absorption band of BODIPY at 602 nm disappears and a new band of leuco-BODIPY appears near 360 nm. These absorption spectral changes were accompanied by a visible color change from magenta to light yellow and near-complete quenching of the red fluorescence. Reacidification of leuco-BODIPY by adding HCl led to the recovery of BODIPY, as evidenced by the reappearance of the absorption bands at 602 nm with a pKa of 5.28±0.05 (corrected pKa[32]) and the fluorescence bands at 618 nm. Closer inspection of the emission spectrum as a function of pH reflects the onset of the fluorescence peak at 618 nm at pH of about 7.4. As pH drops from 7.4 to 7.0, 6.5 and further to 5.5, we observed a drastic about 3-fold, 8-fold and about 15-fold increase in emission at 618 nm, respectively. The fluorescence intensity no longer increases with acidification when pH falls below 5.25, due to the protonation of the nitrogen atom in the pyridine group of BODIPY.[33] We assessed the pH-reversible spectroscopic properties of the probe by monitoring the changes in absorbance at 602 nm (FIG. 21E) upon switching the pH of the 1:1 (v/v) PBS/ethanol solution between 4.0 and 7.4 over three cycles. With an efficiency of recovery at 100% (within uncertainty), these reversible color changes between magenta at pH 4.0 and light yellow at pH 7.4 were confirmed by photography. Conversion from leuco-BODIPY to BODIPY is rapid, with a response half-life of absorbance recovery at 602 nm of 9 s (FIG. 21F). To demonstrate the applicability of our probe under aqueous conditions, we further repeated the pH titration studies in water containing 0.5% (v/v) dimethyl sulfoxide (DMSO; for solubilizing the probe in culture medium for our later cell-based studies) and observed pH-responsive absorbance and fluorescence trends that are similar to those in 50% ethanol and 50% PBS (FIGS. 24-27).

Example 3—Detection of EVs in Cell-Seeded Medium

Figure 28A:
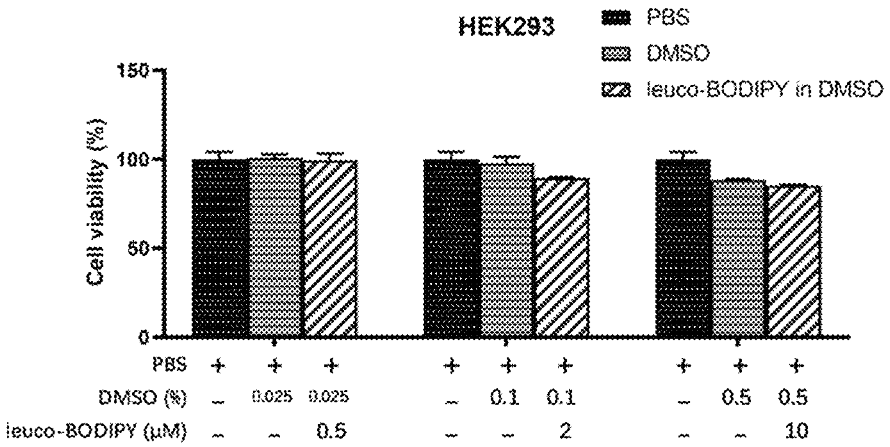
FIGS. 28A-28C Cytotoxicity of the probe. Pre-seeded in 96-well plates, HEK293, HeLa, and A549 cells were incubated in complete DMEM containing different concentrations of leuco-BODIPY [dissolved in in dimethyl sulfoxide (DMSO)] for 12 h. The alamarBlue reagent (Invitrogen) was used to test cell viability by measuring the optical absorbance at 570 nm and 600 nm by a Multiskan GO UV-absorbance microplate reader. Reported data represent mean±SD from three independent experiments. Based on these data, we choose to conduct our typical imaging studies by incubating cells with 2 μM leuco-BODIPY and 0.1% DMSO for 30 min.
Figure 28B:
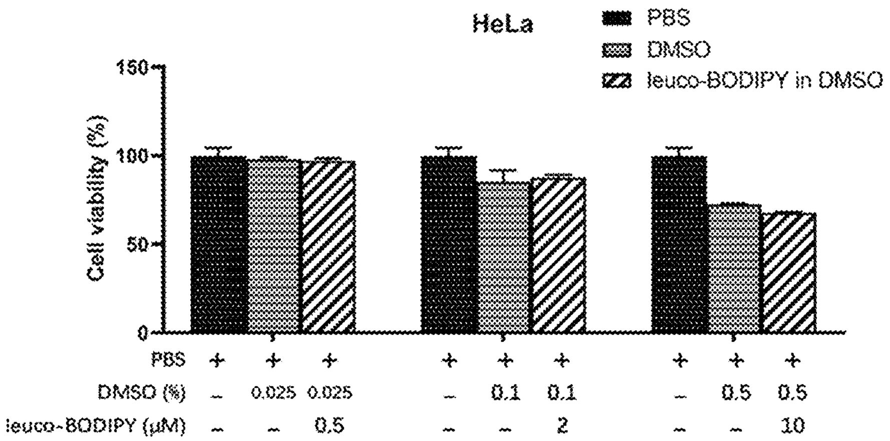
Figure 28C:
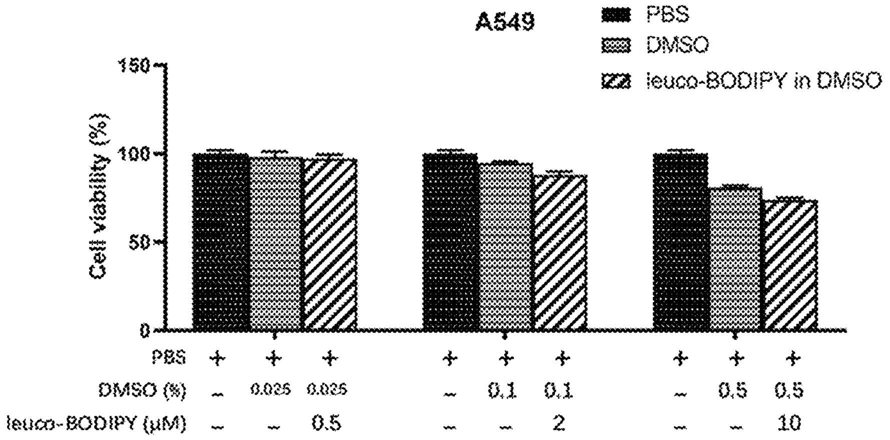
Figure 29A:
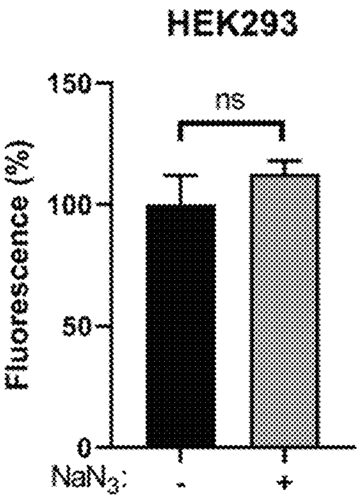
FIGS. 29A-29F Pathway for the cellular uptake of the probe. The cells were either (FIGS. 29A-29C) treated with sodium azide ($NaN_3$) or (FIGS. 29D-29F) incubated at 4° C. for blocking energy-dependent endocytosis (red bars). Cells under normal cell culture conditions (37° C. without $NaN_3$) serve as the positive control (green bars). Statistical analysis was conducted by two-tailed Student's t test. Not significant (ns) $P>0.05$. Error bar indicates standard deviation.
Figure 29B:
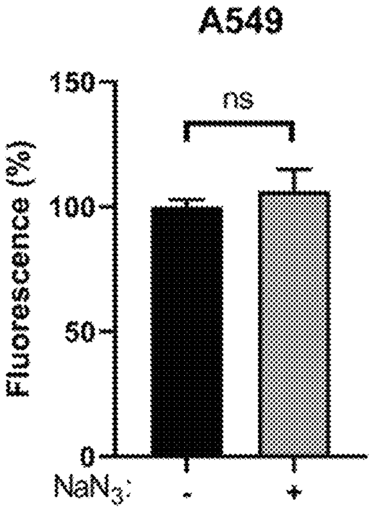
Figure 29C:
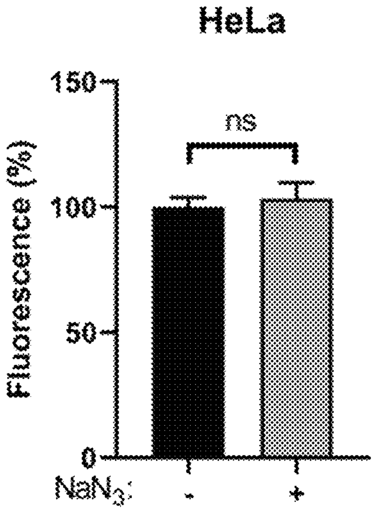
Figure 29D:
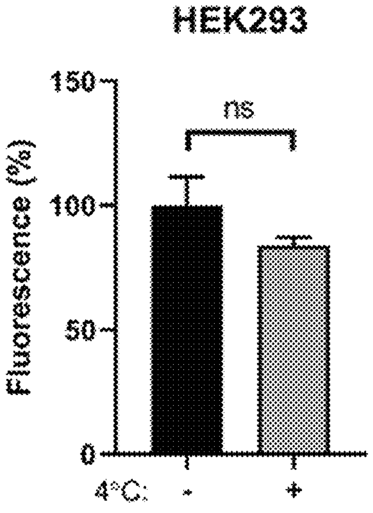
Figure 29E:
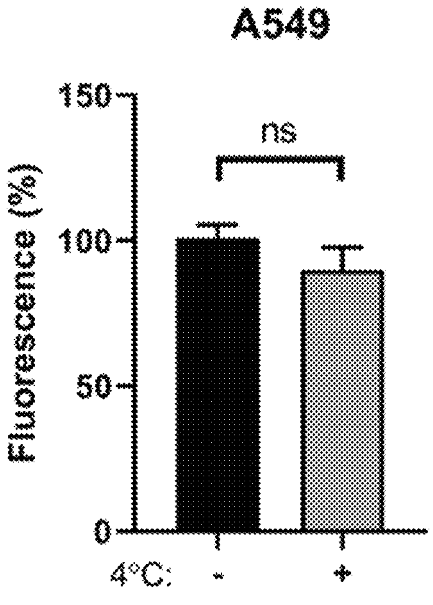
Figure 29F:
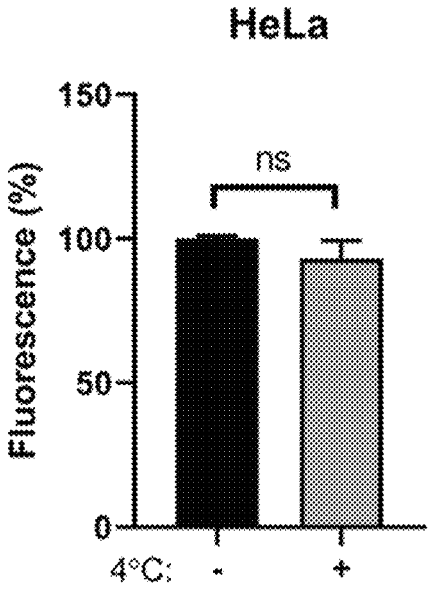

Before our cellular studies, we verified that incubation of HeLa, A549, and HEK293 cells with medium containing 2 μM leuco-BODIPY and 0.1% DMSO for 12 h did not severely reduce cell viability (FIGS. 28A-28C). We studied the mechanism for the cellular uptake of our probe by a pharmacological approach. Pretreatment of the three cell lines with sodium azide or preincubation of the cells at 4° C.[34] did not significantly affect the cellular uptake of our probe (FIGS. 29A-29F). These data indicate that energy-dependent endocytosis does not play a major role in cellular uptake; rather, the probe primarily enters the cell by diffusion, a result consistent with past reports on the cellular entry of other small molecular fluorescent probes.[35]

Figure 2A:
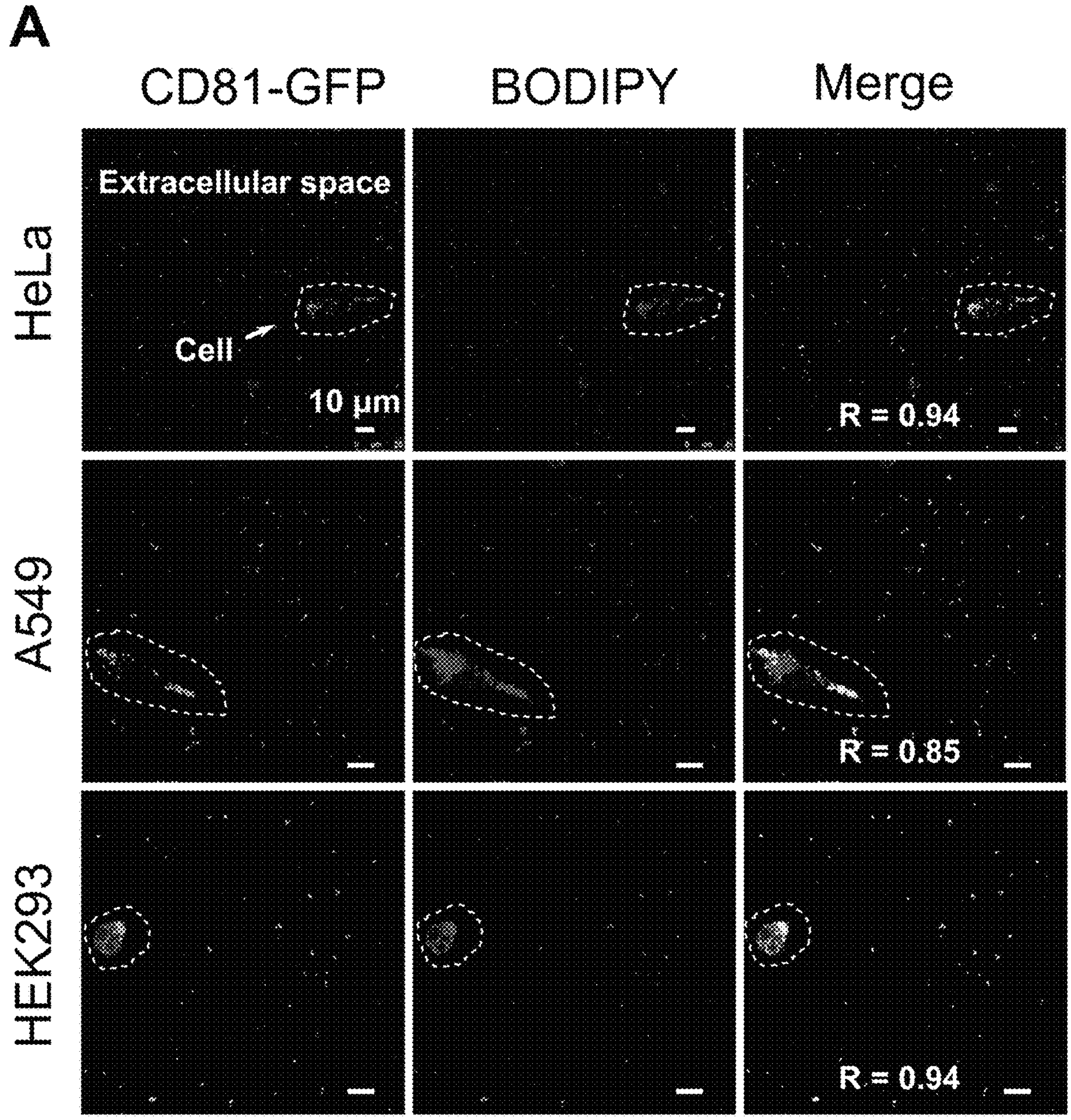
FIGS. 2A-2D In situ detection of EVs secreted by cells to the culture medium by this probe.
Figure 2B:
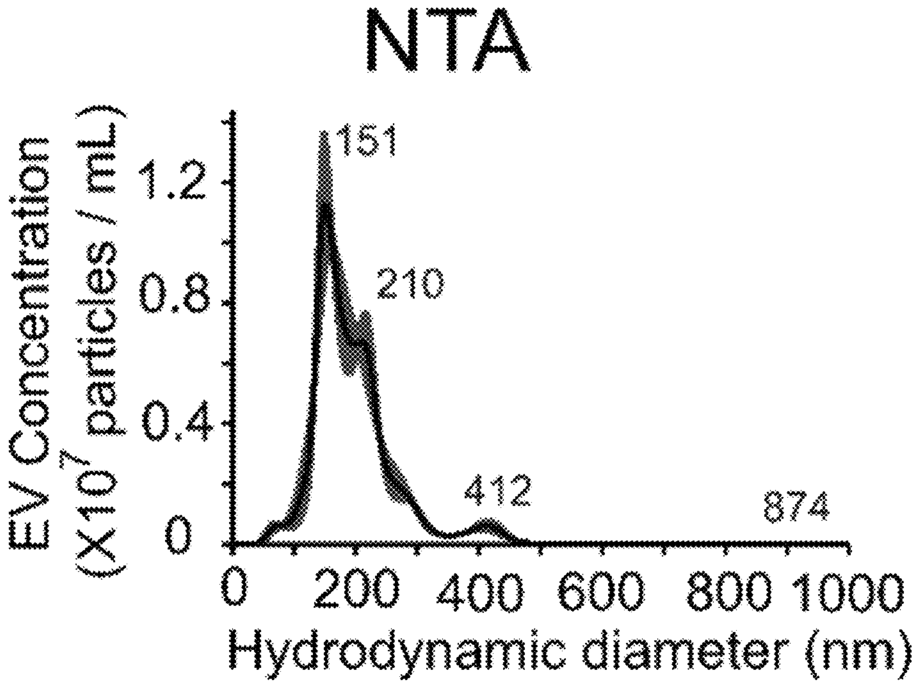
Figure 2C:
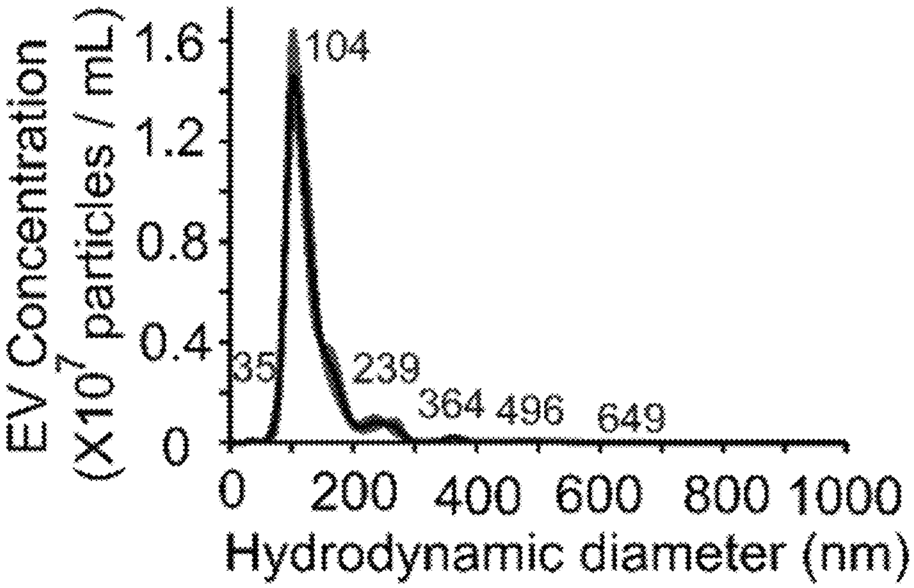
Figure 2D:
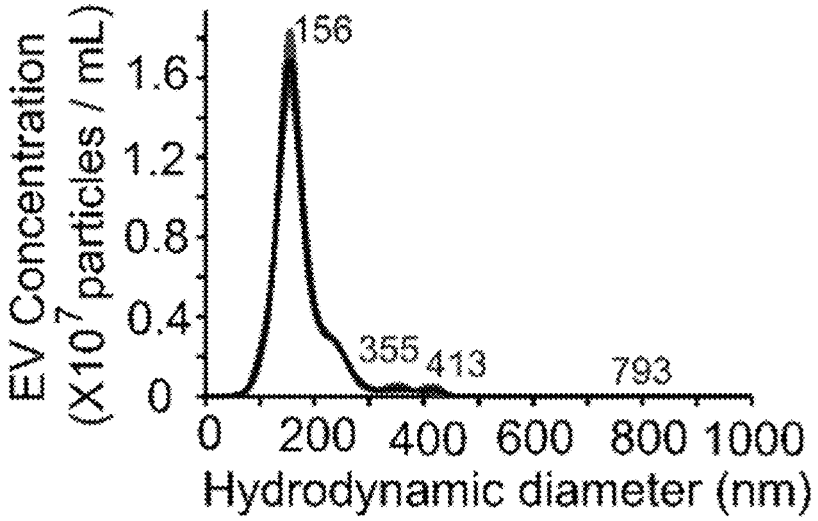
Figure 4A:
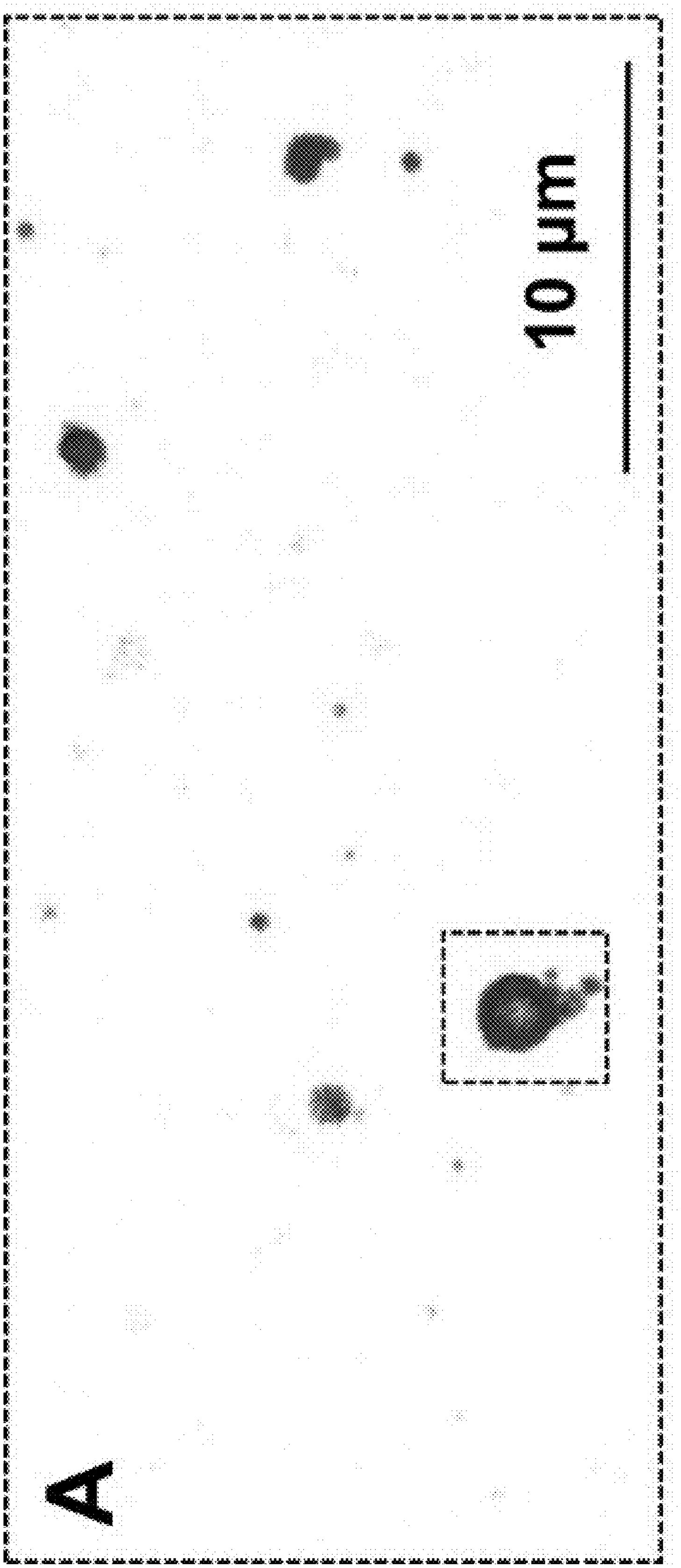
FIGS. 4A-4C Visualizing extracellular multivesicular bodies MVBs (EMVBs) in the medium. (A) Confocal fluorescence images of HeLa cells were treated with leuco-BODIPY for 30 min and imaged by confocal microscopy. The serial focal planes were 0.3 μm apart and were illuminated. Red indicates the fluorescence of BODIPY. The 3D reconstruction images were generated by the Leica LAS-X software. Scale bar=10 (FIG. 4B) Enlarged images of the boxed area in Panel (FIG. 4A) indicate extracellular MVB-like large EVs (EMVBs). This image was generated with depth coding, using different colors to indicate the position of the z-axis. Scale bar=1 μm.
Figure 4B:
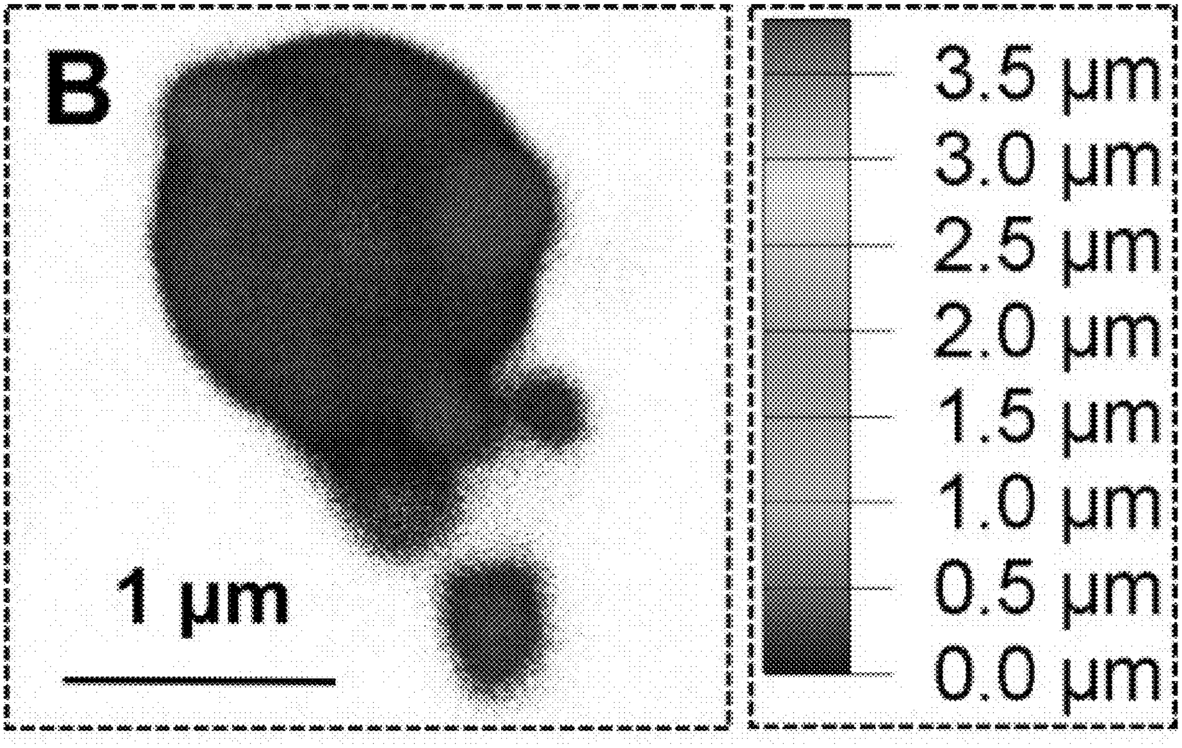
Figure 4C:
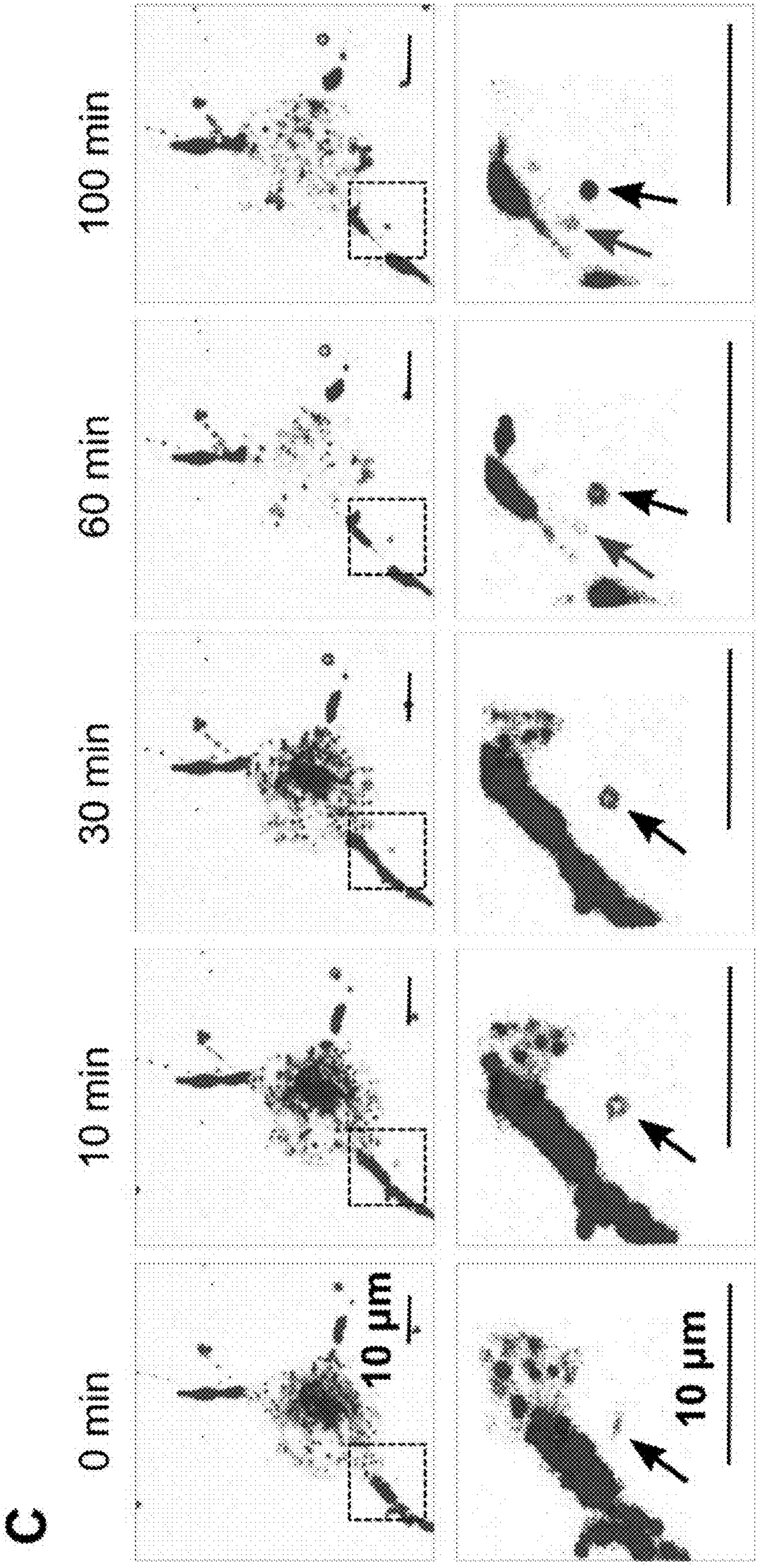
Figure 30:
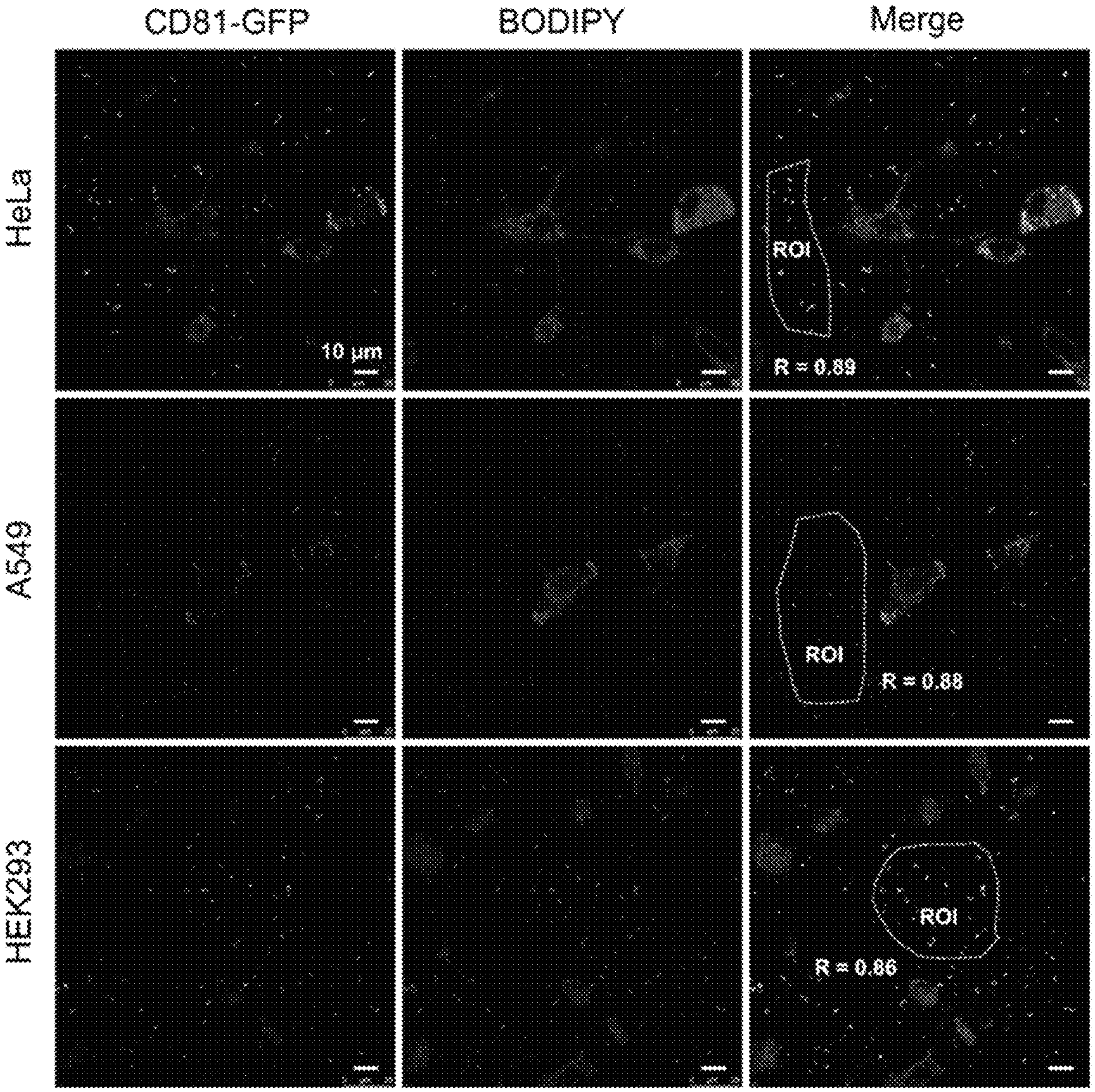
FIG. 30 In situ detection of EVs secreted by cells to the culture medium. HeLa cells, A549 cells, and HEK293 cells that express GFP-tagged CD81 were treated with leuco-BODIPY for 30 min. Note that the cells were not rinsed with PBS to retain the secreted EVs in the conditioned medium for in situ imaging. Scale bar=10 μm. R values indicate the Pearson colocalization coefficients between the fluorescence of BODIPY (red) and CD81-GFP (green) in the extracellular region. ROI represents region of interest. Similar imaging data of the extracellular space and intracellular space are presented in FIG. 2 and FIG. 3, respectively.
Figure 31:
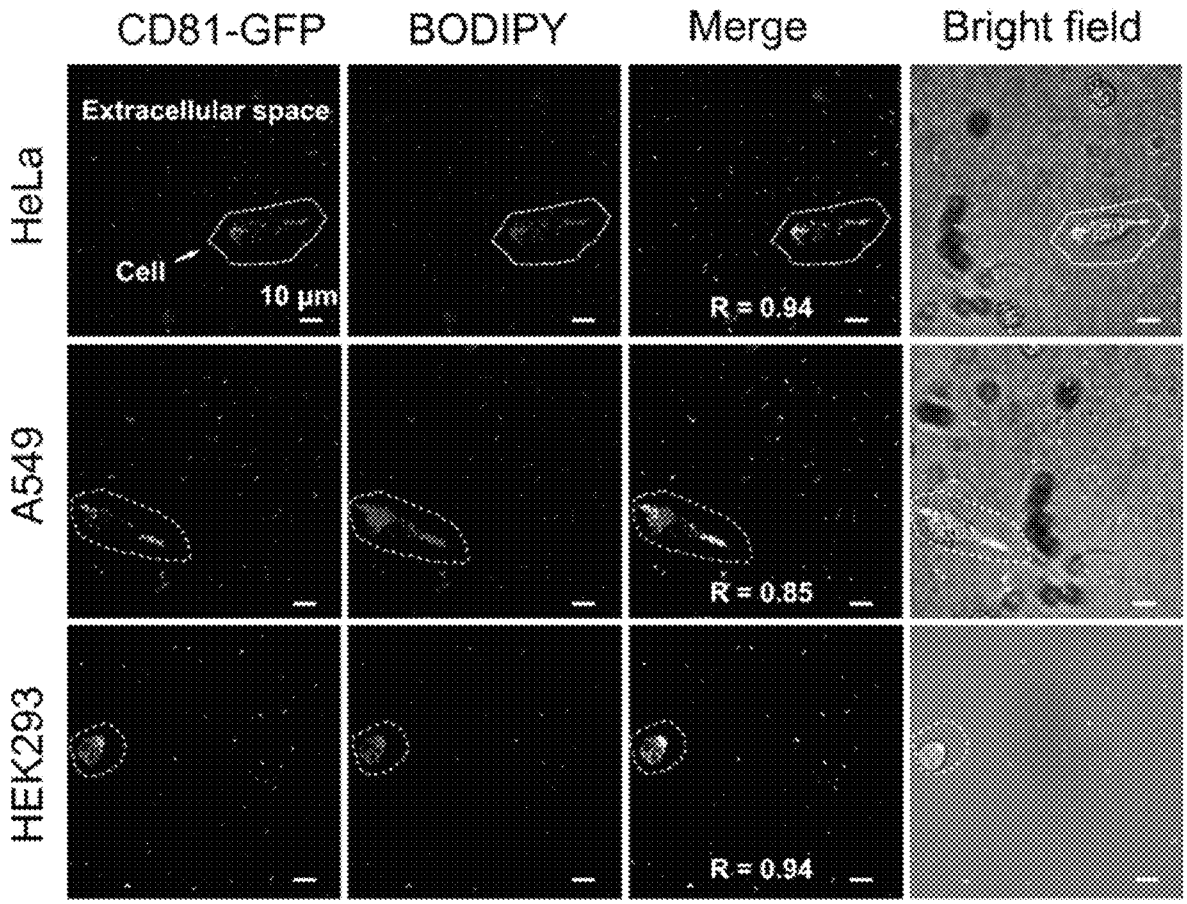
FIG. 31 In situ detection of EVs secreted by cells to the culture medium. HeLa cells, A549 cells, and HEK293 cells that express GFP-tagged CD81 were treated with leuco-BODIPY for 30 min. Note that the cells were not rinsed with PBS to retain the secreted EVs in the conditioned medium for in situ imaging. Scale bar=10 μm. R values indicate the Pearson colocalization coefficients between the fluorescence of BODIPY (red) and CD81-GFP (green) in the extracellular region. ROI represents region of interest. Identical imaging data that show the CD81-GFP, BODIPY, and merge channels are shown in FIG. 2. The bright-field channel (rightmost column) is added to this supporting figure for clear presentation of the location and shape of the cell.

Then, we seeded HeLa, A549, or HEK293 cells that express GFP-tagged CD81 in a confocal dish and incubated the cells with phenol red-free medium containing 2 μM leuco-BODIPY and 0.1% DMSO for 30 min. Note that this probe is predominantly in its leuco-BODIPY form when dissolved in DMSO, as evidenced by its light-yellow color. We obtained confocal images of the cell-seeded medium without harvesting the EVs or rinsing the cells (FIGS. 2A, 30-31). Representative images of their extracellular space depict granular or spherical pockets of fluorescence from BODIPY (red) amidst a dark background. Notably, such pockets of BODIPY fluorescence strongly colocalize with those of CD81-enriched exosomes (green), as evidenced by Pearson's colocalization coefficients of 0.92, 0.85, and 0.94 for HeLa, A549, and HEK293 cells, respectively. These data suggest the detection of exosomes with this probe. The fluorescent pockets of BODIPY are submicron-sized or micron-sized, larger than the reported sizes of exosomes (50-200 nm).[36] As the resolution limit of confocal microscopy may overestimate the size of EVs, we isolated EVs from the cell-seeded medium for nanoparticle tracking analysis (NTA; FIG. 2B). The hydrodynamic size distribution of the EVs lies between about 50 nm and about 400 nm, with peak EV diameters of 151 nm, 104 nm, and 156 nm for HeLa, A549, and HEK293 cells, respectively. As these peak EV sizes corroborate the typical sizes of exosomes, we conclude that the EVs detected are mostly exosomes, with a smaller portion of larger ectosomes, clustered exosomes, or extracellular MVBs (FIGS. 4A-4C).

Example 4—Detection of Precursor EVs Inside the Cell

Figure 32A:
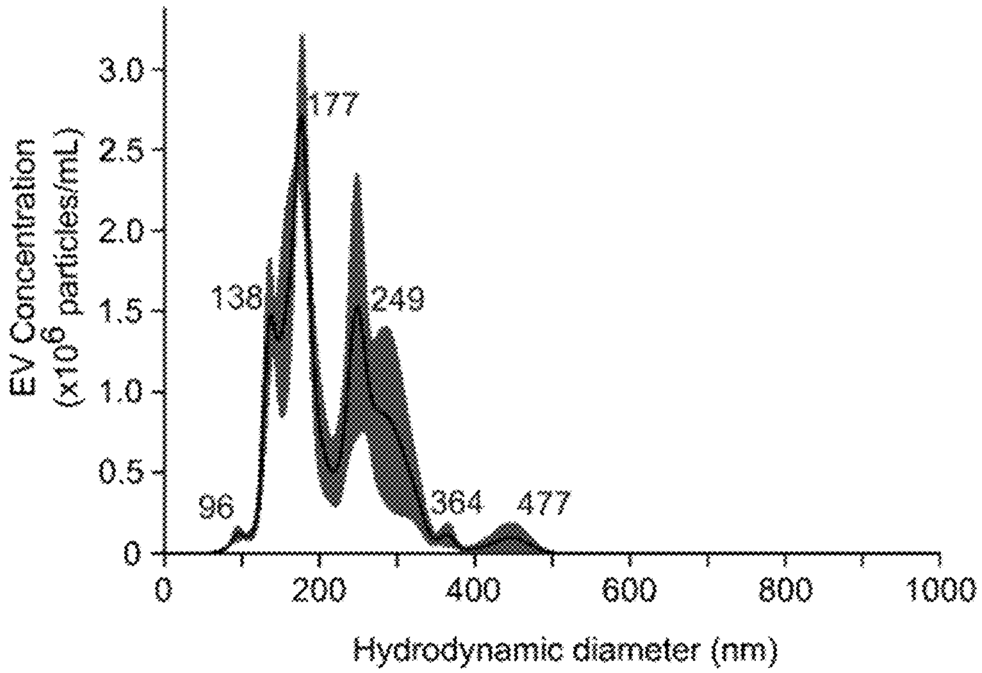
FIGS. 32A-32B Effect of probe staining on the secretion of EVs. HeLa cells were incubated with (FIG. 32A) complete DMEM or (FIG. 32B) DMEM containing 5 μM leuco-BODIPY for 3 h. After that, the EV sample was isolated from the cells for nanoparticle tracking analysis (NTA). The hydrodynamic diameter distribution profiles of the EVs secreted from dye-treated and untreated cells are similar, suggesting limited effect of dye staining on cellular response (particularly EV secretion).
Figure 32B:
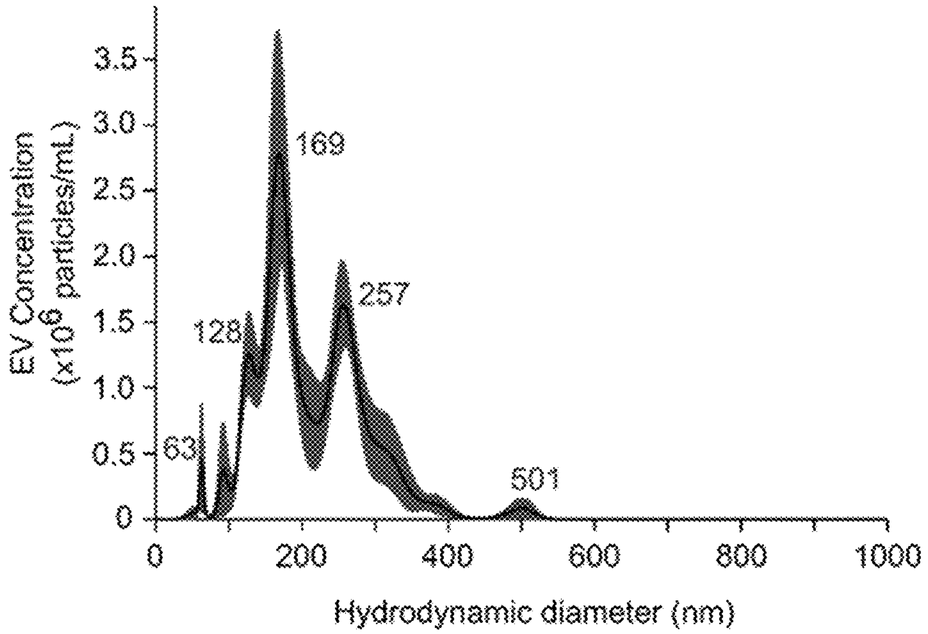

Moreover, we incubated the three cell types with our probe for 30 min, isolated the EVs secreted to the culture medium, centrifuged the collected medium to remove any dye-stained cell fragments, and confirmed the detection of fluorescence in the isolated EVs (Table 1). By contrast, for the EVs isolated from the same cell types under the same culture conditions but without treatment by our probe, the fluorescence detected was at the background level of blank culture medium. As our probe does not fluoresce in medium, the data suggest its localization in the EVs. Furthermore, previous studies showed that dyes used for labelling cells may affect cellular response.[37] Here, we isolated EVs from HeLa cells treated with our dye and those from unstained cells. NTA reveals that the size distribution of the EVs isolated from the dye-stained and unstained cells are similar (FIGS. 32A-32B), implying limited effect of our probe on EV secretion.

Table 1: Estimate of the number of signals per EV. The fluorescence signal per EV is expressed in arbitrary units (a.u.), a relative value that highly depends on pH, dye concentration, and laser power. To obtain a physical meaning of the relative fluorescence signal per EV, it may seem conceptually straightforward to convert the fluorescence of the dye-labeled EVs to the concentration of dyes per EVs using a simple calibration curve of the probe referenced at a given pH. However, note that the size and intraluminal pH of the EV population is heterogeneous and that our probe fluoresces at different intensities at different pH (FIGS. 1A-1E). Therefore, choosing one representative pH to account for the entire EV population and using this arbitrarily chosen reference pH for converting fluorescence back to probe concentration may not give a realistic picture of the performance of EV labeling.

| Cell type | Mean number of EVs tested | Standard deviation number of EVs tested | Mean fluorescence signal per EV (a.u.) | Standard deviation fluorescence signal per EV (a.u.) |
|---|---|---|---|---|
| A549 | $6.98 \times 10^{8}$ | $3.28 \times 10^{7}$ | $4.17 \times 10^{-7}$ | $1.71 \times 10^{-8}$ |
| HeLa | $4.00 \times 10^{8}$ | $2.02 \times 10^{7}$ | $4.63 \times 10^{-7}$ | $7.75 \times 10^{-8}$ |
| HEK293 | $3.31 \times 10^{8}$ | $1.25 \times 10^{7}$ | $1.67 \times 10^{-6}$ | $2.31 \times 10^{-7}$ |

Figure 33A:
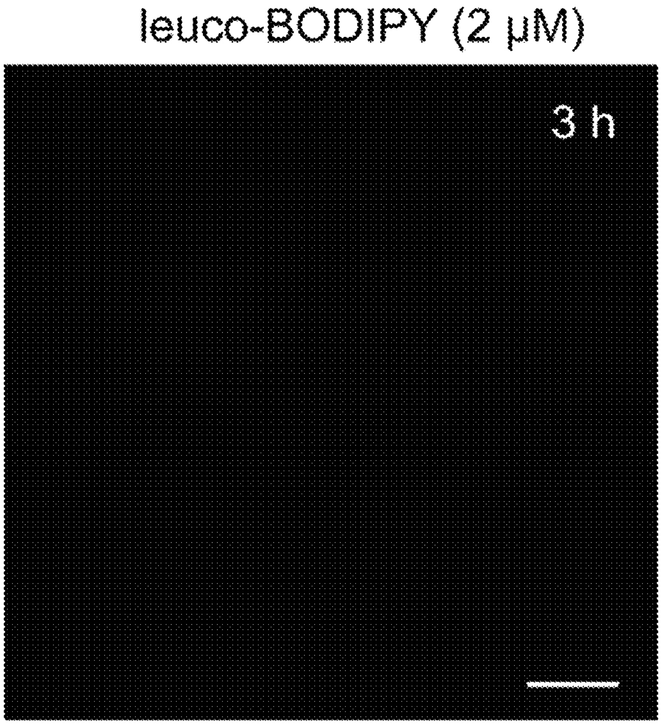
FIGS. 33A-33D Representative confocal images of phenol red-free DMEM after incubation with fluorescence dyes in the absence of seeded cells for the designated time duration.
Figure 33B:
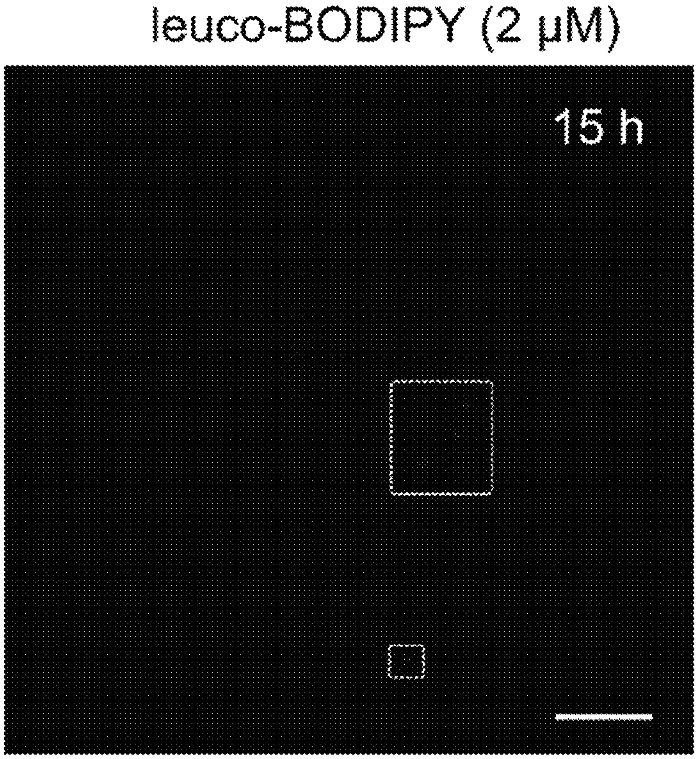
Figure 33C:
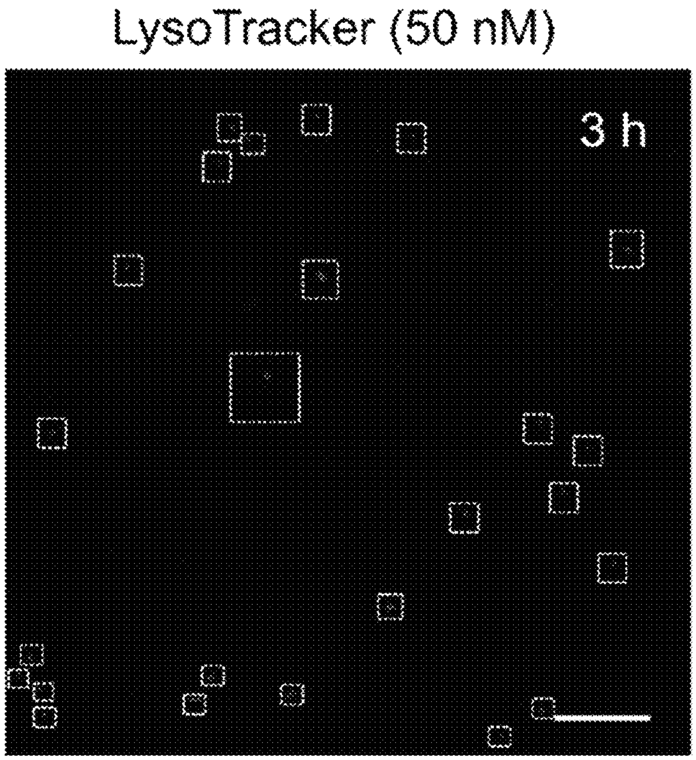
Figure 33D:
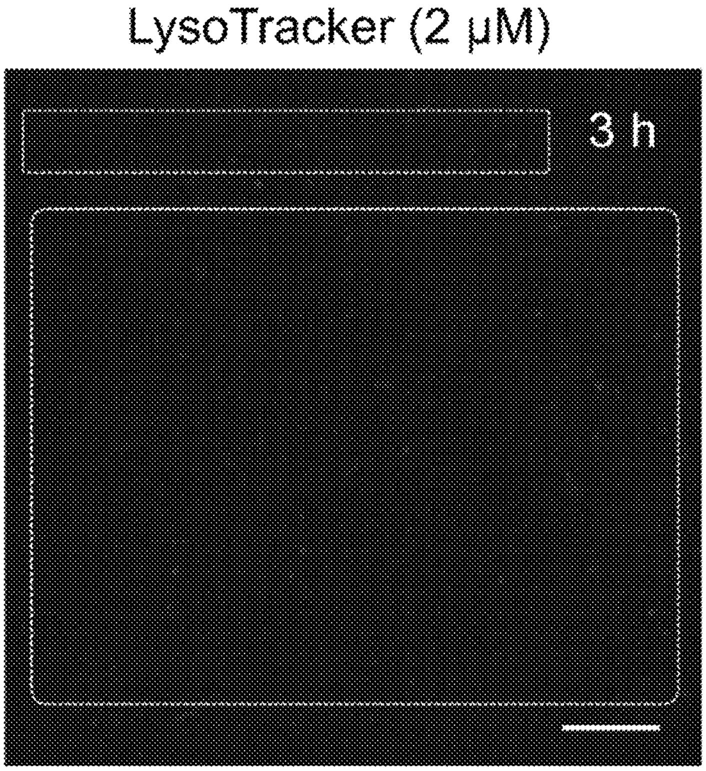
Figure 34:
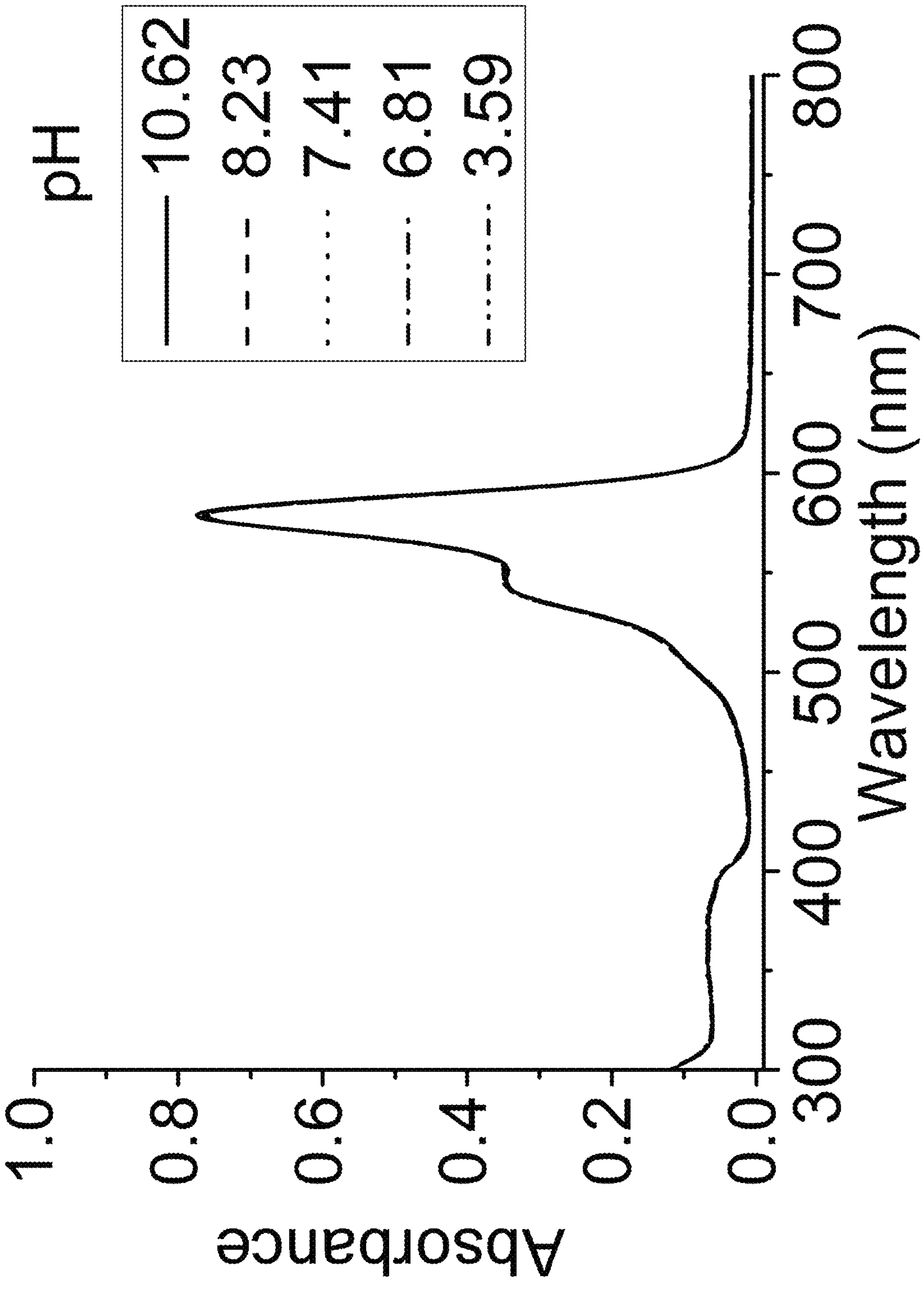
FIG. 34 Absorbance spectrum of LysoTracker Red as a function of pH in $C_2H_5OH$/PBS (1:1, v/v).
Figure 35:
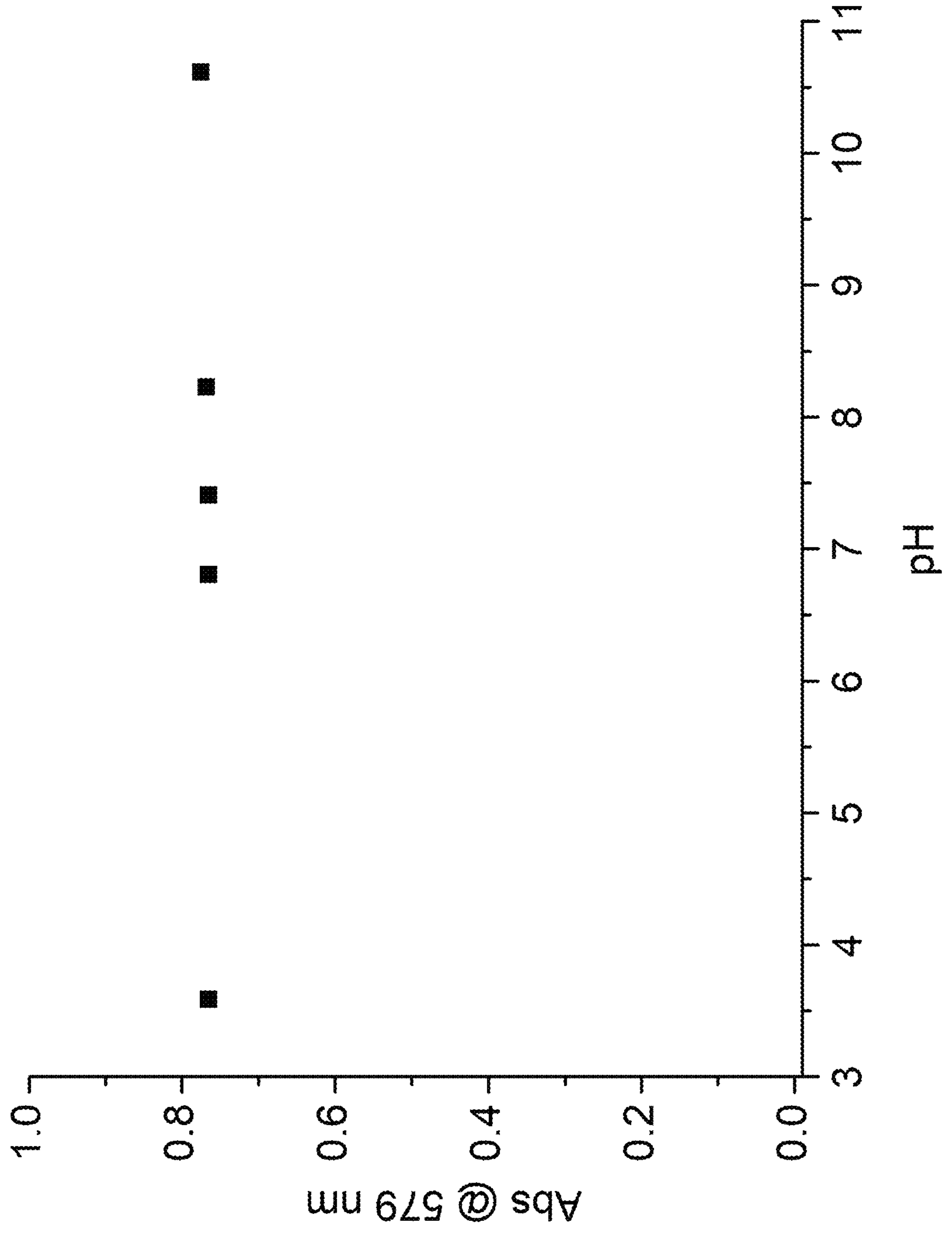
FIG. 35 Absorbance of LysoTracker Red at the peak absorbance wavelength of 579 nm as a function of pH in $C_2H_5OH$/PBS (1:1, v/v).
Figure 36:
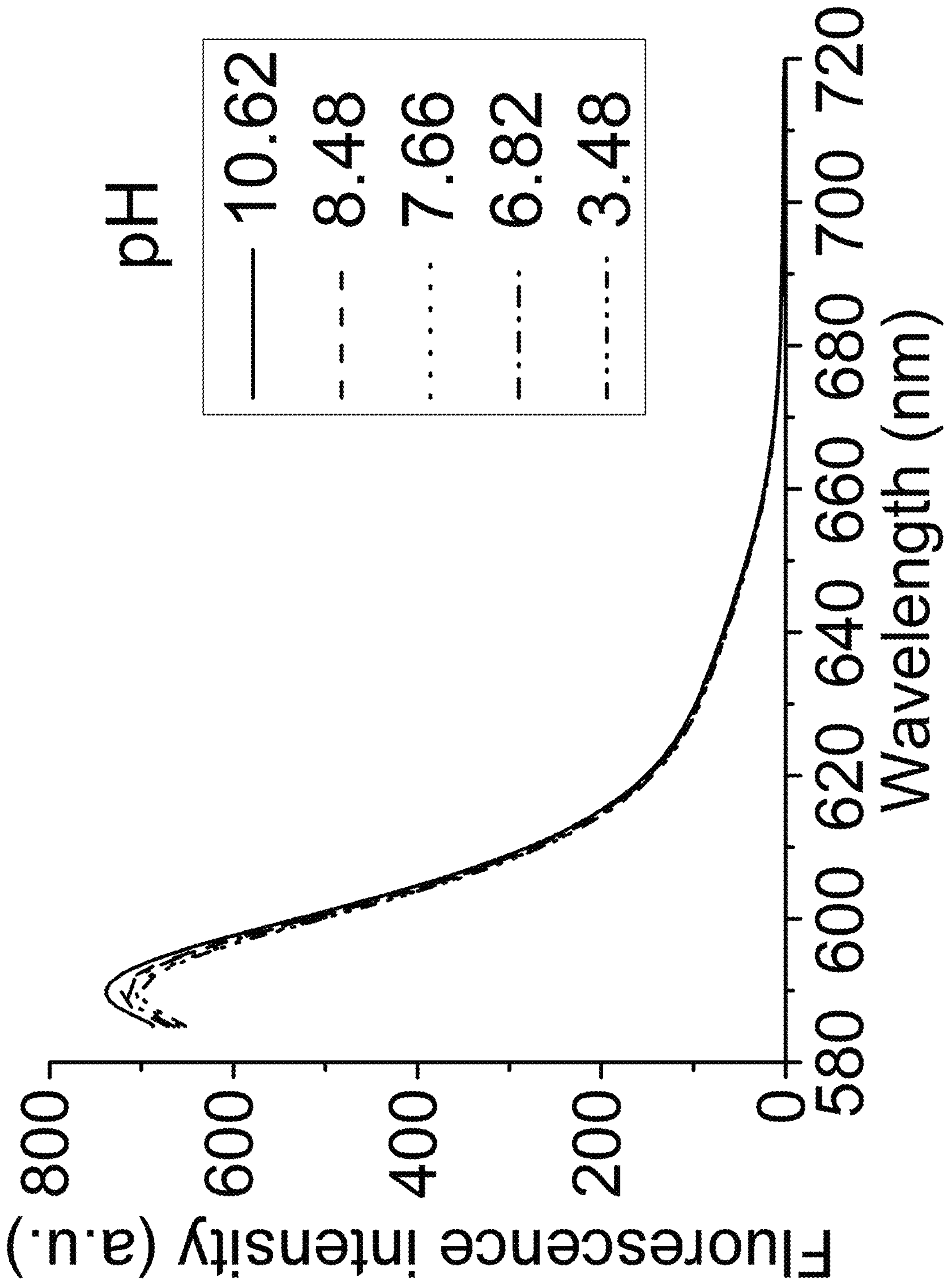
FIG. 36 Fluorescence emission spectrum of LysoTracker Red as a function of pH in $C_2H_5OH$/PB S (1:1, v/v).
Figure 37:
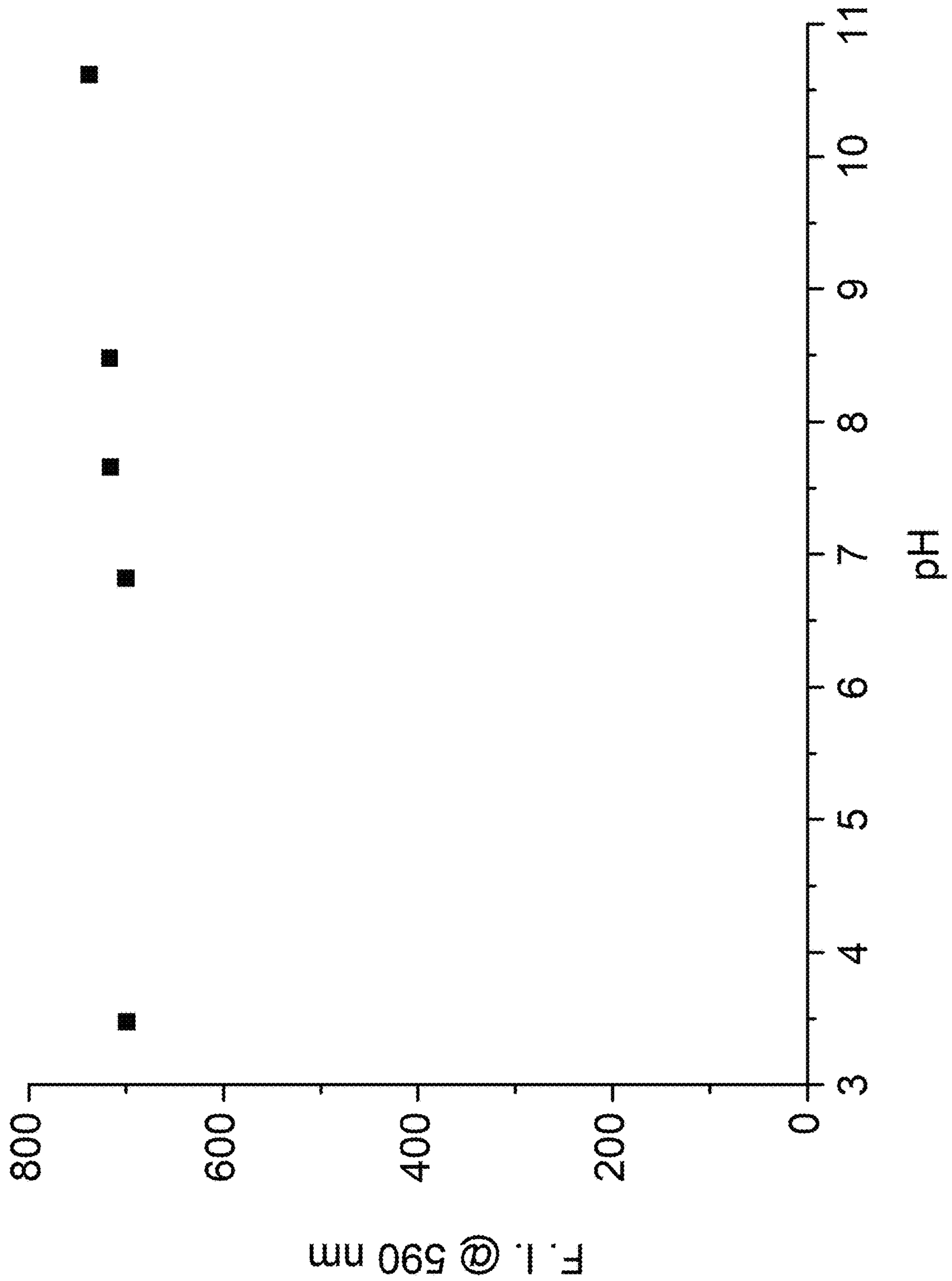
FIG. 37 Fluorescence intensity of LysoTracker Red at the peak emission wavelength of 590 nm as a function of pH in $C_2H_5OH$/PBS (1:1, v/v).

To confirm that our observed BODIPY fluorescence does not stem from false positive artefacts, we took confocal images of a solution of leuco-BODIPY dissolved in medium at the same concentration (2 μM) but without cells seeded in the confocal dish. By using the same laser settings as our experimental group with cells seeded, we captured no detectable fluorescence 3 h post-incubation (FIG. 33A) and limited signals 15 h post-incubation (FIG. 33B). As a negative control, when we imaged phenol red-free medium containing LysoTracker™ Red (a commercial dye with a similar emission wavelength as BODIPY for staining acidic organelles) without cells seeded in the confocal dish, we detected false positive dot-like or speck-like signals when the dye concentration was 50 nM (as recommended by the manufacturer; FIG. 33C) and severe background emission when the concentration was 2 μM (on par with our probe; FIG. 33D) 3 h post-incubation. LysoTracker™ Red is a pH-insensitive dye with near-constant absorbance (FIGS. 34-35) and "always-on" fluorescence (FIG. 36-37) across a pH range of 3-11. As LysoTracker™ Red may yield false positive signals if aggregated in medium, we did not use LysoTracker™ Red for further EV imaging studies. Collectively, the results underscore the importance of imaging EVs in medium by using dyes with limited (ideally zero) background to eliminate false positive signals that may bias image interpretation.

Figure 3:
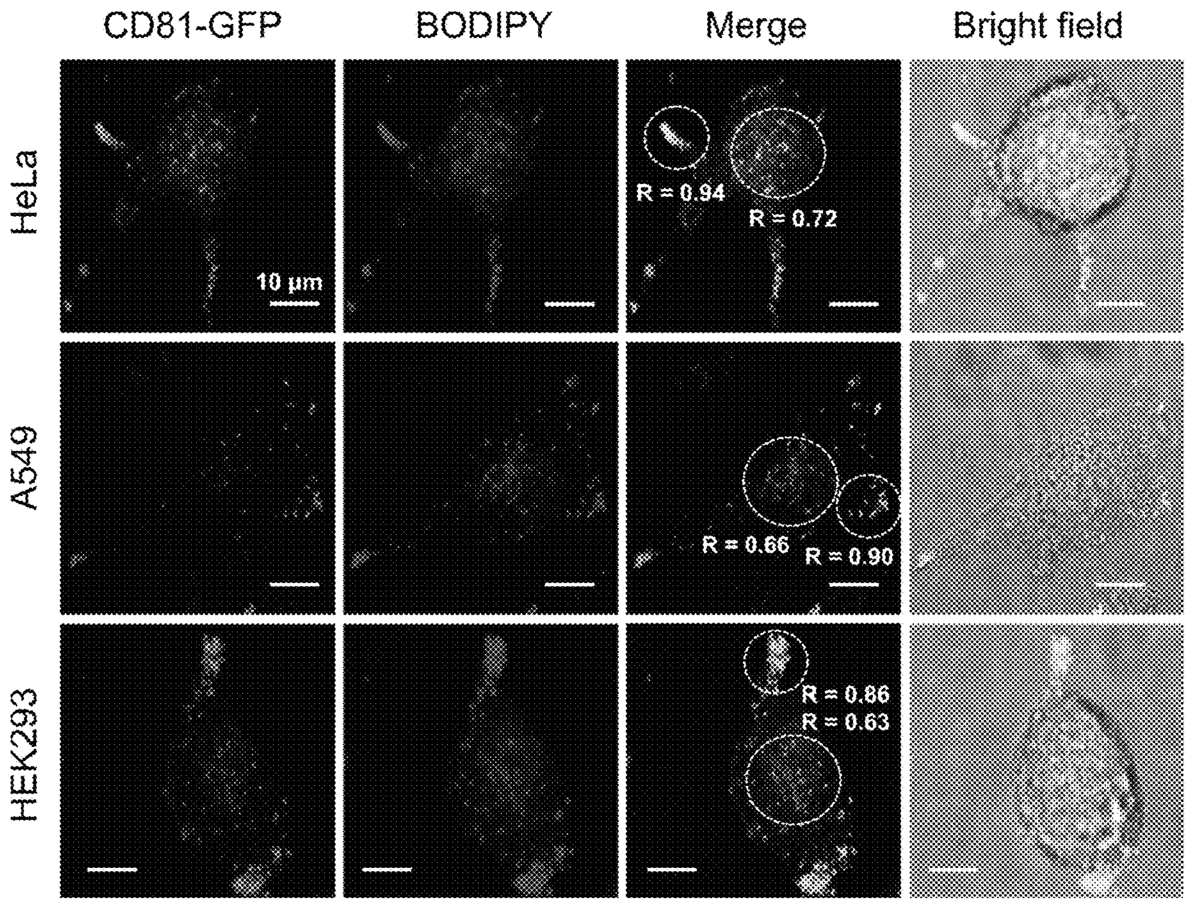
FIG. 3. Detection of intracellular precursor EVs by this probe. HeLa cells, A549 cells, and HEK293 cells that express GFP-tagged CD81 (green) were added with leuco-BODIPY for 30 min and then imaged by confocal microscopy. Yellow color inside the cell indicates overlap of fluorescence between GFP-tagged CD81 (green) and BODIPY (red), with the strongest overlap located at the cell tips. R values indicate the Pearson colocalization coefficients between BODIPY and CD81-GFP. Scale bar=10 μm.
Figure 38:
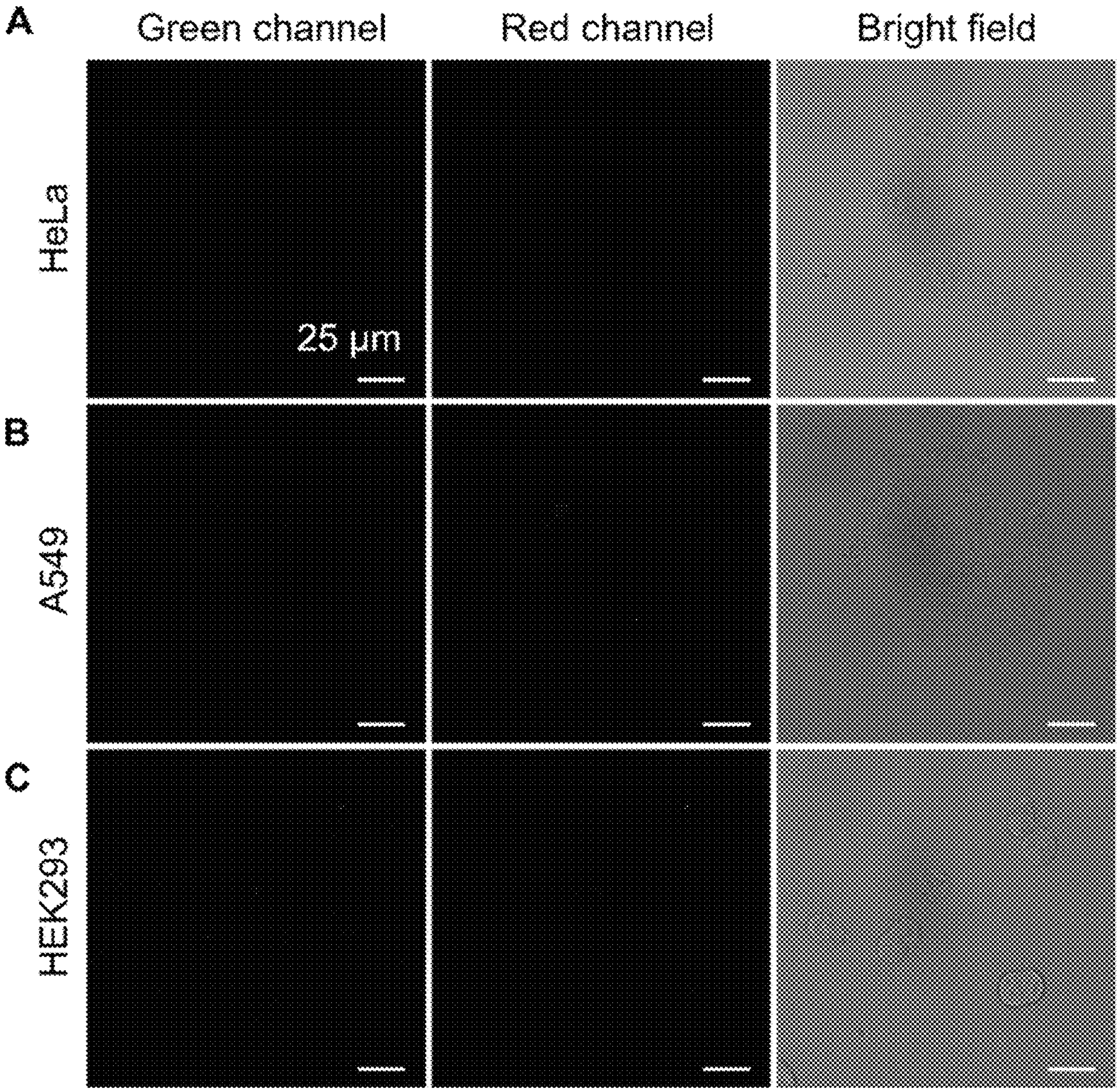
FIG. 38 Representative confocal images of (FIG. 38A) HeLa cells, (FIG. 38B) A549 cells, and (FIG. 39C) HEK293 cells seeded in phenol red-free medium without adding leuco-BODIPY. These images were captured by using the same settings as those that show cells seeded in the same medium but with leuco-BODIPY added (as shown in FIG. 3). No appreciable cellular autofluorescence in the green channel (for GFP-tagged CD81) or red channel (for BODIPY) was detected.

Next, we attempted to use our probe for imaging intracellular precursor EVs before their secretion to the extracellular milieu. Again, we added leuco-BODIPY (dissolved in DMSO) to culture medium seeded with HeLa, A549, or HEK293 cells that express GFP-tagged CD81 for 30 min (FIG. 3). Representative confocal images of all cell types capture more intense pockets of BODIPY fluorescence (red) and GFP-CD81 fluorescence (green) on the pseudopodia (i.e., finger-like protrusions consisting of actin and microtubules[38, 39]) of cell membrane than the cytoplasm, consistent with the role of CD81 in forming membrane protrusions,[40] regulating cell migration,[41] and secretion.[42] Notably, the imaging data depict strong overlap between BODIPY and GFP-CD81 fluorescence (yellow) on the pseudopodia, with Pearson's colocalization coefficients of 0.94, 0.90, and 0.86 for HeLa, A549, and HEK293 cells, respectively. Contrarily, the overlap between BODIPY and GFP-CD81 fluorescence in the cytoplasm is moderate, characterized by Pearson's colocalization coefficients of 0.72, 0.66, and 0.63 for HeLa, A549, and HEK293 cells, respectively. As a negative control, we captured confocal images of the three cell lines but without adding leuco-BODIPY to the medium. By using the same laser settings as our experimental group with leuco-BODIPY added, we did not detect appreciable levels of autofluorescence from the cells (FIGS. 38A-38B), confirming that our captured fluorescence signals originate from BODIPY. These data are consistent with the literature precedent that documented the localization of precursor EVs (e.g., MVBs) on the pseudopodia for secreting exosomes.[43]

Example 5—Real-Time Secretion of Extracellular Multivesicular Bodies (EMVBs)

We applied our probe to visualize the secretion of larger types of EVs than exosomes, because our NTA data indicate an EV size range of 50-900 nm (FIG. 2B). After adding leuco-BODIPY to medium seeded with HeLa cells, we observed by confocal imaging EMVBs that measure about 1 μm in diameter and resemble MVBs rather than clusters of exosomes in the medium (FIG. 4A). Our three-dimensionally reconstructed image of a representative EMVB portrays smaller exosomes inside or near an MVB-like microvesicle (FIG. 4B). To gain insights into EV secretion, we added leuco-BODIPY to HeLa cells and captured a representative extracellular area adjacent to the pseudopodium of a cell (FIG. 4C). Time-course confocal imaging for about 100 min reveals the formation of donut-shaped microvesicles near the pseudopodium (green and black arrows), matching our observation of the overlapping fluorescence between CD81 and BODIPY (FIG. 3). These data led us to hypothesize the involvement of pseudopodia in EV secretion because previous reports documented a linkage between exocytic events and pseudopodia formation.[42]

Example 6—Microtubules Inside Pseudopodia as Trackways for EV Secretion

Figure 5A:
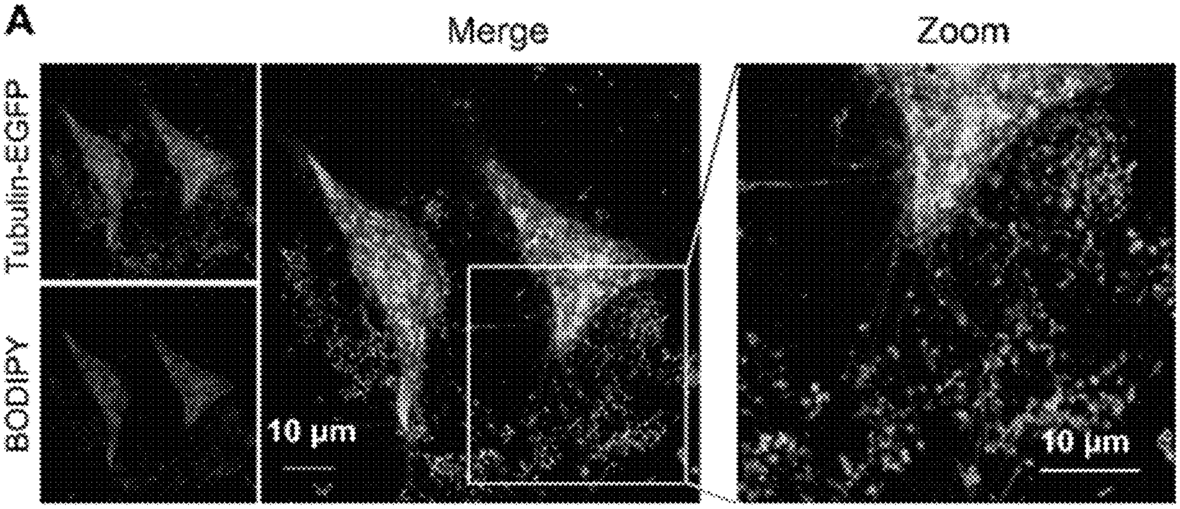
FIGS. 5A-5D. Transport of EVs along microtubules inside pseudopodia.
Figure 5B:
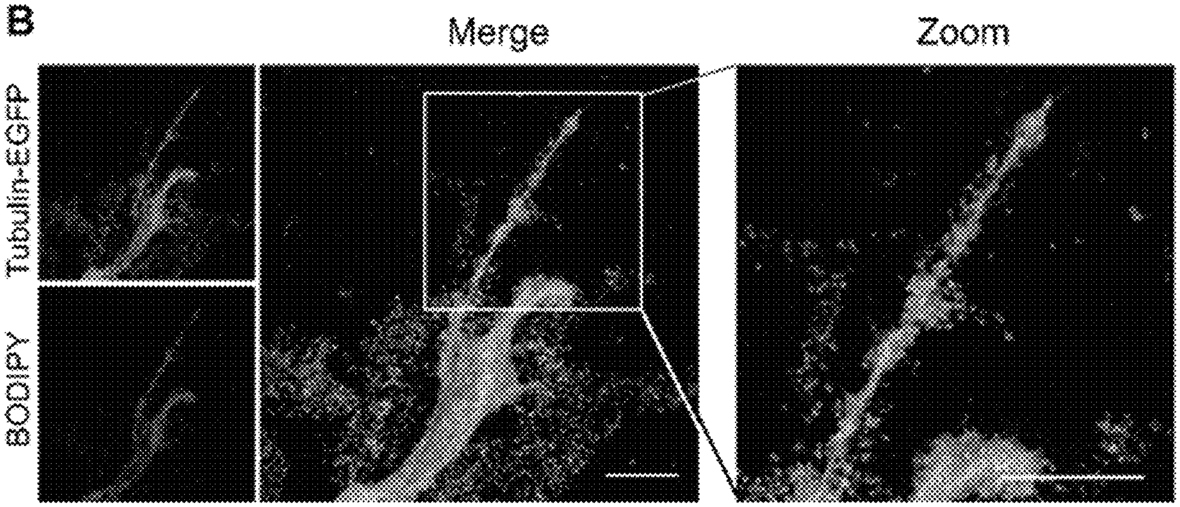
Figure 5C:
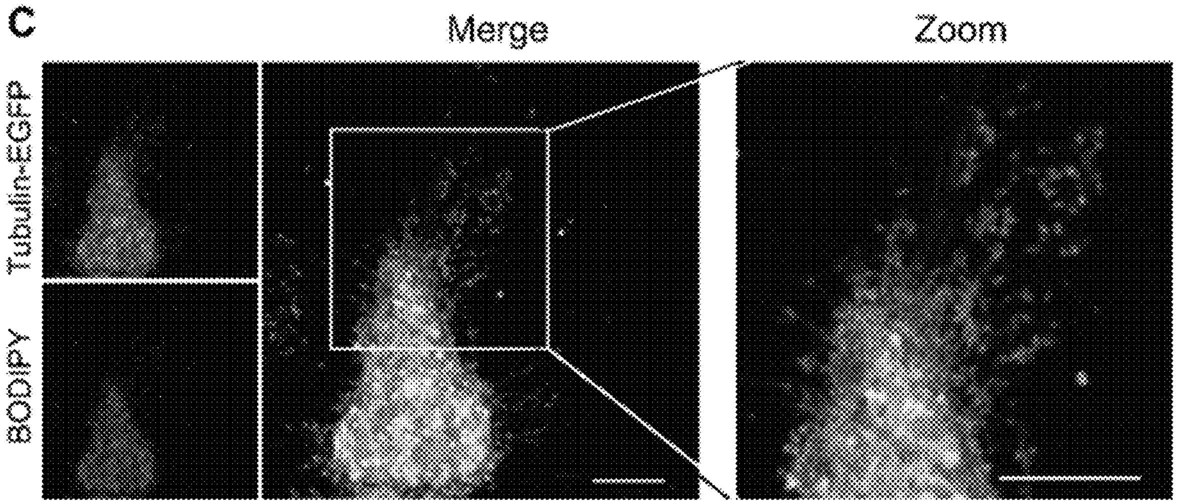
Figure 5D:
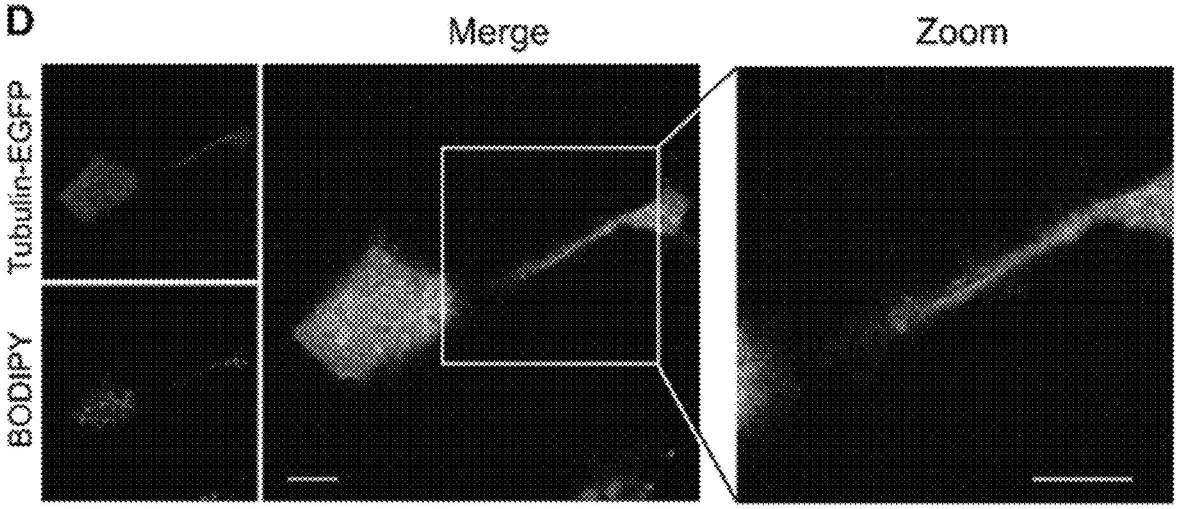
Figure 6:
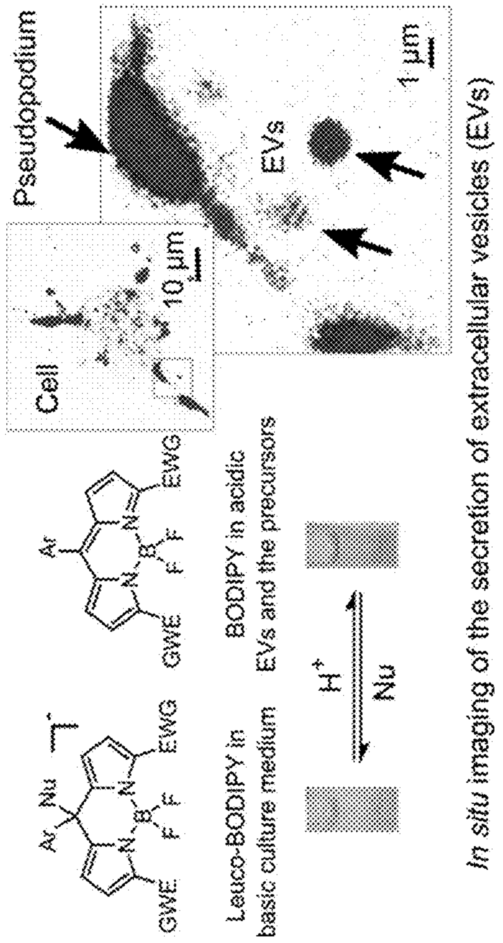
FIG. 6 In situ imaging of the secretion of extracellular vesicles (EVs).

Passive diffusion is an established mode of transport for EVs to reach an extracellular region distant from the originating cell,[44, 45] yet our mechanistic understanding in the active transport of precursor EVs to the extracellular milieu remains limited. Classically, cytoskeleton elements such as actin[46] and microtubule[47] regulate the formation and movement of pseudopodia; whereas the formation of lamellipodia occurs via actin polymerization independently of microtubules, microtubules are required for cell migration, tail retraction, and modulation of cell adhesion.[48] A recent study reveals that, in migrating cells, intraluminal vesicles (ILVs)-containing microvesicles grow on degenerative, branched thin pseudopodia (i.e., retraction fibers) that eventually degenerate and release the ILVs in the extracellular space as EVs.[49] As retraction fibers are rich in actin,[50] this study suggests the involvement of actin filaments in EV secretion. Here, we questioned if microtubules participate in the extracellular transport of EVs because, like actin filaments, microtubules also serve as intracellular trackways for transporting vesicles. To this end, we applied our probe in combination with plasmid transfection to visualize the transport of EVs along microtubules inside pseudopodia. After transfecting HeLa and A549 cells with plasmids that encode tubulin-6 (a major constituent of microtubules) tagged with enhanced green fluorescent protein (EGFP) for 1-3 d, we incubated the cells with leuco-BODIPY for 30 min (FIGS. 5A-5D). Confocal imaging depicts the distribution of tubulin-6 in thinner strands that resemble retraction fibers[49] (FIGS. 5A, 5C) and thicker pseudopodia that are branched and shaped like leaf veins (FIGS. 5B, 5D). For both cell types tested, we detected the alignment of precursor EVs to the thinner strands and along the thicker pseudopodia. Time-lapse imaging confirms the movement of EVs along the microtubules away from the cell. These data demonstrate the utility of our probe for visualizing the transport of precursor EVs before their release as EVs.

Example 7—pH-Reversible Molecular Fluorescent Probe

The subject pH-reversible molecular fluorescent probe supports in situ visualization of EVs (say CD81-enriched exosomes) in three cell types and the secretion of EVs from living cells without inducing severe cytotoxicity. Careful design of the BODIPY core-reactive molecular structure enables the adjustment of its pKa, onset point of fluorescence, and pH-dependent photophysical properties for visualizing cellular processes. Upon attack by nucleophiles, the probe switches from its parent BODIPY form that emits bright magenta fluorescence to its non-fluorescent leuco-BODIPY form. Conversely, after engaging secreted EVs in the medium or intracellular precursor EVs containing acidic lumen, leuco-BODIPY reverts to BODIPY with an onset point of fluorescence at pH of about 7.4. This probe not only obviates the need for EV isolation prior to imaging, but also supports imaging of EVs in medium with pronouncedly attenuated false positive signals when compared to "always-on" fluorescent dyes. Finally, our probe may offer insights into the mechanism for EV secretion. By applying our probe jointly with plasmid transfection, we have shown that some precursor EVs traverse along microtubules in the pseudopodia before their secretion as EVs.

It should be understood that the examples and embodiments described herein are for illustrative purposes only and that various modifications or changes in light thereof will be suggested to persons skilled in the art and are to be included within the spirit and purview of this application. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

1. Kalluri, R.; LeBleu, V. S., The Biology, Function, and Biomedical Applications of Exosomes. *Science* 2020, 367 (6478), eaau6977.
2. Shao, H.; Im, H.; Castro, C. M.; Breakefield, X.; Weissleder, R.; Lee, H., New Technologies for Analysis of Extracellular Vesicles. *Chem. Rev.* 2018, 118 (4), 1917-1950.
3. Al-Nedawi, K.; Meehan, B.; Micallef, J.; Lhotak, V.; May, L.; Guha, A.; Rak, J., Intercellular Transfer of the Oncogenic Receptor EGFRvIII by Microvesicles Derived from Tumour Cells. *Nat. Cell Biol.* 2008, 10 (5), 619-624.
4. Fais, S.; O'Driscoll, L.; Borras, F. E.; Buzas, E.; Camussi, G.; Cappello, F.; Carvalho, J.; Cordeiro da Silva, A.; Del Portillo, H.; El Andaloussi, S.; Ficko Trček, T.; Furlan, R.; Hendrix, A.; Gursel, I.; Kralj-Iglic, V.; Kaeffer, B.; Kosanovic, M.; Lekka, M. E.; Lipps, G.; Logozzi, M.; Marcilla, A.; Sammar, M.; Llorente, A.; Nazarenko, I.; Oliveira, C.; Pocsfalvi, G.; Rajendran, L.; Raposo, G.; Rohde, E.; Siljander, P.; van Niel, G.; Vasconcelos, M. H.; Yáñez-Mó, M.; Yliperttula, M. L.; Zarovni, N.; Zavec, A. B.; Giebel, B., Evidence-Based Clinical Use of Nanoscale Extracellular Vesicles in Nanomedicine. *ACS Nano* 2016, 10 (4), 3886-3899.
5. Yong, T.; Zhang, X.; Bie, N.; Zhang, H.; Zhang, X.; Li, F.; Hakeem, A.; Hu, J.; Gan, L.; Santos, H. A.; Yang, X., Tumor Exosome-Based Nanoparticles are Efficient Drug Carriers for Chemotherapy. *Nat. Commun.* 2019, 10 (1), 3838.
6. Meldolesi, J., Exosomes and Ectosomes in Intercellular Communication. *Curr. Biol.* 2018, 28 (8), R435-R444.
7. Cocucci, E.; Meldolesi, J., Ectosomes and Exosomes: Shedding the Confusion Between Extracellular Vesicles. *Trends Cell Biol.* 2015, 25 (6), 364-372.
8. Shen, L.-M.; Quan, L.; Liu, J., Tracking Exosomes in Vitro and in Vivo To Elucidate Their Physiological Functions: Implications for Diagnostic and Therapeutic Nanocarriers. *ACS Appl. Nano Mater.* 2018, 1 (6), 2438-2448.
9. Miesenböck, G.; De Angelis, D. A.; Rothman, J. E., Visualizing Secretion and Synaptic Transmission with pH-sensitive Green Fluorescent Proteins. *Nature* 1998, 394 (6689), 192-195.
10. Sung, B. H.; von Lersner, A.; Guerrero, J.; Krystofiak, E. S.; Inman, D.; Pelletier, R.; Zijlstra, A.; Ponik, S. M.; Weaver, A. M., A Live Cell Reporter of Exosome Secretion and Uptake Reveals Pathfinding Behavior of Migrating Cells. *Nat. Commun.* 2020, 11 (1), 2092.
11. Ma, B.; Zhang, S.; Jiang, H.; Zhao, B.; Lv, H., Lipoplex Morphologies and Their Influences on Transfection Efficiency in Gene Delivery. *J. Controlled Release* 2007, 123 (3), 184-194.
12. Dass, C. R., Lipoplex-mediated Delivery of Nucleic Acids: Factors Affecting in vivo Transfection. *J. Mol. Med.* 2004, 82 (9), 579-591.
13. Feng, L.; Xie, Y.; Au-Yeung, S. K.; Hailu, H. B.; Liu, Z.; Chen, Q.; Zhang, J.; Pang, Q.; Yao, X.; Yang, M.; Zhang, L.; Sun, H., A Fluorescent Molecular Rotor Probe for Tracking Plasma Membranes and Exosomes in Living Cells. *Chem. Commun.* 2020, 56 (60), 8480-8483.
14. Zhou, X.; Zhang, J.; Song, Z.; Lu, S.; Yu, Y.; Tian, J.; Li, X.; Guan, F., ExoTracker: A Low-pH-Activatable Fluorescent probe for Labeling Exosomes and Monitoring Endocytosis and Trafficking. *Chem. Commun.* 2020, 56 (94), 14869-14872.
15. Lyu, Y.; Cui, D.; Huang, J.; Fan, W.; Miao, Y.; Pu, K., Near-Infrared Afterglow Semiconducting Nano-Polycomplexes for the Multiplex Differentiation of Cancer Exosomes. *Angew. Chem., Int. Ed.* 2019, 58 (15), 4983-4987.
16. Wang, L.; Hiblot, J.; Popp, C.; Xue, L.; Johnsson, K., Environmentally Sensitive Color-Shifting Fluorophores for Bioimaging. *Angew. Chem., Int. Ed.* 2020, 59 (49), 21880-21884.
17. Chan, J.; Dodani, S. C.; Chang, C. J., Reaction-Based Small-Molecule Fluorescent Probes for Chemoselective Bioimaging. *Nat. Chem.* 2012, 4, 973-984.
18. Kashima, H.; Kamiya, M.; Obata, F.; Kojima, R.; Nakano, S.; Miura, M.; Urano, Y., Photoactivatable Fluorophores for Durable Labelling of Individual Cells. *Chem. Commun.* 2021, 57, 5802-5805.
19. Iwaki, H.; Kamiya, M.; Kawatani, M.; Kojima, R.; Yamasoba, T.; Urano, Y., Fluorescence Probes for Imaging Basic Carboxypeptidase Activity in Living Cells with High Intracellular Retention. *Anal. Chem.* 2021, 93 (7), 3470-3476.
20. Obara, R.; Kamiya, M.; Tanaka, Y.; Abe, A.; Kojima, R.; Kawaguchi, T.; Sugawara, M.; Takahashi, A.; Noda, T.; Urano, Y., γ-Glutamyltranspeptidase (GGT)-Activatable Fluorescence Probe for Durable Tumor Imaging. *Angew. Chem., Int. Ed.* 2021, 60 (4), 2125-2129.
21. Hu, D.; Zhang, T.; Li, S.; Yu, T.; Zhang, X.; Hu, R.; Feng, J.; Wang, S.; Liang, T.; Chen, J.; Sobenina, L. N.; Trofimov, B. A.; Li, Y.; Ma, J.; Yang, G., Ultrasensitive Reversible Chromophore Reaction of BODIPY Functions as High Ratio Double Turn on probe. *Nat. Commun.* 2018, 9 (1), 362.
22. Ma, L.; Ouyang, Q.; Werthmann, G. C.; Thompson, H. M.; Morrow, E. M., Live-Cell Microscopy and Fluorescence-Based Measurement of Luminal pH in Intracellular Organelles. *Front. Cell Dev. Biol.* 2017, 5, 71.
23. Liu, H.; Song, W.; Gröninger, D.; Zhang, L.; Lu, Y.; Chan, K. S.; Zhou, Z.; Rurack, K.; Shen, Z., Real-time Monitoring of Newly Acidified Organelles During Autophagy Enabled by Reaction-Based BODIPY *Dyes. Commun. Biol.* 2019, 2 (1), 442.
24. Teknikel, E. and Unaleroglu, C. Colorimetric and fluorometric pH sensor based on bis(methoxycarbonyl)ethenyl functionalized BODIPY. *Dyes Pigm.* 2015, 120, 239-244.
25. Wallace, P. K.; Tario Jr., J. D.; Fisher, J. L.; Wallace, S. S.; Ernstoff, M. S.; Muirhead, K. A., Tracking Antigen-Driven Responses by Flow Cytometry: Monitoring Proliferation by Dye Dilution. *Cytometry A* 2008, 73A (11), 1019-1034.
26. Chuo, S. T.-Y.; Chien, J. C.-Y.; Lai, C. P.-K., Imaging Extracellular Vesicles: Current and Emerging Methods. *J. Biomed. Sci.* 2018, 25 (1), 91.
27. Loudet, A.; Burgess, K., BODIPY Dyes and Their Derivatives: Syntheses and Spectroscopic Properties. *Chem. Rev.* 2007, 107 (11), 4891-4932.
28. Liu, H.; Song, W.; Zhang, S.; Chan, K. S.; Guo, Z.; Shen, Z., A Ratiometric Fluorescent Probe for Real-Time Monitoring of Intracellular Glutathione Fluctuations in Response to Cisplatin. *Chem. Sci.* 2020, 11 (32), 8495-8501.
29. Wang, Y.-W.; Descalzo, A. B.; Shen, Z.; You, X.-Z.; Rurack, K., Dihydronaphthalene-Fused Boron—Dipyrromethene (BODIPY) Dyes: Insight into the Electronic and Conformational Tuning Modes of BODIPY Fluorophores. *Chem. Eur. J.* 2010, 16 (9), 2887-2903.
30. Kollmannsberger, M.; Rurack, K.; Resch-Genger, U.; Daub, J., Ultrafast Charge Transfer in Amino-Substituted Boron Dipyrromethene Dyes and Its Inhibition by Cation Complexation: A New Design Concept for Highly Sensitive Fluorescent Probes. *J. Phys. Chem. A* 1998, 102 (50), 10211-10220.

31. Lu, H.; Mack, J.; Yang, Y.; Shen, Z., Structural Modification Strategies for the Rational Design of Red/NIR region BODIPYs. *Chem. Soc. Rev.* 2014, 43 (13), 4778-4823.
32. Maus, M.; Rurack, K., Monitoring pH and Solvent Proticity with Donor-Acceptor-Substituted Biphenyls: A New Approach Towards Highly Sensitive and Powerful Fluorescent Probes by Tuning the Molecular Structure. *New J. Chem.* 2000, 24 (9), 677-686.
33. Krygowski, T. M.; Szatylowicz, H.; Zachara, J. E., How H-Bonding Modifies Molecular Structure and π-Electron Delocalization in the Ring of Pyridine/Pyridinium Derivatives Involved in H-Bond Complexation. *J. Org. Chem.* 2005, 70 (22), 8859-8865.
34. Liu, Y.; Choi, C. K. K.; Hong, H.; Xiao, Y.; Kwok, M. L.; Liu, H.; Tian, X. Y.; Choi, C. H. J., Dopamine Receptor-Mediated Binding and Cellular Uptake of Polydopamine-Coated Nanoparticles. *ACS Nano* 2021, 15 (8), 13871-13890.
35. Xu, W.; Zeng, Z.; Jiang, J. H.; Chang, Y. T.; Yuan, L., Discerning the Chemistry in Individual Organelles with Small-Molecule Fluorescent Probes. *Angew. Chem., Int. Ed.* 2016, 55 (44), 13658-13699.
36. Kalishwaralal, K.; Kwon, W. Y.; Park, K. S., Exosomes for Non-Invasive Cancer Monitoring. *Biotechnol. J.* 2019, 14 (1), 1800430.
37. Homolya L, Holló Z, Germann U A, Pastan I, Gottesman M M, Sarkadi B. Fluorescent Cellular Indicators are Extruded by the Multidrug Resistance Protein. *J. Biol. Chem.* 1993, 268 (29), 21493-21496.
38. Mikhailov, A.; Gundersen, G. G., Relationship Between Microtubule Dynamics and Lamellipodium Formation Revealed by Direct Imaging of Microtubules in Cells Treated with Nocodazole or Taxol. *Cell Motil.* 1998, 41 (4), 325-340.
39. Tang, D. D.; Gerlach, B. D., The Roles and Regulation of the Actin Cytoskeleton, Intermediate Filaments and Microtubules in Smooth Muscle Cell Migration. *Respir. Res.* 2017, 18 (1), 54.
40. Quast, T.; Eppler, F.; Semmling, V.; Schild, C.; Homsi, Y.; Levy, S.; Lang, T.; Kurts, C.; Kolanus, W., CD81 is Essential for the Formation of Membrane Protrusions and Regulates Racl-Activation in Adhesion-Dependent Immune Cell Migration. *Blood* 2011, 118 (7), 1818-1827.
41. Chambrion, C.; Le Naour, F., The Tetraspanins CD9 and CD81 Regulate CD9P1-Induced Effects on Cell Migration. *Plos One* 2010, 5 (6), e11219.
42. Sesaki, H.; Ogihara, S., Protrusion of Cell Surface Coupled with Single Exocytotic Events of Secretion of the Slime in Physarum Plasmodia. *J. Cell Sci.* 1997, 110 (7), 809-818.
43. Hoshino, D.; Kirkbride, K. C.; Costello, K.; Clark, E. S.; Sinha, S.; Grega, L. N.; Tyska, M. J.; Weaver, A. M., Exosome Secretion is Enhanced by Invadopodia and Drives Invasive Behavior. *Cell Rep.* 2013, 5 (5), 1159-1168.
44. Kastelowitz, N.; Yin, H., Exosomes and Microvesicles: Identification and Targeting by Particle Size and Lipid Chemical Probes. *ChemBioChem* 2014, 15 (7), 923-928.
45. McKelvey, K. J.; Powell, K. L.; Ashton, A. W.; Morris, J. M.; McCracken, S. A., Exosomes: Mechanisms of Uptake. *J. Circ. Biomark.* 2015, 4, 7.
46. Lee, E.; Shelden, E. A.; Knecht, D. A., Changes in Actin Filament Organization during Pseudopod Formation. *Exp. Cell Res.* 1997, 235 (1), 295-299.
47. Ueda, M.; Ogihara, S., Microtubules are Required in Amoeba Chemotaxis for Preferential Stabilization of Appropriate Pseudopods. *J. Cell Sci.* 1994, 107 (8), 2071-2079.
48. Ballestrem, C.; Wehrle-Haller, B.; Hinz, B.; Imhof, B. A., Actin-Dependent Lamellipodia Formation and Microtubule-Dependent Tail Retraction Control-Directed Cell Migration. *Mol. Biol. Cell* 2000, 11 (9), 2999-3012.
49. Ma, L.; Li, Y.; Peng, J.; Wu, D.; Zhao, X.; Cui, Y.; Chen, L.; Yan, X.; Du, Y.; Yu, L., Discovery of the Migrasome, An Organelle Mediating Release of Cytoplasmic Contents during Cell Migration. *Cell Res.* 2015, 25 (1), 24-38.
50. Cramer, L. P.; Mitchison, T. J., Investigation of the Mechanism of Retraction of the Cell Margin and Rearward Flow of Nodules during Mitotic Cell Rounding. *Mol. Biol. Cell* 1997, 8 (1), 109-119.
51. Ho, L. W. C.; Yung, W.-Y.; Sy, K. H. S.; Li, H. Y.; Choi, C. K. K.; Leung, K. C.-F.; Lee, T. W. Y.; Choi, C. H. J., Effect of Alkylation on the Cellular Uptake of Polyethylene Glycol-Coated Gold Nanoparticles. *ACS Nano* 2017, 11, (6), 6085-6101.
52. Cheng, P.; Pu, K., Molecular Imaging and Disease Theranostics with Renal-Clearable Optical Agents. *Nat. Rev. Mater.* 2021. DOI: 10.1038/s41578-021-00328-6.
53. Huang, J.; Li, J.; Lyu, Y.; Miao, Q.; Pu, K., Molecular Optical Imaging Probes for Early Diagnosis of Drug-Induced Acute Kidney Injury. *Nat. Mater.* 2019, 18 (10), 1133-1143.

We claim:

1. A compound of formula (I) or formula (II):

Formula (I)

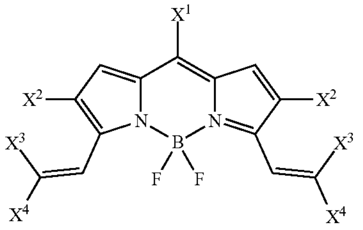

Formula (II)

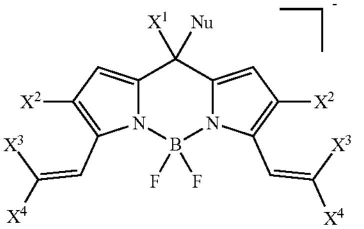

wherein the compound of Formula (I) or Formula (II) includes a chromophore having a boron-dipyrromethene (BODIPY) core structure, wherein at least one of $X^1$, $X^2$, $X^3$, and $X^4$ independently represent an electron withdrawing group and Nu is a nucleophile, wherein $X^1$ is a pyridine group (4-pyridyl group) in the meso position of the core structure.

2. The compound of claim 1, wherein $X^1$ represents:

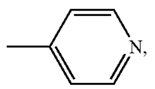

$X_3$-$X_4$ represents: COO $C_nH_{2n+1}$, wherein n=2.

3. The compound of claim 1, wherein the compound is formula (XIII) or (XIV):

Formula (XIII)

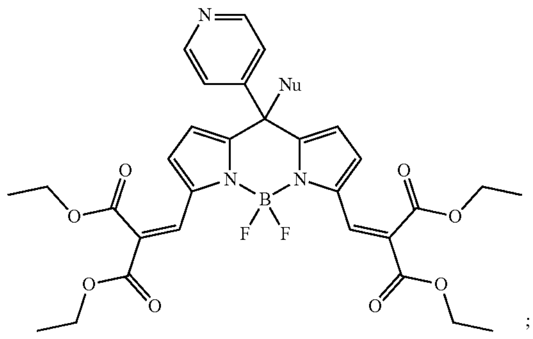

; or

Formula (XIV)

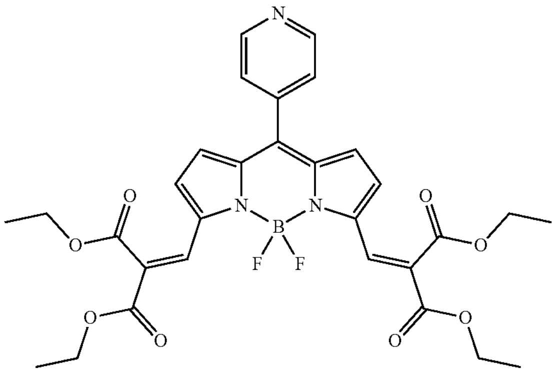

wherein Nu is a nucleophile.

4. The compound of claim 1, wherein the electron withdrawing group is a pyridine group or a carbonyl group.

5. A composition comprising the compound of claim 1.

6. A method for imaging and tracking an extracellular vesicle or intracellular vesicle; the method comprising:

a) providing a probe;

b) providing a sample comprising one or more cells;

c) contacting the sample with the probe;

d) detecting the position of a complex of the probe and the extracellular vesicle or the intracellular vesicle in the cell and/or the sample;

e) tracking the movement of the complex of the probe and the extracellular vesicle or the intracellular vesicle in the cell and/or the sample; and f) visualizing and/or imaging in real-time the position and/or the movement of the complex of the probe and the extracellular vesicle or the intracellular vesicle in the cell and/or the sample, wherein the visualizing and/or imaging or tracking the movement of the complex of the probe and the extracellular vesicle or the intracellular vesicle reveals a mechanism for a secretion process of the extracellular vesicle or the intracellular vesicle in a sample comprising a formation, transport, secretion, and interaction with other cell structures, wherein the probe enters a cell, wherein the cell is living, wherein the probe stains acidic vesicles, wherein other cell structures comprise cytoskeleton elements, wherein the probe is selected from the group consisting of one or more compounds of claim 1, wherein the probe comprises a compound that exhibits pH-reversible fluorescence between leuco and fluorescent forms, wherein upon attack by a nucleophile the probe switches from a boron dipyrromethene (BODIPY) form that emits fluorescence to a non-fluorescent leuco-BODIPY form, wherein after forming a complex with the extracellular vesicle or the intracellular vesicle the leuco-BODIPY switches to the BODIPY form that emits fluorescence, and wherein an onset point of fluorescence of the probe is a pH ranging from about 6 to about 7.4.

7. The method of claim 6, wherein the position of the extracellular vesicle or the intracellular vesicle is determined in within about 1 min to about 60 min, about 2 min to about 30 min, or about 3 min to about 5 min.

8. The method of claim 6, wherein the sample is obtained from a subject.

9. The method of claim 6, wherein the imaging or tracking the movement of the complex of the probe and the extracellular vesicle or the intracellular vesicle is visualized and/or imaged in situ.

10. The method of claim 9, wherein visualization and/or imaging or tracking of the complex of the extracellular vesicle or the intracellular vesicle utilizes immunofluorescence and/or microscopy.

11. The method of claim 10, wherein microscopy comprises fluorescence, confocal, two-photon, or super-resolution and/or imaging microscopy (SIM or STROM).

12. The method of claim 6, wherein the probe is applied to the sample jointly with a plasmid transfection for detecting a secretion of an extracellular vesicle or intracellular vesicle or extracellular multivesicular body (EMB).

13. The method of claim 12, wherein the plasmid transfection comprises transfecting a target gene fused with a fluorescent reporter protein.

14. The method of claim 6, wherein a nitrogen atom in the 4-position in the pyridine group can be protonated at pH below 5.3.

* * * * *